US011049372B2

(12) United States Patent
Beck

(10) Patent No.: US 11,049,372 B2
(45) Date of Patent: Jun. 29, 2021

(54) SYSTEM AND METHODS FOR GENERATING USER INTERFACES FOR CUSTOM CARD DESIGN SESSION

(71) Applicant: CPI Card Group—Colorado, Inc., Littleton, CO (US)

(72) Inventor: Brian Christopher Beck, Fort Wayne, IN (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 0 days.

(21) Appl. No.: 15/855,758

(22) Filed: Dec. 27, 2017

(65) Prior Publication Data

US 2018/0308141 A1    Oct. 25, 2018

Related U.S. Application Data

(63) Continuation-in-part of application No. 15/603,129, filed on May 23, 2017, now abandoned, which is a
(Continued)

(51) Int. Cl.
*G06Q 40/00* (2012.01)
*G07D 11/00* (2019.01)
(Continued)

(52) U.S. Cl.
CPC .............. *G07G 1/01* (2013.01); *G06Q 20/10* (2013.01); *G06Q 20/1085* (2013.01);
(Continued)

(58) Field of Classification Search
CPC .............. G06Q 30/06; G06Q 30/0601; G06Q 30/0621; G06Q 30/0643; G06Q 30/0635;
(Continued)

(56) References Cited

U.S. PATENT DOCUMENTS 5,410,642 A    4/1995  Hakamatsuka et al.
5,886,334 A    3/1999  D'Entremont et al.
(Continued)

FOREIGN PATENT DOCUMENTS

EP    0412520    2/1991
EP    0878956    11/1998
(Continued)

OTHER PUBLICATIONS

Claessens, et al., On the Security of Today's On-line Elcetronic Banking Systems, Dec. 21, 2001, Computers and Security Dec. 27, 2001.
(Continued)

*Primary Examiner* — Thien T Mai
(74) *Attorney, Agent, or Firm* — Dorsey & Whitney LLP

(57) ABSTRACT

A transaction card customization system that includes a customer user interface that is generatable based on a customization parameter indicative of at least one of a customer context and a product context of the user interface. An administrative user interface is described that facilitates an administrative user establishing a consumer user interface based on a customer context and/or product context. In turn, a locator is generated that includes the customization parameter indicative of the customer context and/or product context. As such, upon a user utilizing the locator to navigate to a custom card design server, a payload including the customization parameter is received at the custom card design server and used to generate the customer user interface based on the indicated customer context and/or product context.

22 Claims, 30 Drawing Sheets

Related U.S. Application Data continuation of application No. 13/527,431, filed on Jun. 19, 2012, now Pat. No. 9,697,555, which is a continuation of application No. 13/173,722, filed on Jun. 30, 2011, now abandoned, which is a continuation of application No. 11/818,098, filed on Jun. 13, 2007, now Pat. No. 7,992,774, and a continuation-in-part of application No. 14/067,612, filed on Oct. 30, 2013, now Pat. No. 10,055,773.

(60) Provisional application No. 61/720,287, filed on Oct. 30, 2012.

(51) Int. Cl.
  *G07F 19/00* (2006.01)
  *G07G 1/01* (2006.01)
  *G06Q 30/06* (2012.01)
  *G06Q 20/34* (2012.01)
  *G07F 7/08* (2006.01)
  *G06Q 20/10* (2012.01)
  *G06Q 30/02* (2012.01)

(52) U.S. Cl.
  CPC .............. *G06Q 20/34* (2013.01); *G06Q 30/06* (2013.01); *G07F 7/0873* (2013.01); *G07F 19/206* (2013.01); *G06Q 30/02* (2013.01); *G06Q 40/00* (2013.01)

(58) Field of Classification Search
  CPC ........... G06Q 30/0641; G06Q 30/0633; G06Q 30/0279; G06Q 20/10; G06Q 40/00; G06Q 30/02; G06F 40/186; G06F 40/166; G06K 19/02; G06K 19/022; G06K 19/06037; G06K 19/06046; G06K 19/07732; G06K 19/14; G06K 19/18; G06K 2019/06253; G06K 7/1417; G06K 7/1447
  See application file for complete search history.

(56) References Cited

U.S. PATENT DOCUMENTS

| | | | |
|---|---|---|---|
| 5,889,941 A | 3/1999 | Tushie | |
| 6,328,209 B1 | 12/2001 | O'Boyle | |
| 6,344,853 B1 | 2/2002 | Knight | |
| 6,402,028 B1 | 6/2002 | Graham | |
| 6,493,677 B1 | 12/2002 | von Rosen et al. | |
| 6,575,372 B1 | 6/2003 | Everett | |
| 6,632,250 B1* | 10/2003 | Lynch ............ | G06F 40/186 715/210 |
| 6,968,335 B2 | 11/2005 | Bayliss et al. | |
| 7,044,395 B1 | 5/2006 | Davis | |
| 7,103,230 B1 | 9/2006 | Jam et al. | |
| 7,360,692 B2 | 4/2008 | Zellner | |
| 7,576,752 B1 | 8/2009 | Benson et al. | |
| 7,931,199 B2 | 4/2011 | Elgar | |
| 7,992,774 B2 | 8/2011 | Lynch et al. | |
| 2002/0025085 A1 | 2/2002 | Gustafson et al. | |
| 2002/0052806 A1* | 5/2002 | Hodson ............ | G06Q 30/0621 705/26.8 |
| 2002/0057454 A1 | 5/2002 | Ueda et al. | |
| 2002/0078146 A1 | 6/2002 | Rhoads | |
| 2004/0047459 A1* | 3/2004 | Diaz .................... | H04M 17/20 379/144.01 |
| 2004/0099730 A1 | 5/2004 | Tuchler et al. | |
| 2004/0099731 A1 | 5/2004 | Olenick | |
| 2004/0144472 A1 | 7/2004 | Cowie | |
| 2004/0153332 A1 | 8/2004 | Libuit | |
| 2004/0160624 A1 | 8/2004 | Elgar et al. | |
| 2004/0254833 A1 | 12/2004 | Algiene | |
| 2005/0097008 A1 | 5/2005 | Ehring et al. | |
| 2005/0167487 A1 | 8/2005 | Conlon et al. | |
| 2006/0174199 A1 | 8/2006 | Soltis et al. | |
| 2007/0063031 A1 | 3/2007 | Silverbrook et al. | |
| 2007/0075134 A1 | 4/2007 | Perlow et al. | |
| 2007/0102510 A1 | 5/2007 | Beemer et al. | |
| 2007/0156837 A1 | 7/2007 | Elgar et al. | |
| 2007/0185795 A1 | 8/2007 | Petrime et al. | |
| 2007/0205290 A1 | 9/2007 | Newbrough et al. | |
| 2007/0215699 A1 | 9/2007 | Arego et al. | |
| 2007/0246526 A1 | 10/2007 | Elgar et al. | |
| 2007/0267484 A1 | 11/2007 | Ferrara | |
| 2007/0267485 A1 | 11/2007 | Ferrara et al. | |
| 2007/0267486 A1 | 11/2007 | Ferrara | |
| 2007/0276680 A1 | 11/2007 | Gombert | |
| 2008/0000965 A1 | 1/2008 | Zellner et al. | |
| 2008/0037900 A1 | 2/2008 | Elgar et al. | |
| 2008/0067256 A1 | 3/2008 | Shemaman | |
| 2008/0091459 A1 | 4/2008 | Elgar et al. | |
| 2008/0219738 A1 | 9/2008 | Zellner et al. | |
| 2008/0230616 A1 | 9/2008 | Elgar et al. | |
| 2008/0237338 A1 | 10/2008 | Ferrara et al. | |
| 2008/0270266 A1 | 10/2008 | Keane | |
| 2008/0308636 A1 | 12/2008 | Lynch et al. | |
| 2008/0313205 A1 | 12/2008 | Elgar et al. | |
| 2009/0177975 A1 | 7/2009 | Elgar et al. | |

FOREIGN PATENT DOCUMENTS

| | | |
|---|---|---|
| WO | 0239329 | 5/2002 |
| WO | 03085573 | 10/2003 |
| WO | 2004074961 | 9/2004 |
| WO | 2005081128 | 9/2005 |
| WO | 2006018624 | 2/2006 |
| WO | 2006018636 | 2/2006 |

OTHER PUBLICATIONS

Session (Computer Science), Wikipedia.org May 5, 2007.

* cited by examiner

Manage Currencies

New Currency...

| Name | Abbr | Symbol | Conv Rate | Status | Default | Actions |
|---|---|---|---|---|---|---|
| Euro | EUR | € | 0.7851 | Active | | Edit | Delete... |
| UK Pound | GBP | £ | 0.6527 | Active | | Edit | Delete... |
| US Dollar | USD | $ | 1 | Active | | Edit | Delete... |

Edit Currency

Basic Information

| | | |
|---|---|---|
| Name | * | [_____] ← 1802 |
| Abbreviation | * | [_____] ← 1804 |
| Symbol | * | [___] ← 1806 |
| | | ☐ Default Currency |
| | | ☑ Is Active |

Conversion Rate

1808

Rate * [0.0000] to 1.00 USD
☑ Automatically Update Rate ← 1810
Last Update * N/A

[Cancel] [Save]

SYSTEM AND METHODS FOR GENERATING USER INTERFACES FOR CUSTOM CARD DESIGN SESSION

CROSS REFERENCE TO RELATED APPLICATION

This application is a continuation-in-part of U.S. patent application Ser. No. 15/603,129 entitled "SYSTEMS AND METHODS FOR CREATING A USER CUSTOMIZED BANK CARD" filed on May 23, 2017, which is a continuation of U.S. patent application Ser. No. 13/527,431 entitled "SYSTEMS AND METHODS FOR CREATING A USER CUSTOMIZED BANK CARD" filed on Jun. 19, 2012, which issued as U.S. Pat. No. 9,697,555, on Jul. 4, 2017, which is a continuation of U.S. patent application Ser. No. 13/173,722 entitled "SYSTEMS AND METHODS FOR CREATING A USER CUSTOMIZED BANK CARD" filed on Jun. 30, 2011, which is a continuation of U.S. patent application Ser. No. 11/818,098 entitled "SYSTEMS AND METHODS FOR CREATING A USER CUSTOMIZED BANK CARD" filed Jun. 13, 2007, which issued as U.S. Pat. No. 7,992,774, on Aug. 9, 2011. This application is also a continuation-in-part of U.S. patent application Ser. No. 14/067,612 entitled "SYSTEM AND METHODS FOR GENERATING USER INTERFACES FOR CUSTOM CARD DESIGN SESSION" filed on Oct. 30, 2013, which issued as U.S. Pat. No. 10,055,773, on Aug. 21, 2018, which claims priority to U.S. Prov. App. No. 61/720,287 entitled "IMPROVED PAYMENT CARD E-COMMERCE SYSTEM" filed on Oct. 30, 2012. The entirety of each and every one of the foregoing applications are incorporated by reference in their entirety herein.

BACKGROUND

The use of transaction cards has become increasingly prevalent. Such transaction cards may take the form of credit cards, debit cards, gift cards, electronic gift vouchers, or other card forms that may generally be used for value in a transaction. As the use of such cards has increased, so has the desire to provide customized transaction cards.

For instance, customization of transaction cards may be provided as a service to a business that desires to provide custom branded transaction cards for use in the purchase of the business's goods or services. In this regard, the business may generate custom card designs for transaction cards to be provided to end-user customers. Furthermore, customization may also be provided to individual end-user customers such that customers may have the option of customizing a transaction card. In either regard, the customization of such cards may provide the ability to modify the nature of the card and/or to modify the physical appearance of the card. As such, the ability to customize a card may drive card sales to both businesses and end-user customers by enticing such card purchasers with the ability to customize cards.

In this regard, it may be appreciated that the ability to provide custom card designs may increase card sales for card producers, provide advantages to businesses that desire to provide transaction card to the businesses' customers, and provide advantages to end-user customers. As such, it may be appreciated that the need to provide efficient, user friendly card customization options exist as the user experience for both businesses and customers may be affected by the manner in which a user is able to customize a card. Proposed systems have been developed to this end, such as the one described in U.S. Pat. No. 7,992,774, the entirety of which is incorporated by reference herein. However, as the popularity of customized transaction cards continues to increase, further advancements related to systems for custom card design may further enhance the sales opportunities for card producers and businesses, while further providing increased levels of customer satisfaction for those users that interface with the system.

SUMMARY

One form of the present invention contemplates a unique system for creating a customized bank card by an individual based on instructions from a remote terminal. Other forms of the present invention contemplate unique apparatuses, systems, devices, hardware, software, methods, and combinations of these for creating customized bank cards. Further embodiments, forms, objects, features, benefits, and aspects of the present inventions are disclosed in the following description and drawings.

The present disclosure includes embodiments of systems and methods related to customization of transaction cards. Specifically, the present disclosure provides a discussion of embodiments for customization of transaction cards that allows for an efficient, user friendly card customization experience for both administrative users of the custom card design system and for end-users (e.g., consumers) of the custom card design system. As such, utilization of the embodiments described herein may facilitate improved customization of transaction cards, thus supporting the continually increasing demand for custom card solutions at a business-to-business and/or business-to-consumer level.

Specifically, the present disclosure may include embodiments of a custom card design system that facilitates a custom card design user interface to be generated by an administrative user in a manner that allows for rapid development and changes to user interfaces (e.g., such that custom card design user interfaces may be generated by a single custom card design system for a plurality of entities and/or a plurality of consumers a variety of locations throughout the world). As such, embodiments of custom card design systems discussed herein may facilitate functionality that allows an administrative user (e.g., a business, retailer, financial institution, service provider organization, card issuer, or the like) to access an administrative user interface. Using the administrative user interface, the administrative user may be able to manage custom card design orders, workflows, card design approvals, and/or consumer user interfaces. In this regard, the administrative user may develop and/or manage consumer user interfaces that are to be provided to consumers to facilitate receipt of customization inputs from the consumer related to the customization of a transaction card. In this regard, the administrative user may be operable to establish one or more consumer user interfaces by selecting and/or providing customer contexts and/or product contexts to be used in generation of the consumer user interface.

For example, an administrative user may wish to create distinct consumer user interfaces to be presented to customers of different businesses that wish to provide customizable transaction cards to the businesses' customers and/or customers in different locations (e.g., customers in different countries). As such, rather than creating completely distinct and independent consumer user interfaces for each locale and/or each business, the custom card design system contemplated herein may allow an administrative user to select from various contextual attributes for use in configuring at least one configurable element of a custom card design user interface template to accommodate usage of the custom card design system with a variety of businesses and/or in a variety of global locations.

In this regard, the custom card design user interface template may be maintained by the custom card design system with at least one customer context dependent configurable element and/or at least one product context dependent configurable element. In an embodiment, the custom card design user interface template may include both a customer context dependent configurable element and a product context dependent configurable element, which may in at least some embodiments be the same element. That is, an element may be configurable based on both a customer context and a product context. For each respective configurable element, a plurality of contextual attributes may be stored that each correspond to respective contexts that may be selected and/or customized based on an administrative user's preference. That is, rather than have to create such elements for each consumer user interface created, a specific user interface may be developed by specifying a particular context for a consumer user interface, where the specified context results in generation of the user interface in accord with the particular context desired by the administrative user. As such, different configurations of a consumer user interface may be efficiently modified to create different consumer user interfaces associated with different customer and/or product contexts.

In this regard, a custom card design user interface template may be stored along with different contextual attributes for corresponding configurable elements in the custom card design user interface template. Each of the different contextual attributes may be selectable by the administrative user. In turn, a contextual parameter that governs the configuration of the template (e.g., a contextual parameter that is indicative of at least one customer context and/or at least one product context) may be provided. The contextual parameter may be included in a locator that may be provided to a user to direct a user to a custom card design server. The locator, when utilized by a user to navigate to the custom card design server may result in a payload being delivered to the custom card design server, wherein the payload at least includes the contextual parameter. In turn, the customization parameter may indicate to the custom card design server particular contextual attributes to be used to configure a consumer user interface that is delivered to a user. In turn, the consumer user interface may be operable to receive user inputs regarding customization of a card that may be fulfilled. Thus, when a user navigates to a custom card design server using the locator, the generic custom card design user interface template may be configured in accord with the contextual parameter associated with the locator to generate the consumer user interface with the contextual attributes specified by the administrative user to collect customization inputs from the user.

Accordingly, a first aspect includes a method for generating a custom card design user interface for a custom card design session. The method includes maintaining a custom card design session interface template at a custom card design server comprising at least one configurable element. The custom card design session interface template supports functionality for generating a custom card design by user interaction therewith. For example, the custom card design session interface template may facilitate the receipt of customization inputs from a user that may include, for example, upload of an image for inclusion on a custom card, modification or manipulation of an image provided on a custom card, inclusion of customized text or the like on a custom card, or the like. The method further includes correlating the at least one configurable element to a plurality of preconfigured selectable contextual attributes stored at the custom card design server that each uniquely configure the configurable element in corresponding relative relation to at least one of a customer context or a product context of the custom card design session. In turn, the method includes receiving, from a user computing device, a contextual parameter that is at least partially determinative of the customer context and the product context of the customer card design session. Accordingly, the method further includes selecting a selected one of the plurality of preconfigured selectable contextual attributes at least partially based on the contextual parameter and generating the custom card design user interface for accepting user inputs relative to the functionality for generating a custom card design by configuring the at least one configurable element of the custom card design session interface template at least partially based on the selected contextual attribute.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment the contextual parameter may at least partially be based on a location from which the user is redirected prior to accessing the customer card design session. In this regard, the contextual parameter may be included in a URL generated in response to a user clicking on a link at a customer's web page. As such, the location from which the user is redirected is the customer's web page. In an embodiment, the URL may be an encrypted URL. That is, features (e.g., contexts or the like) of the custom card design user interface may not be discernible from the URL without decryption thereof.

In an embodiment, the at least one configurable element may include at least one of a locale element, a language element, and a currency element. For example, the plurality of preconfigured selectable contextual attributes correlated with the locale element may be selected from a group consisting of a configuration of the date and time entry format of the custom card design user interface, a configuration of the postal address entry format of the custom card design user interface, a configuration of the currency format of the custom card design user interface, a configuration of the language format of the custom card design user interface, or a combination thereof. In an embodiment, the plurality of preconfigured selectable contextual attributes correlated to the language element may each correspond to the language element as represented in a plurality of different respective languages. As such, the language may be selected at least partially based on the customization parameter. As such, each language element may correspond to at least one subject word, and a mapping may be maintained to the at least one subject word represented in the plurality of languages. The plurality of preconfigured selectable contextual attributes correlated to the currency element may each correspond to different respective currency formats. In this regard, the locale element, language element, and/or currency element may be selected to specify a custom card design user interface that may be suited for presentation to a group of customers. For example, the locale element, language element, and/or currency element may be tailored to specific conventions accustomed to by a group of users. As such, the locale element may at least partially based on a country in which a user is located. In this regard, the country in which the user is located may be determinable from the customization parameter.

A second aspect includes a method for configuration of a custom card design session. The method includes maintaining a custom card design session interface template that is configurable at least with respect to a customer context and a product context. The custom card design session interface template includes at least one customer context dependent configurable element that is independent of at least one product context dependent configurable element. In turn, the method may include first storing a plurality of customer contextual attributes for the at least one customer context dependent configurable element of the custom card design session interface template, where each customer contextual attribute corresponds to a corresponding one of a plurality of customer contexts. The method may also include second storing a plurality of product contextual attributes for the at least one product context dependent configurable element of the custom card design session interface template, wherein each product contextual attribute corresponds to a corresponding one of a plurality of product contexts. As such, the method may further include receiving a configuration parameter that is indicative of a customer context and a product context. In turn, the method includes first selecting a selected one of the plurality of customer contextual attributes at least partially based on the customer context and second selecting a selected one of the plurality of product contextual attributes at least partially based on the product context. As such, the method further includes generating a custom card design session by configuring the custom card design session interface template. In the generating, the at least one customer context dependent configurable element is configured at least partially based on the selected one of the plurality of customer contextual attributes and the at least one product context dependent configurable element is configured at least partially based on the selected one of the plurality of product contextual attributes.

A number of feature refinements and additional features are applicable to the second aspect. These feature refinements and additional features may be used individually or in any combination. As such, each of the following features that will be discussed or any of the foregoing features described in relation to the first aspect may be, but are not required to be, used with any other feature or combination of features of the second aspect.

For example, the customer context may be used to select a customer configuration from a customer hierarchical organization of the plurality of customer configurations. As such, the method may include creating a new customer configuration. The new customer configuration may inherit attributes of a parent customer configuration of the customer hierarchical organization. Furthermore, the method may include modifying the at least one customer context dependent configurable element of the new customer configuration from the parent customer configuration. In some embodiments, the modifying may create a child customer configuration of the parent customer configuration in the customer hierarchical organization.

In a similar regard, the product context may be used to select a product configuration from a product hierarchical organization of the plurality of product configurations. As such, the method may include creating a new product configuration, wherein the new product configuration inherits attributes of a parent product configuration of the product hierarchical organization. Furthermore, the method may include modifying the at least one product context dependent configurable element of the new product configuration from the parent product configuration. In some embodiments, the modifying may create a child product configuration of the parent product configuration in the product hierarchical organization.

In an embodiment, the at least one customer context dependent configurable element may include at least one of a locale element, a language element, or a currency element (e.g., as described above in relation to the first aspect). Furthermore, the at least one product context dependent configurable element may include at least one of a product listing, a product customization menu, or a product delivery option.

A third aspect includes a system for use in configuration of a customer card design session. The system includes a custom card design server that maintains a custom card design session interface template that supports functionality for generating a custom card design by user interaction therewith. The custom card design server stores a plurality of preconfigured selectable contextual attributes that each uniquely configure a configurable element of the custom card design session interface template in corresponding relative relation to at least one of a customer context or a product context of the custom card design session. The system further includes a communication module in operative communication with a user computing device to receive a contextual parameter that is at least partially determinative of the customer context and the product context of the custom card design session. The system also includes a custom card design user interface configuration module operable to configure the at least one configurable element of the custom card design user interface based at least in part on the contextual parameter. The custom card design user interface configuration module is operable to send the custom card design user interface comprising the configured configurable element to the user computing device.

A number of feature refinements and additional features are applicable to the third aspect. These feature refinements and additional features may be used individually or in any combination. As such, each of the following features that will be discussed or any of the foregoing features described in relation to either of the first or second aspects may be, but are not required to be, used with any other feature or combination of features of the third aspect.

A fourth aspect includes a method for use of a custom card design system. The method includes providing an administrative interface of the custom card design system for receipt of at least one session configuration parameter from an administrative user of the custom card design system related to a customer context and a product context of a custom card design user interface associated with the administrative user. The method further includes initiating a custom card design session of the custom card design system having the custom card design user interface that supports functionality for generating a custom card design by a user. The custom card design user interface is at least partially based on the customer context and the product context defined by the at least one session configuration parameter.

A number of feature refinements and additional features are applicable to the fourth aspect. These feature refinements and additional features may be used individually or in any combination. As such, each of the following features that will be discussed or any of the foregoing features described in relation to the first, second, or third aspects may be, but are not required to be, used with any other feature or combination of features of the fourth aspect.

For example, in an embodiment, the administrative interface may be operable to generate a locator for directing the user to the custom card design system. In this regard, the locator may include a contextual parameter indicative of the customer context and the product context used to generate the custom card design session. In an embodiment, the initiating operation may occur in response to the user being redirected using the locator.

In an embodiment, the product context may include a selection of at least one of a plurality of card fulfillment mechanisms. For instance, the plurality of card fulfillment mechanisms may at least include physical delivery of a physical card corresponding to the custom card design generated by the user and electronic delivery of an electronic representation corresponding to the custom card design generated by the user. Examples of electronic delivery may include, but are not limited to, delivery via SMS, email, by way of one or more social networks, via a wireless communication (e.g., Bluetooth, Wi-Fi, RFID, etc.), or the like. As such, the at least one session configuration parameter may include a selection of at least two of the plurality of card fulfillment mechanisms (e.g., by an administrative user) for inclusion in the custom card design user interface for selection by the user (e.g., the consumer user) with respect to the custom card design generated by the user. In an embodiment, at least a portion of the functionality for generating a custom card design by a user may be identical for any of the at least two of the plurality of card fulfillment mechanism. Thus, for example, customization of the appearance of the card may be the same for the user regardless of whether the card is to be physically delivered or electronically delivered.

In an embodiment, the customer context may include a selection of at least one configurable display element associated with an appearance of the custom card design session. For example, the at least one configurable display element may include a branding element and/or a background image that may correspond to the customer context of the custom card design user interface.

In an embodiment, for at least one of the customer context or the product context, the administrative interface comprises a hierarchical organization of contexts. The hierarchical organization of contexts may be modifiable. For instance, a default selection of the customer context and the product context is based at least in part on a parent configuration in the hierarchical organization of contexts.

A fifth aspect includes a method for configuration of a custom card design session. The method includes maintaining a custom card design session interface template that is configurable at least with respect to a customer context and a product context. The custom card design session interface template includes at least one customer context dependent configurable element that is independent of at least one product context dependent configurable element. The method may include first storing a plurality of customer contextual attributes for the at least one customer context dependent configurable element of the custom card design session interface template and second storing a plurality of product contextual attributes for the at least one product context dependent configurable element of the custom card design session interface template. In this regard, each customer contextual attribute corresponds to a corresponding one of a plurality of customer contexts. Additionally, each product contextual attribute corresponds to a corresponding one of a plurality of card fulfillment mechanisms. The method further includes receiving a configuration parameter that is indicative of a customer context and a product context. The method further includes first selecting a selected one of the plurality of customer contextual attributes at least partially based on the customer context and second selecting at least one of the plurality of product contextual attributes at least partially based on the product context. In turn, the method further includes generating a custom card design session by configuring the custom card design session interface template. In the generating operation, the at least one customer context dependent configurable element is configured at least partially based on the selected one of the plurality of customer contextual attributes and the at least one product context dependent configurable element is configured at least partially based on the selected at least one of the plurality of product contextual attributes.

A number of feature refinements and additional features are applicable to the fifth aspect. These feature refinements and additional features may be used individually or in any combination. As such, each of the following features that will be discussed or any of the foregoing features described in relation to the first, second, third, or fourth aspects may be, but are not required to be, used with any other feature or combination of features of the second aspect.

For example, at least one of the plurality of product contextual attributes may include a selection of at least one of a plurality of card fulfillment mechanisms by the administrative user. The plurality of card fulfillment mechanisms may at least include physical delivery of a physical card corresponding to the custom card design generated by the user and electronic delivery of an electronic representation corresponding to the custom card design generated by the user. The at least one of the plurality of product contextual attributes includes a selection of at least two of the plurality of card fulfillment mechanism for inclusion in the custom card design user interface for selection by the user with respect to the custom card design generated by the user. That is, an administrative user may select two or more fulfillment mechanisms (e.g., electronic delivery and physical delivery) to be presented to the consumer user in the consumer user interface. The user may then select from the fulfillment mechanism options presented for fulfillment of the card (e.g., the consumer user may select electronic delivery, physical delivery, or both).

BRIEF DESCRIPTION OF THE DRAWINGS

FIGS. 22-30 are screen shots of an embodiment of an administrative user interface for use in generation of a custom card design consumer user interface based on at least one customer context and at least one product context.

DETAILED DESCRIPTION

Figure 1:
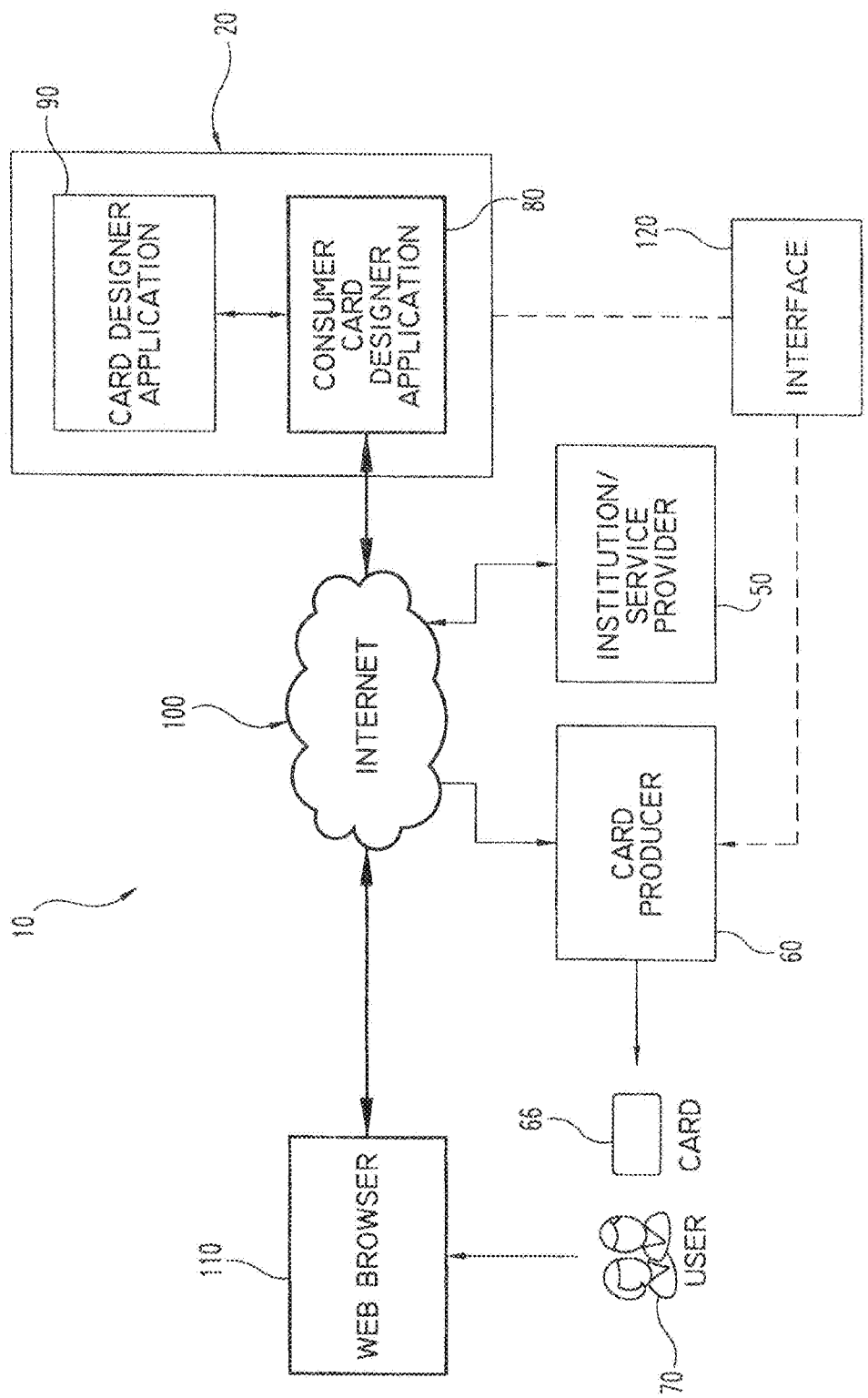
FIG. 1 is an illustrative diagram for creating a customized bank card.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Referring to FIG. 1, there is illustrated a schematic representation of a system 10 for creating a customized bank card. The system 10 includes a consumer card designer 20, a financial institution/service provider 50, a card producer 60, and a consumer/user 70. In one form of the present application, the system 10 is a web-based, consumer-level card design platform which provides financial institutions a convenient, configurable, distinct package for offering self-service bank card personalization to their customers through a home banking solution. A bank card may be a credit card, prepaid card, debit card, gift card, etc.

The consumer card designer 20 is operably coupled via a computer network 100 to each of the institution 50, the card producer 60, and the user 70. The consumer card designer 20 provides a consumer card designer application 80 and a card designer application 90. In one form of the present application, the computer network 100 is an internet connection which the user 70 uses to interface with the consumer card designer 20 through a web browser on a remote terminal 110. In some forms of the present application, the user 70, via an e-mail client application (not shown) may also receive e-mails to confirm card orders or to be notified of non-acceptable card designs.

The consumer card designer application 80 is provided for allowing the user 70 to design the customized bank card 66 from their own digital image or from a pre-designed artwork/image. The consumer card designer application 80 is a front-end application the user accesses to conduct the card design and ordering process. This application demonstrates a look-and-feel and functions according to configuration information established by the institution 50. As described in further detail below, the consumer card designer application 80 supports many institutions and adjusts the associated look-and-feel and functional behavior depending on the originating institution of the user 70. In one form of the present application, the consumer card designer application 80 is a website. In another form, the consumer card designer application 80 is an object oriented programming language based application (ex. Java®) operable to run on the remote terminal 110. In still another form, the consumer card designer application 80 is a website utilizing an object oriented programming language based application. Further details of the consumer card designer application 80 may be found below.

The card designer application 90 is an application, website, or server operable for institutions (and their service providers) to use to manage the configuration, catalogs, approvals, orders and other information related to operations of the consumer card designer application 80. In one form, the card designer application 90 is a website. The card designer application 90 provides back-end management capability for the consumer card designer application 80. The card designer application 90 authorizes and configures an institution's use of consumer card designer application 80, provides tools for institutions to design card design templates (i.e., basic card designs without a background), offers a tailored pre-designed background catalog, and manages their consumer users and to review orders that have been placed within the consumer card designer application 80. Further details of the card designer application 90 may be found below.

The Institution/Service Provider 50 (typically the provider of a home banking solution, which may be the institution itself or a provider of related services), in addition to managing the consumer card designer application 80 configuration via the card designer application 90, provides several direct interfaces to the consumer card designer application 80. In one form of the present application, the financial institution/service provider 50 provides its customers with a card account-specific link (not shown) to the consumer card designer 20 and the financial institution 50 is able to send/receive messages from the consumer card designer 20 regarding card design orders and approvals. One form contemplates that the card account-specific link is a hyperlink to the consumer card designer application 80. Other forms are contemplated such as the card account-specific link is included in a banner advertisement on a webpage or the card account-specific link is sent via email. The card account-specific link may route the user to a secure login screen requiring the user to login prior to initiating the design session.

In one form of the present application, the card account-specific link contains a session ID or unique user key embedded in the link that identifies at least one of the specific user and/or the financial institution to the consumer card designer application 80. The financial institution, in response to the user selecting the card account-specific link sends a payload to the consumer card designer application 80. Upon receipt of the unique user key, the consumer card designer application 80 associates the unique user key with the corresponding payload. In one form, the payload contains at least one of an initial card specification, a terms & conditions text, and privileges text. One form contemplates the initial card specification containing at least one of a financial institution's card template and a record providing basic information needed to initialize the card layout (such as brand mark, debit mark, 3rd and 4th embossing lines, etc.). Further details regarding the card account-specific link components and operation may be found below.

In one form of the present application, the institution provides at least one interface which allows for at least some of the following data to be communicated from the consumer card designer application 80 to the user 50:

A message that one or more card designs are ready for review/approval. This message may be implemented via e-mail or another automated interface. The behavior of this message may be configured by the institution to limit frequency or periodicy of transmission.

A message that one or more card designs have been approved for printing. This message may ultimately result in the institution/service provider sending an embossing request to the Card Producer.

An interface which can generate a new payload structure from an old design session ID and institution ID. This interface will be used to allow a user to re-design a new card by selecting a previous card design/order from which to start. This interface may return an invalid response if the account is no longer valid.

The card producer 60 is the final destination for the card design image or output. The institution/service provider 50 is responsible for ensuring an embossing request is properly delivered to the card producer 60. In one form of the present application, at least one interface 120 exists allowing the card producer 60 to pull a card design image from the consumer card designer application 80 based on the session ID. In another form of the present application, the consumer card designer application 80 will push the card design image and session ID to the card producer 60 using an automated interface (not shown). The choice of interface is configurable by the institution/service provider 50. The physical card 66 is the final output that is produced by the card producer 60. Following production, the card producer 60 delivers the card 66 to the user 70 typically via mail or other known delivery methods including but not limited to the delivery services provided by FEDEX®, UPS®, and DHL®. In another form of the present application, the card producer 60 delivers the card 66 to the financial institution 50 who then delivers the card 66 to the user 70.

Figure 2:
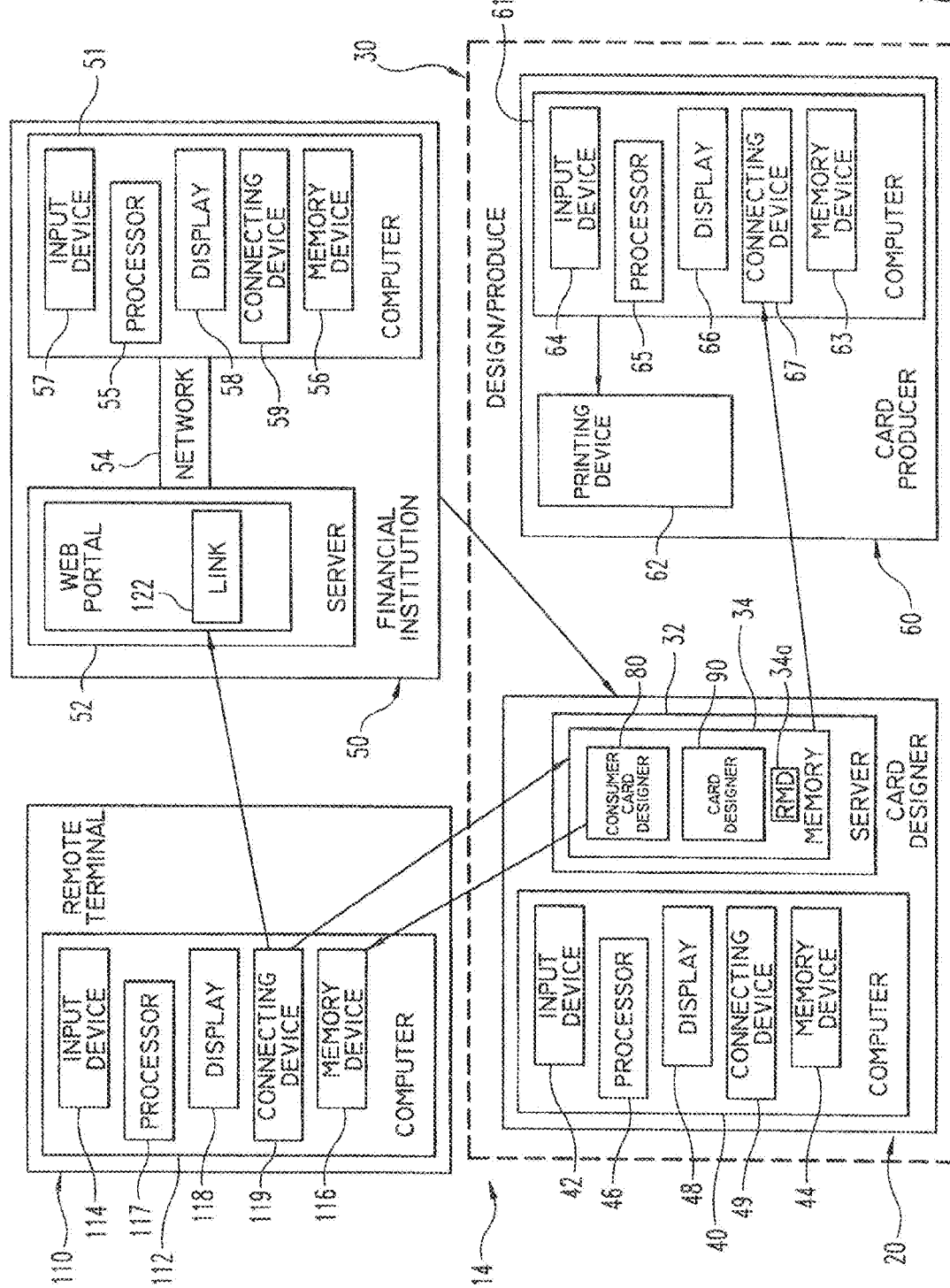
FIG. 2 is an illustrative schematic of computer equipment for creating a customized bank card.

Referring now to FIG. 2, there is shown an illustrative schematic showing various sub-components of computer equipment 14 of the system 10; where like reference numerals refer to like references. The computer system 14 includes the financial institution/provider 50, the card designer 20, the card producer 60, and the remote unit or terminal 110; computer network 100 operatively connects these units together, but is not shown in FIG. 2 to preserve clarity. In one form of the present application, the card designer 20 and the card producer 60 are located at a single design/produce location 30.

The card designer 20 includes a secure computer or server 32 having operating logic and having memory device 34 operable to store the consumer card designer application 80 and the card designer application 90. It is envisioned that memory device 34 is illustrated in association with server 34; however, memory device 34 can be separate from or at least partially included in one or more of digital signal processors (DSP) and/or processors (not shown). Memory device 34 includes at least one Removable Memory Device (RMD) 34a. Memory device 34 can be of a solid-state variety, electromagnetic variety, optical variety, or a combination of these forms. Furthermore, memory device 34 can be volatile, nonvolatile, or a mixture of these types. Memory device 34 can be at least partially integrated with circuitry, DSP, and/or processor (not shown). RMD 34a can be a floppy disc, cartridge, or tape form of removable electromagnetic recording media; an optical disc, such as a CD or DVD type; an electrically reprogrammable solid-state type of nonvolatile memory, and/or such different variety as would occur to those skilled in the art. In still other embodiments, RMD 34a is absent.

In one form of the present application, the card designer 20 further includes an approver computer 40 for approving appropriateness of images utilized in creating the customized bank card. The approver computer includes an input device 42 such as a keyboard or mouse, a memory device 44, a processor 46, a display 48, and a communication interface in the form of a connecting device 49. Memory device 44 is or may be similar to memory device 34 discussed above. The communication interface 49 is operable to connect the approver computer 40 to the network 100. As discussed in further detail below, the server 32 transmits a card design image created by the user 70 from the consumer card designer application to the approver computer 40 for review.

The financial institution/service provider 50 includes a provider computer 51 and a provider server 52 housing an institution web page or portal 53. The provider server 52 is coupled to the provider computer 51 through a network 54. The provider computer 51 includes a processor 55, a memory device 56, an input device 57, a display 58 and a communication interface in the form of a connecting device 59. In one form, memory device 56 is similar to memory device 34 discussed above. The communication interface 59 is operable to connect the financial institution/service provider 50 to the computer network 100.

The card producer 60 includes a card producer computer 61 and a card printing device 62. The card producer computer 61 includes a memory device 63 similar to memory device 34 discussed above, an input device 64, a processor 65, a display 66, and a communication interface in the form of a connecting device 67. The communication interface 67 receives the completed card design from the secure server 32. The card producer computer 61 processes the card design and transmits the card design for printing to the card printing device 62. In one form of the present application, the communication interface 67 is operable to connect the card producer 60 to the computer network 100. In another form of the present application the communication interface 67 is operable to form the interface 120 (FIG. 1) between the card producer 60 and the card designer 20. In one specific implementation, card printing device 62 is a credit card printing machine such as the ARTISTA® card printer available from Datacard Group, 11111 Bren Road West, Minnetonka, Minn. 55343 or the K400 Dual-Sided Thermal Printer available from Cimage, 2500 CityWest Boulevard Suite 300, Houston, Tex. 77042.

The remote terminal 110 includes a user computer 112 having at least one input device 114, a memory device 116, a processor 117, a display 118, and a communication interface in the form of a connecting device 119. It is envisioned that the input device 114 is operable to receive inputs from user 70. The input device 114 may be at least one of a mouse, a keyboard, or a cellular phone transmitting a data image.

In one form of the present application, the user 70 accesses the institution web portal 52 through the communication network 100 and then activates a card account-specific link 122. As discussed in detail below, activation of the card account-specific link 122 connects the financial institution/provider 50 to the card designer 20 which in turn connects the user computer 112 to the secure server 32. The consumer card designer application 80 is transmitted or downloaded to the memory device 116 of the user computer 112. The user 70 then may access the consumer card designer application 80 to create a customized bank card. Once the user 70 designs the customized bank card, the card image is sent through the communication interface 119 to the memory device 34 of the secure server 32. Further details relating to the underlying operation of the consumer card designer application 80 may be found below.

Figure 3:
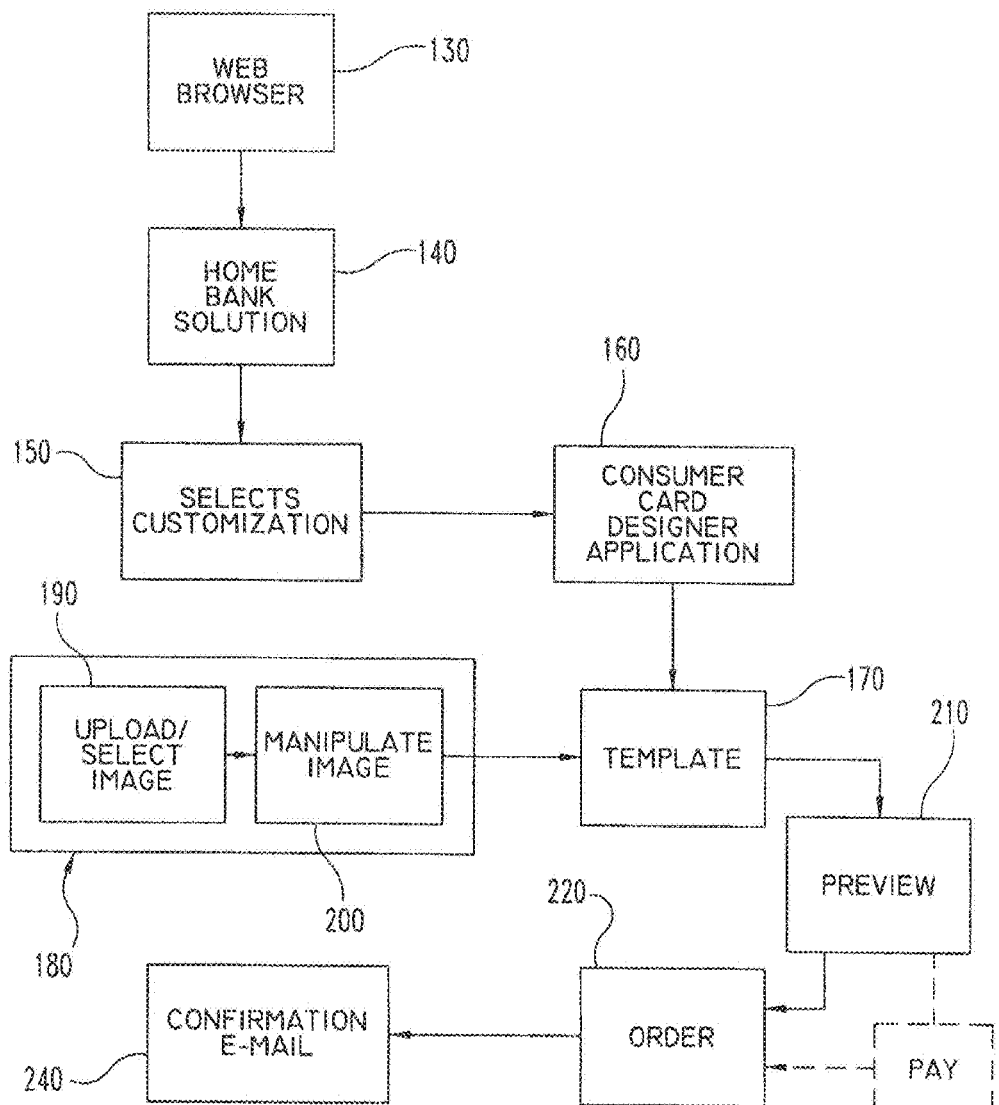
FIG. 3 is an illustrative process flow.

FIG. 3 depicts a process flow diagram showing an overview of operations in typical system use. The user (i.e., a customer of a financial institution) uses a web browser, block 130, to access a home banking solution, block 140, choosing to personalize a debit or credit card associated with an account 150. A URL redirects the user to the consumer card designer application/site, block 160, and presents the user with a pre-established card layout or template, block 170, (e.g., with the VISA brand logo, DEBIT mark, cardholder name, etc.). The template is derived in part from a template built and stored within the card designer, and in part from data contained in the URL which directed the user to the site. An intuitive user interface, block 180, provides the user the ability to upload or select card background art, block 190, and to manipulate its size, orientation and position on the card, block 200. Once complete, the user previews, block 210, and elects to order the new card, block 220, and optionally pays for the card using an online payment system, block 230. When complete, the user receives a confirmation e-mail, block 240, with the details of the order. The card is then printed and delivered to the user. While this scenario illustrates a largely automated, self-service web site, behind the scenes, other activities typically take place.

As discussed in greater detail below, the card design, prior to printing, may be reviewed and approved to ensure the content is appropriate and to identify any potentially problematic printing issues. Once the card has been approved, data interfaces must be invoked both to signal card ordering and to transfer image data to the card producer. In another form of the present application, a user may visit the consumer card designer application/site directly without a link from an existing institution and card account. In still another form of the present application, a user's card may be rejected due to inappropriate content or approved contingent upon user review of comments, such as potential for poor print quality. Examples of inappropriate content include but are not limited to the use of proprietary images, brand images (unless authorized), unauthorized images identified by the financial institution, sexually explicit, and/or offensive language or content. In yet another form of the present application, a user may visit the system, begin a design and save it for further work/review, then revisit the system later to resume and order it. In another form of the present application, the user may visit the system using a link from a prior, completed card order.

FIGS. 4-8 illustrate various flow charts of system operation. Because system 10 exposes a web-based user interface and is client-server in nature, the procedural flows that will be discussed reflect a single user's experience, however, the nature of a web-based application is that many users access the system simultaneously and each is at a different actual point in the same logical process at any given time. This fact requires consideration for both system performance and storage issues as well as any batched or bulk transaction handling (e.g., batch image transfers, frequency of alerts requesting image approvals, etc.). The system process flow begins logically when a visitor arrives at the main consumer card designer application/site and ends, ultimately, when a card is produced as a result of that user's activities. The process could also end when a user aborts the process intentionally or unintentionally such as loss of communication access, at any point.

Figure 4:
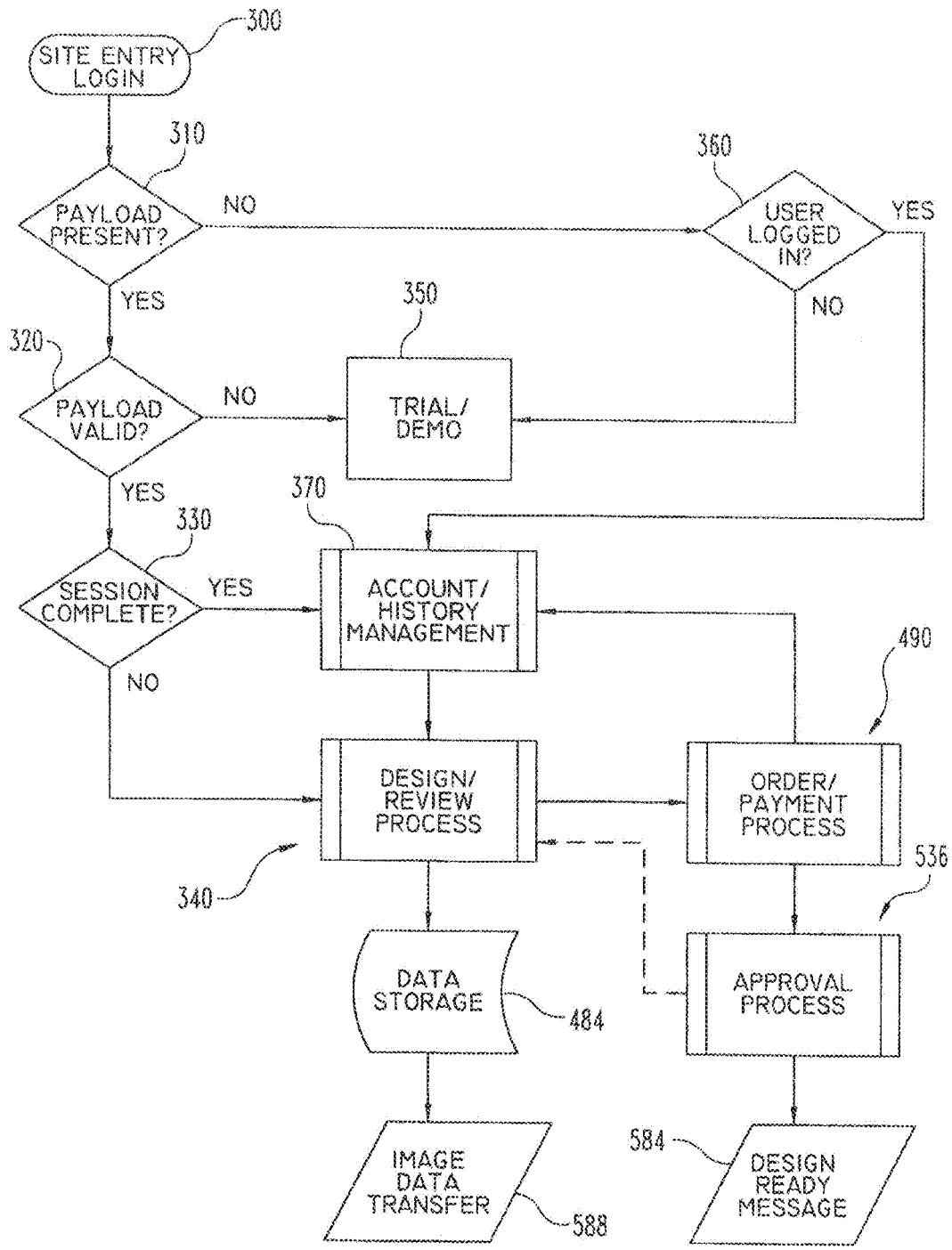
FIG. 4 is a flow chart of a main flow process of the system.

A flow chart of the process is shown in FIG. 4 and provides a view of the system and reflects the card design-order process. While the process is described with various operations, it is within the scope of the present application to have fewer or more processes, then those described below with reference to FIG. 4. Additionally, while the process is described in a specific order, other embodiments may have a different process order.

The process begins with site entry, block 300, which takes place when a user initiates the consumer card designer application/site. Site entry, block 300, may include a user logging into a secured data network/database, further details of login capabilities are discussed below. The system provides an entry page which is accessible via a URL and is configured to accept the "payload." In one form of the present application, in addition to the financial institutions template, the payload includes a record consisting of: embossing lines 3 and 4; brand mark type: VISA®, MASTERCARD®, AMERICAN EXPRESS®, or DISCOVER®; brand mark debit indicator: DEBIT or CREDIT; and a BIN number. The system determines whether the payload is present, block 310. If the payload is present, the system determines whether the payload is valid, block 320. Upon receipt of a valid payload, the system determines whether the design session is complete, block 330. If the design session is not complete (i.e., ordered) the system shall store this payload data, associate it with the user's browser session and redirect the user interface to the Design/Review process, block 340. For users with an invalid payload, the system presents an error message indicating that the information provided was incomplete or invalid and redirect them to the Sessionless Entry process (Trial/Demo), block 350. If the system determines that no payload is present, the system determines whether the user is logged in, block 360. In one form, the user is given the opportunity to login at block 360. If the user is not logged in, the user is directed to the Sessionless Entry, block 350. A successful login of the user where the system determines there is no payload, block 360, redirects the user to the Account/History Management process, block 370. An unsuccessful login attempt shall generate an appropriate error message to the user and shall record the user login attempt in a system log with at least the following: client IP address, username attempted, date and time of attempt.

Referring now to the details of the Sessionless or Trial/Demo process, block 350. The Trial/Demo process provides the user with a mixed graphical and textual introduction to the card design and ordering process. Animated or multimedia presentation formats may be employed to increase user attention and retention and to better illustrate ease of use of the system. In one form of the present application, a demonstration capability in which the user can design a mock card is provided, although the order capability will not be supported.

Referring now to the Account/History Management, block 370, authenticated users have access to an Account/History Management capability. The Account/History Management capability includes a mechanism to view and update current account information and view past order history. In one form of the present application, the system allows an authenticated user to create a new design based on a previous order contained in the order history. This capability is an optional feature for customers of an institution which supports an interface allowing the original design session ID to be duplicated to begin a new design session. If supported and requested by the user, the system connects to the institution's interface, retrieves a new design session payload and redirects the user to the Design/Review process, block 340. If the institution does not support the feature the system returns a failure status and the user is alerted and the new design request aborted.

Referring now to the design/review process, block 340, where the system supports the ability for a user to interactively create a card-proportioned design within the framework of a card template overlay. The card template will be a graphical overlay representing a structure that contains at least one of the following elements: a VISA® or MASTERCARD® brand mark; an optional, corresponding VISA® or MASTERCARD® hologram element; an optional DEBIT text element; a sample card number; a sample card good thru date and a "good thru" text element; optionally, a sample card valid since date and a "valid since" text element; embossing lines 3 and 4; and BIN number text element. If the user is in a design session, the card template shall be retrieved from the corresponding institution's configuration information using, at a minimum, the brand mark type. If the institution does not have a card template corresponding to the brand mark type, an error shall be presented to the operator and the system shall generate an entry in a system log with the following information, at a minimum: institution identification, design session identification, brand mark type, date and time of error. If the user is not in a design session (i.e., no valid payload was received), the card template shall be derived from a default, sample design template provided by the system.

Figure 5:
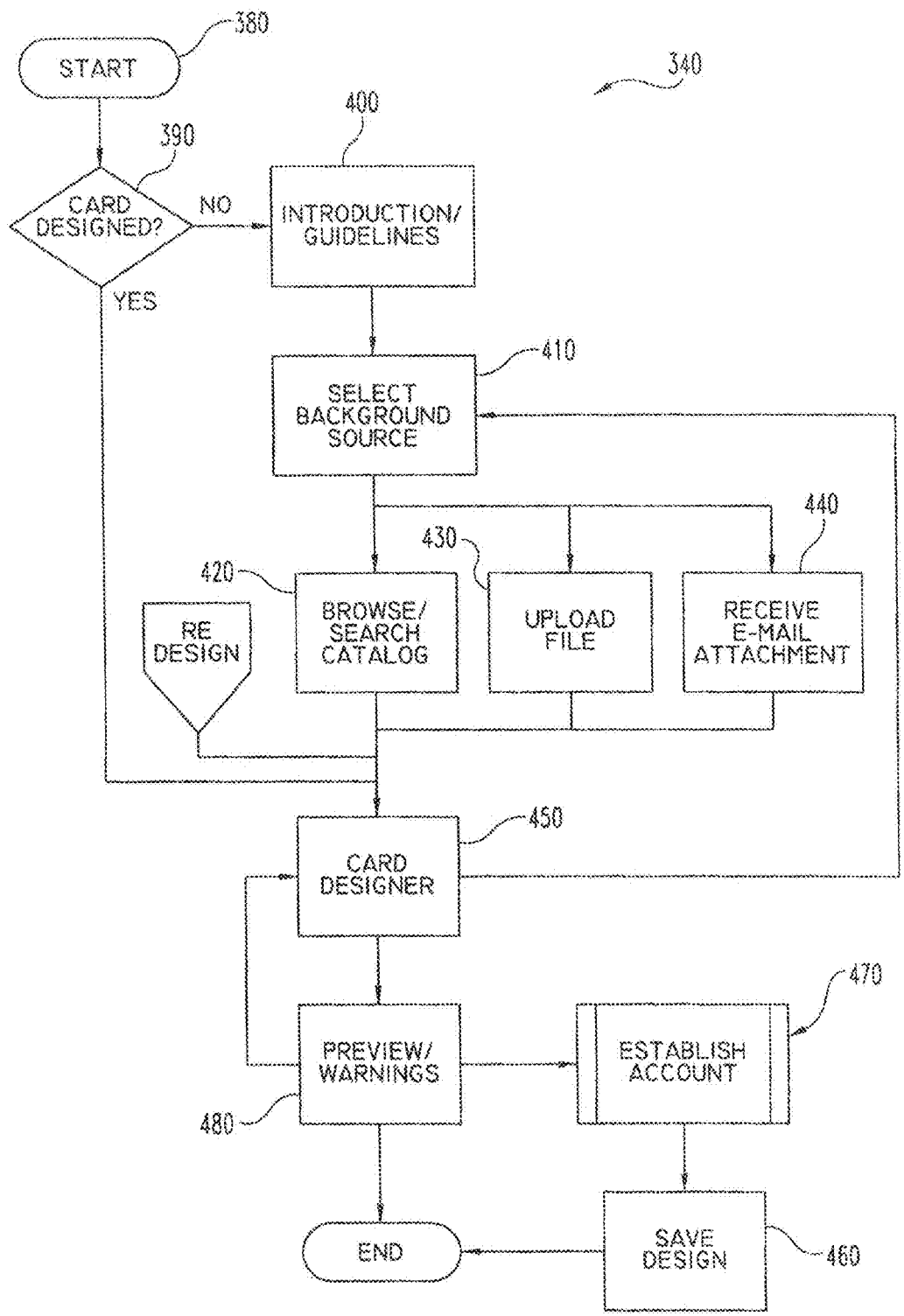
FIG. 5 is a flow chart illustrating the design/review process of FIG. 4.

FIG. 5 illustrates a flow chart of the design/review process 340. The design/review process initiates at block 380 and the system determines whether or not a card has been designed, block 390. If no card has been designed, the system provides an Introduction and/or Guidelines, block 400. The Introduction/Guidelines, block 400, includes a user interface describing the general process of creating a personalized card using the card design tool. This user interface provides sufficient information so that the user may begin the card design process knowing what image source options are available, how to choose the image source desired and how to manipulate the image on the card template. The user interface will also provide sufficient information so that the user will know that the card design must be ordered and paid for before it will be produced. Next, the system requests the user to select background image source, block 410. The Select Background Source, block 410, includes a user interface that allows the user to review and choose between all available background image source options including browse/search catalog of images, block 420; upload a file, block 430; or receive E-mail attachment of an image, block 440.

If the user selects, Upload File, block 430, the system provides a user interface which allows the user to upload an image file from the user's local storage (e.g., hard drive, camera, removable media, cell-phone etc.). The user interface provides information on the optimal file format, dimensions and resolution: uncompressed image at 300 dpi with a size of 1050 by 672 pixels. In one form of the present application, the user interface provides information on the minimum and maximum allowable file sizes and allowed file types. The upload user interface provides a progress indicator which displays to the user the relative (e.g., 50%) and actual (e.g., 600 KB of 1.2 MB) amount of the file uploaded. This indicator shall be updated frequently to adequately communicate file upload status. The system limits the type and size of files uploaded. In one form of the present application, the system supports JPEG, GIF and PNG file formats and requires the image have a minimum dimension/resolution of 640×480 and 72 dpi. In another form of the present application, the system limits the file size to a maximum, not to exceed, 4 MB. After the file upload is complete, if the image fails to meet system requirements, the user is notified and given the capability to retry the operation. If the image meets the system requirements, the image is stored and the user redirected to the Card Designer, block 450.

If the user selects Browse/Search Catalog, block 420, the system provides a capability for the user to browse and search for images within a pre-established artwork catalog/database. The catalog/database represents images that the institution, the institution's reseller and/or the system administrators have made available for the consumer card designer application/website. In one form of the present application, the images are presented to the user in the following order: first, those offered by the institution, then, those offered by the institution's reseller and, finally, those generally offered by the system. In one form of the present application, the catalog/database is presented in a categorical-arranged thumbnail display. The user has the ability to select a thumbnail and view its corresponding larger preview image. In one form of the present application, the system provides a search capability where the user may search by keyword within the image's name or description. Search results are returned to the user using a graphical thumbnail display using the same ordering logic as the catalog (institution-specific images first, then reseller, then general site images). In some forms of the present invention, the catalog/database may include images for purchase including special images such as sporting teams, copyrighted artwork, colleges, and other images that may require a license agreement. For each image, if an additional cost for the image will be charged, that cost shall be sufficiently visible to the user. After selecting an image from the catalog/database, the user is redirected to the Card Designer, block 450.

The user has the option of selecting receive e-mail attachment, block 440, for the source of the background image. Additionally, the system may provide the capability allowing the user to e-mail an image to a system-generated e-mail address. This capability allows the user to retrieve images from non-local image sources, such as cellular phones and other people's computers. In one implementation of the user electing to use this capability, the system generates a user specific e-mail address which corresponds to an e-mail monitoring capability pre-established by the system. This e-mail address is presented to the user with instructions on sending the image. Image limitations and recommendations, as discussed above in reference to Upload File, block 430, will also be provided. The system monitors incoming e-mail messages and simultaneously provides an indicator to the user showing e-mail receipt status. This indicator updates frequently to adequately communicate e-mail retrieval status. When the e-mail attachment retrieval is complete and if the image fails to meet system requirements, the user is notified and given the capability to retry the operation, otherwise, the image is stored and the user redirected to the Card Designer, block 450. In another implementation, the system emails the user electing this capability, a reply including specific code corresponding to the received image file sent to the user. By entering this code, the user is directed to a design session utilizing his or her emailed image.

Figure 8:
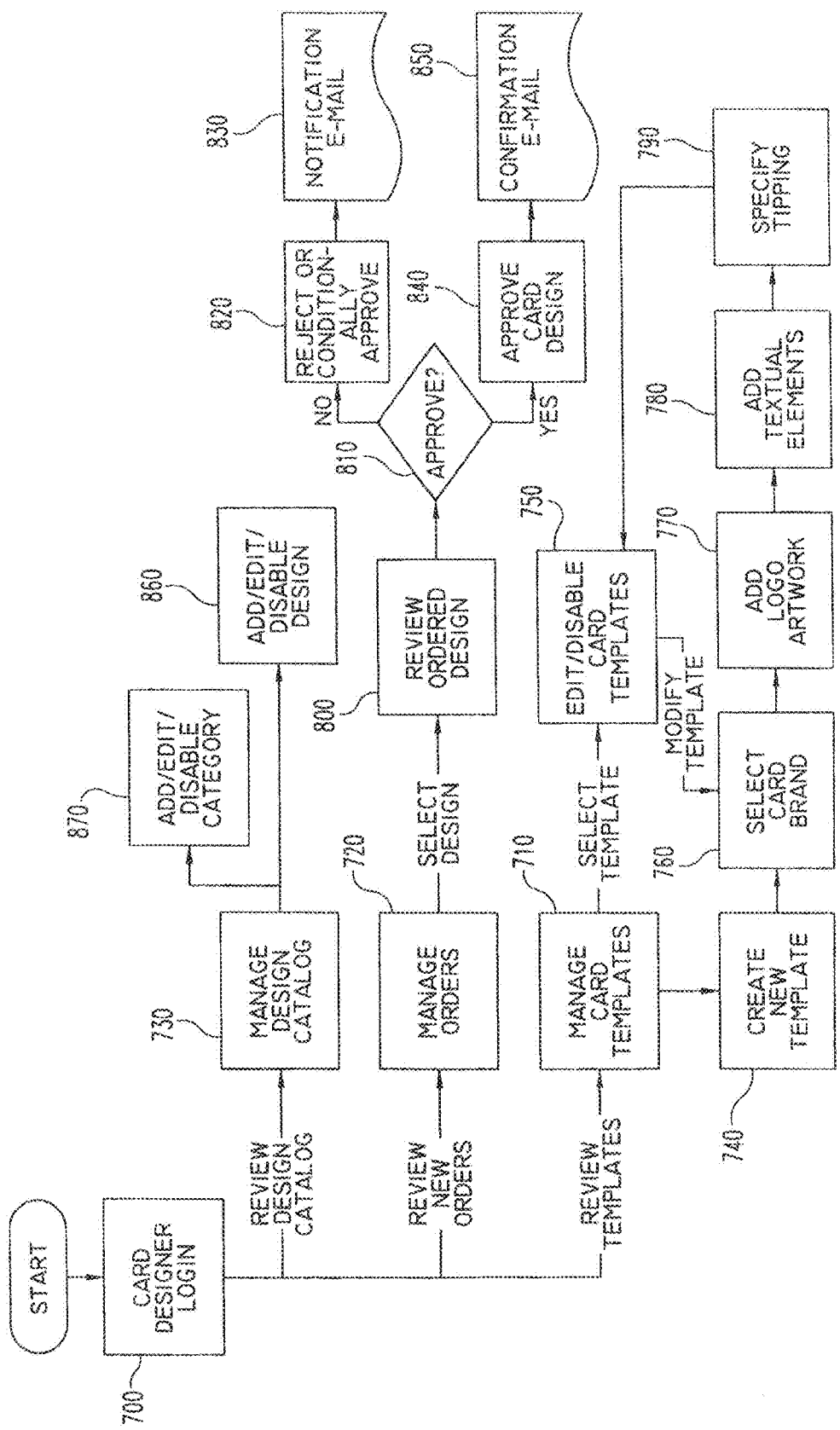
FIG. 8 is a flow chart illustrating consumer card designer administration.

Referring now to the Card Designer, block 450, the system offers a card designer tool which allows the user to manipulate selected aspects of a card design within the constraints of the card template layout. A sample card layout is illustrated in FIG. 8. This layout reflects a complete card design having a user-specified background image 610 (sized proportional to 1050 by 672) overlaid with the card design template (a VISA® brand logo 620 with a hologram 630, positioned logo artwork 640, Good Thru Date indicator 650), system-generated fictitious data (card number and Good Thru date) and payload data specific to this account (BIN number 670, embossing lines three and four 680, DEBIT identifier 690). This example also shows a custom user text element, "My Name" 700.

Referring now to FIG. 5, prior to entry to the card designer, block 450, at least one of the following required data elements must exist: card design template, driven by card brand passed via the payload, or system-generated default for demonstration only; card background image, selected or provided by the user, or system-generated for demonstration only; card account data, to include embossing lines 3 and 4, BIN number, DEBIT indicator, provided via payload, or system-generated for demonstration only. If the user is within a demonstration mode, the card design template and card account data is system-generated. The system generates and displays a card number, good thru date and valid from date (as needed) using fictitious data. The card designer is presented such that the graphical card template layout and auto-generated textual elements appear as an overlay on top of the card background image. In one form of the present application, the consumer card designer application includes display logic which evaluates the color levels of the background image directly under the following text elements and colors the textual element accordingly to provide sufficient contrast: DEBIT indicator, Good Thru text, Valid Since text, BIN Number, Tipping. The system allows for the background image to be manipulated. In some forms of the present application for user-supplied or irregularly-proportioned artwork, the system allows the card background image to be manipulated. In one form of the present application, for pre-designed background artwork, the system prevents the background image from being manipulated.

The system supports at least one of the following background image manipulations:
Rotate 90 degrees clockwise or counter-clockwise
Flip horizontal
Flip vertical
Select sub-image region to crop image proportional to background dimensions. This may be done by allowing the size of the image to be adjusted and also allowing the sub image to be moved up, down, left or right within the frame. This may alternatively be done by providing a crop selection tool by which the user can select a card-proportioned section of the image for use as the background.
Apply recolor colorization effect, from selected tone hues In one form of the present application, the system supports the overlay of a single textual element onto the card background. Other forms contemplate overlaying multiple textual elements. The system supports at least one of the following text characteristics:
Text content
Text font, from selected font families
Text font size
Text font style: normal, bold, italic While in the Card Designer tool, block 450, the user may choose to manipulate the background image and add textual elements and may elect to re-specify a background image by re-visiting the Select Background Source process, block 410. This user manipulation sequence may happen indefinitely until the user chooses to save the design or order the design. Other forms of the present application contemplate, the user being able to overlay a second image over the background such as a face image, enlarge a portion of the background image, add a second image side-by-side to the background image, embedding an image in the background image, etc.

The system provides a capability for the user to save a design in progress, block 460. The system ensures that the user has an existing user account to which to save the design. If the user is not logged in, the user shall be required to login or establish an account. The Establish User Account process, block 470, shall be invoked if the user elects to establish an account, further details of the establish user account process, block 470, may be found below. Once the user account identity has been established, the system saves the design, block 460, and all associated artwork products such that the design can later be accessed by that account. If the user chooses to order the customized bank card, the system directs the user to the Preview/Warnings dialog, block 480. The Preview/Warnings process, block 480, provides a user interface that displays a preview image of the completed card design. This interface provides at least one of the following: institution name, embossing lines 3 and 4, order price and warnings relating to the output of the design. In one form of the present application, the warnings include at least one of the following:

If the card background is not system supplied, if the resolution and dimensions of the cropped card background art is less than 300 dpi at 1050 by 672, the system shall provide a warning that the card's resolution is less than recommended and print degradation may result. A status indicator referring to image resolution level shall be provided.

The system will calculate approximate contrast under the following regions and alert the user if poor or inadequate contrast may result: DEBIT indicator, Good Thru text, Valid Since text, BIN Number, Tipping.

If any user-generated textual element exists and has been positioned to intersect with any institution-generated logo or with the VISA®/MASTERCARD® brand logo mark, a warning shall be presented.

If the system displays a warning, the interface requires the user to acknowledge a statement that the warnings have been reviewed and accepted before proceeding. The acknowledgement of these warnings is recorded with the order record. The user is provided a mechanism to return to the Card Designer capability to make adjustments to the card design. The user is also presented with an agreement which states that the card background image and textual elements meet appropriateness guidelines and that the background artwork does not violate usage rights. The interface may require that this agreement be accepted before proceeding. The acceptance of this agreement may be recorded with the order record. Once all the agreements have been accepted and the user elects to proceed, the design is directed to data storage, block 484 and the user is redirected to the Order/Payment process flow 490, as shown in FIG. 4. In one form of the present application, the completed design image is stored at the consumer card designer application/site. In another form, the completed card design is stored at a remote server location (not shown).

Figure 6:
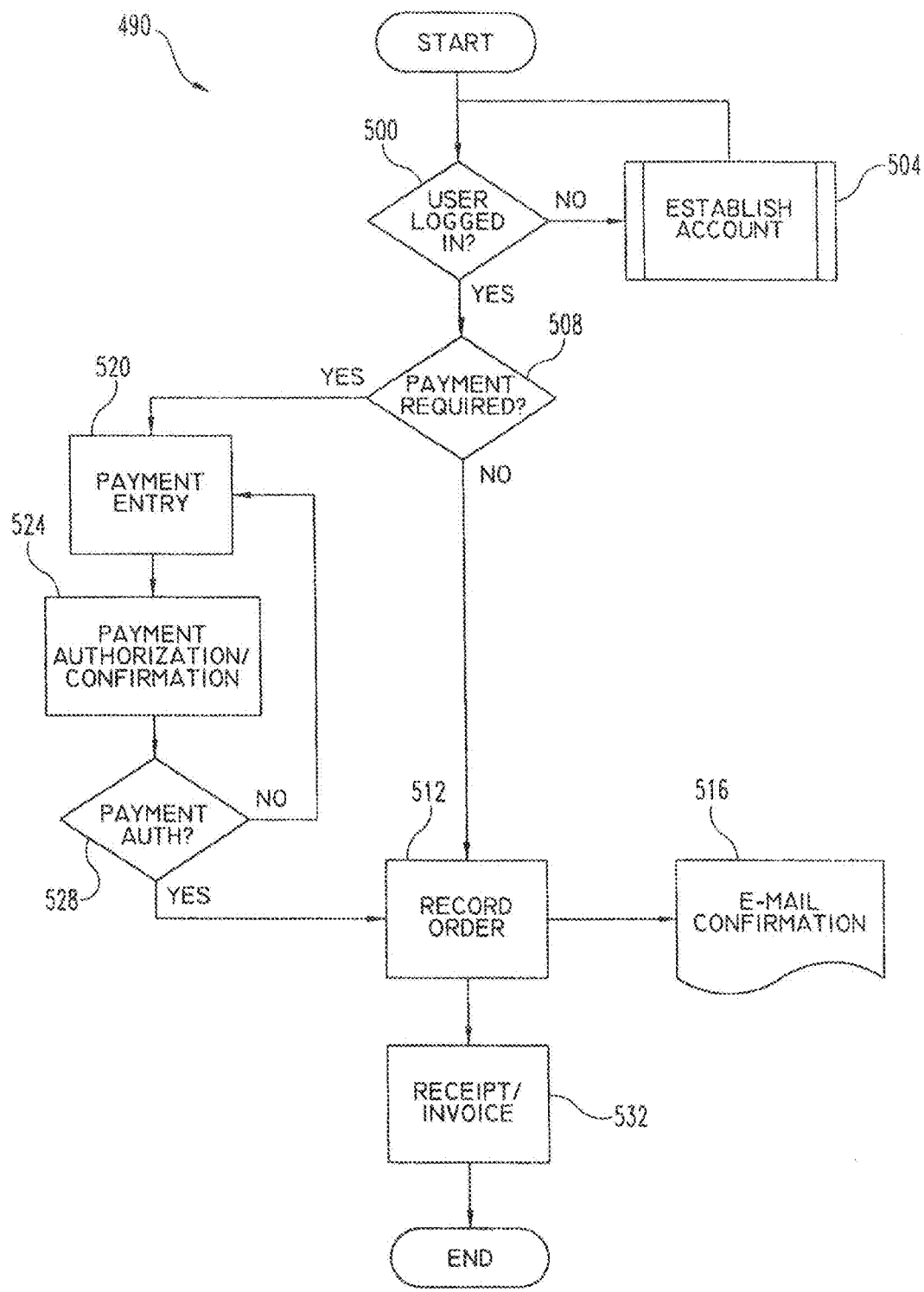
FIG. 6 is a flow chart illustrating the order/payment process of FIG. 4.

Referring now to FIG. 6, there is shown further details of the Order/Payment Process Flow 490. The system first determines whether a user is logged in, block 500. If the user is not logged in or is a new user, the user establishes a new account, block 504 so that order-related e-mail transmissions may be delivered and so that the user may return to the system and view order status. The system next determines whether payment is required, block 508. Payment for the order may be handled by the institution directly. The system supports a mechanism by which the institution can specify self-billing or system payment. If the institution has specified self-billing, the system bypasses all payment related entry and authorization. If the institution has specified system billing, the order requires a successful payment transaction before continuing. After payment, the order is recorded, block 512. Upon completion of the order process, the user shall be sent a confirming e-mail message, block 516, containing, at a least one of the following: the order date and time, the order cost, an order confirmation number, an image of (or a hyperlink to a depiction of) the completed card design, and contact information for gaining additional status for the order.

Referring now to the Establish Account Process, block 504, the system provides a mechanism by which a user may login to the system or else establish a new account within the system. By maintaining an account, a user may leave the system and then return later to resume a card design or may review past orders and order status. The user interface provides a mechanism to allow a user to login to the system using pre-established account information, consisting of, at a minimum, a username and password. The system allows the user to set up a new account by supplying the following items, at a minimum: an e-mail address and a password. Upon request to establish an account, the user is sent a confirmation e-mail. In one form of the present application, the e-mail contains a link or URL which must be visited to confirm the e-mail account as valid. In another form of the present application, the e-mail contains a short alphanumeric code sequence which the user can manually enter to confirm the account.

If the financial institution does not provide for payment, the system provides a secure mechanism by which the user can enter payment means for payment of the order, block 520. The system shall support at least one of the following payment means: a credit card, PayPal, and electronic check/EFT. The user interface validates all required fields to include the validity of the credit card number (e.g., Luhn algorithm) and expiration date before submitting the payment request. After entering the payment, the system provides for Payment Authorization/Confirmation, block 524. The system securely connects to a payment gateway and authorizes the user's payment. Upon successful authorization of the payment, block 528, the system records the payment confirmation details with the order and invokes the Record Order process, block 512. If the connection attempt is unsuccessful, the system redirects the user to the Payment Entry screen, block 520, and displays an appropriate message indicating that the payment was unable to be processed. If the authorization is declined, the system redirects the user to the Payment Entry screen, block 520, and displays the response information from the payment gateway.

Referring now to Record Order, block 512, upon verification of a valid payment source, the system records the order details. The system generates a unique invoice number and assigns this number to the order record. The system presents the user with a printable receipt/invoice, block 532, which serves as the record for the financial transaction. In one form of the present application, the receipt is also made available from within the user's Account/History Management area.

Referring to FIG. 4, in one form of the present application, the system includes an Approval Process 536. In one form of the present application, the approval process is fully automated. In another form of the present application the approval process includes institution designated reviewer(s) and may be manual or partially automated.

Figure 7:
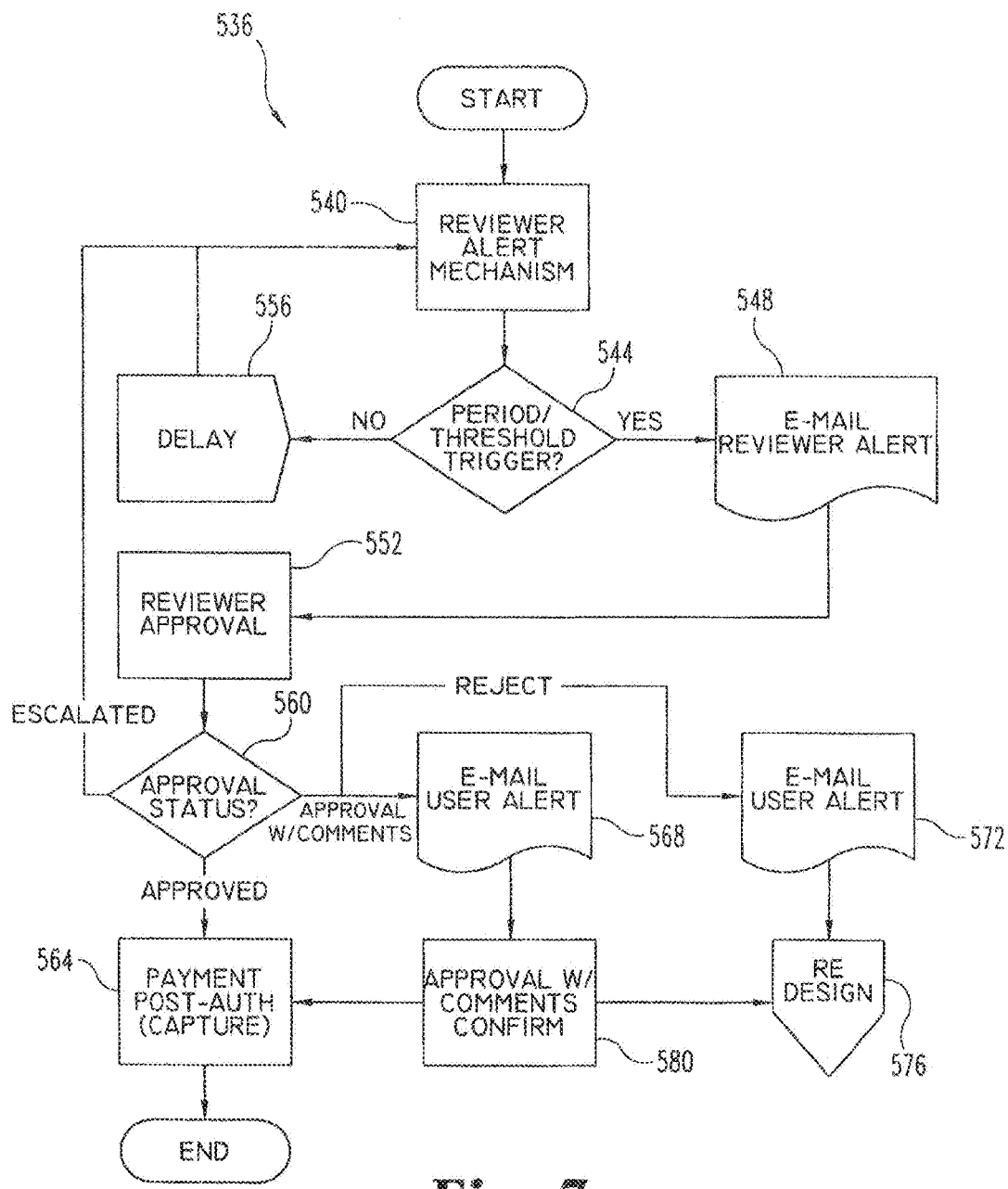
FIG. 7 is a flow chart of the approval process of FIG. 4.

As shown in FIG. 7, the Approval Process Flow 536 includes a Reviewer Alert Mechanism, block 540. Upon receipt of a new order, the system determines whether to send an alert to the institution's designated reviewer(s). This determination is based on the institution's configuration of order review alerts. The institution's configuration includes at least one of the following parameters:

minimum time between consecutive alerts minimum number of orders before alerting maximum time to wait before sending an alert for a given order first level reviewer(s)—to send initial requests for approval second level reviewer(s)—to send escalated requests for approval Based on these criteria, if the system determines, block 544, that an alert should be sent, an e-mail is transmitted to the first level reviewer(s), block 548. The e-mail contains a link to the Reviewer Approval interface, block 552. If the system determines, block 544, that an alert is not ready to be sent, the system enters a delay, block 556, based on the configuration parameters. When the delay is complete, the system determines if any alerts are pending to be sent and, if so, shall re-try the above logic.

Referring now to the Reviewer Approval, block 552, one form of the present application contemplates the system supports an interface to allow one or more card designs to be reviewed by a reviewer. In one form of the present application, this interface will be used by the Card Designer application, which will host the order preview and approval capability. In another form of the present application, the interface is supported by the consumer card designer application/site. The reviewer is provided a mechanism to enter comments about the design. This mechanism records the comments along with the reviewer's identity and the date and time of the comments. The system allows an order to be set to at least one of the following states: approved, approved with comments, rejected, and escalated. The system determines whether the order is approved or not, block 560. If an order is "approved" and a payment was authorized during the Order/Payment process, block 490 (FIG. 4), the Payment Post-Authorization process, block 564, shall be invoked. If an order is "approved with comments" or "rejected", an e-mail (block 568 w/comments, block 572 rejected) is generated to the user with at least one of the following: a preview image of the card design, the approval status, the reviewer's comments, and a link to the system which the user can use to regain access. If the design is rejected, the user is given the option to redesign, block 576, the card image. If the design is approved with comments, the user must approve the comments, block 580, prior to proceeding to Payment Post-Authorization, block 564. Additionally, if the approval status is approved with comments, the user interface presents an option in which the user can specify acknowledgement of the comments and order the card "as is". If the user completes this action, the card design order shall be placed in "approved" status and if a payment was authorized during the Order/Payment process 490, the Payment Post-Authorization process 564 shall be invoked.

In one form of the present application, if a user re-accesses the system to update a card design which was approved with comments or rejected (see Reviewer Approval), following login, the user is presented with a user interface which shows the card design image and which provides the status of the approval as well as any comments provided by the reviewer(s). From this user interface, a link is provided to direct the user to the Card Designer 340 to modify the design.

In some forms of the present application, the financial institution may request more than one layer of review. A multi-layer review scheme allows a lower level review to determine specific factors and may escalate the design to a higher level depending on the approval structure determined by the financial institution. If the order is "escalated", the system shall generate an alert to the second level reviewer(s) referenced in the Reviewer Approval interface, block 552 using the Reviewer Alert Mechanism, block 540. The e-mail shall contain a link to the Reviewer Approval interface, block 552.

The system may support transmission of a "design-ready message" to the institution/service provider, block 584. This message contains at least one of the following:
  identifier of the institution representing the user
  unique identifier for the user's card design session
  date and time of order
  order invoice number
  number of review cycles before approval The system transmits the message based on configuration information provided by the institution/service provider. The transmission methods which the system supports include at least one of HTTP and web service. The system requires that the destination host provide an acknowledgement in response to the message. In absence of a response, the system shall disconnect from the connected method, wait a specified period, then re-connect and attempt a retransmission of the same message. In one form of the present application, the system may provide a web service interface which allows an institution/service provider to query for design or order status based on the unique identifier for the user's card design session. This interface will return the above fields, at a minimum.

As shown in FIG. 4, after payment is processed, block 490, and the design review process is completed, block 340, the system supports transmission of the card design image, block 588 to the card producer. In one form, the card design image is adjusted to an uncompressed image at 300 dpi and to a size of 1050 by 672 pixels. When modifying size and resolution, the highest image quality should be maintained. The automated transmission of the image is based on configuration information provided by the institution/service provider. The transmission methods to be supported include at least one of HTTP, FTP and web service. In one form of the present application, the system requires that the destination host provide an acknowledgement in response to the message. In absence of a response, the system disconnects from the connected method, waits a specified period, then re-connects and attempts a retransmission of the same message. In one form of the present application, the system provides a web service interface which allows a card producer to retrieve the card design image based on the unique identifier for the user's card design session (session ID). In another form of the present application, the system provides an FTP interface which allows a card producer to retrieve the card design image based on a filename convention which uses the unique identifier for the user's card design session.

In at least one form of the present application, the system provides a management interface via Card Designer. Some forms contemplate the management interface may be restricted to administrative users of the system. The management interface supports at least one of the following features:
  Authorization of new institutions for use of the CCD system
  Modification of an institution's configuration parameters.
  Disablement of an institution's use of the CCD system.

It is envisioned that certain forms of the present application contemplate that the system may provide a configuration interface via Card Designer. The configuration interface is accessible by Global administrative users and administrative users for the associated Reseller and institution. At least one of the following configuration items is supported:
  Institution name and web site URL
  Branding graphical element
  Support contact information
  Payment configuration information
  Approval Review configuration information
  Design Ready Message interface configuration
  Image Data Transfer interface configuration FIG. 8 illustrates a flow chart illustrating administration of the consumer card designer by the financial institution/service provider. A representative of the financial institution logs into card designer at block 700 and has the option of selecting manage card templates block 710, manage orders block 720, or manage design catalog 730. The system supports creation of a new template block 740 or modification and/or deletion of one or more card design templates block 750. However, the system requires at least one card design template to be established. While either modifying or creating a template, the representative selects a card brand 760 (VISA®, MASTERCARD®, AMERICAN EXPRESS®, DISCOVER®) and then may add logo art work block 770, add textual elements 780, and/or specify tipping 790. In one form of the present application, the templates are identified by the card brand and the system prevents more than one card design template for a given brand to be active simultaneously.

The system provides the ability for the financial institutions/service providers to manage orders (block 720). This allows the representative to review the ordered designs block 800 and choose to approve the ordered design block 810. The representative may choose to reject or conditionally approve the card design block 820 after which the system sends a notification email to the user block 830. The representative may choose to accept the card design, block 840, and the system then sends a confirmation email to the user block 850. Further details regarding the approval process are described above with reference to FIG. 7.

The system may also provide the capability to modify the pre-designed background catalog for a given institution block 730. The modifying capability includes the ability to disable or add system-level backgrounds block 860 and/or disable or add categories block 870.

In some forms, the system may also provide a reporting capability which is restricted to appropriate users, which are determined by the financial institution. All reports support the download of tabular data corresponding to the report data using comma-separated value format. At least one of the following reports shall be supported:

Card Design History: filtered by date range, institution, reseller; displaying embossing line 3, card brand type, debit indicator, elapsed time from entry to order, elapsed time from order to approval, number of approval reviews; sortable. Rollup averages of elapsed times to be presented.

Order History: filtered by date range, institution, reseller; displaying embossing line 3, card brand type, debit indicator, order date and time, design-ready date and time, order price and payment source (institution vs. system). Rollup totals to be displayed for order price.

Excessive Rejects: filtered by date range, institution, reseller, minimum number of rejects; displaying embossing line 3, brand type, institution, number reseller, of rejects returned, number of orders placed.

Other forms of functionality may be supported by the system including: Archival; Diagnostics; and Logging. The system provides a mechanism by which a system administrator user can purge the system of unused design session information as well as outdated or obsolete card design and order information. The system provides at least one of the following diagnostic test capabilities:

Test connection to a selected institution's service provider for design-ready message Test design-ready message generation to a selected institution's service provider Test connection to a selected institution's card producer for image data Test image data generation to a selected institution's card producer The system also may provide a logging mechanism which can record activity within the system. The logging mechanism provides a reporting capability for review of log entries. The logging mechanism logs the following types of activity:

Security related events: login, logoff, incorrect login attempt, invalid page access New User Registrations Order Placement Approval Responses Application Start, Stop and Reset Program Errors Program Diagnostics and Performance Metrics As discussed above, the system is capable of supporting multiple, simultaneous users. The system maintains separate states, data and images for each simultaneous user. Simultaneous users shall be prevented from accessing the state, data or image of another user. In one exemplary embodiment, the system supports 100 simultaneous users per server and any number of servers may be present to handle the load providing acceptable responsiveness within the load capacity requirements set forth. Other embodiments contemplate larger numbers of users per server. On a high speed connection, acceptable responsiveness may be defined using the following guidelines:

Access to the main display within 1 second

Complete display of data-driven screens within 4 seconds

Complete display of image lists within 10 seconds

Figure 9:
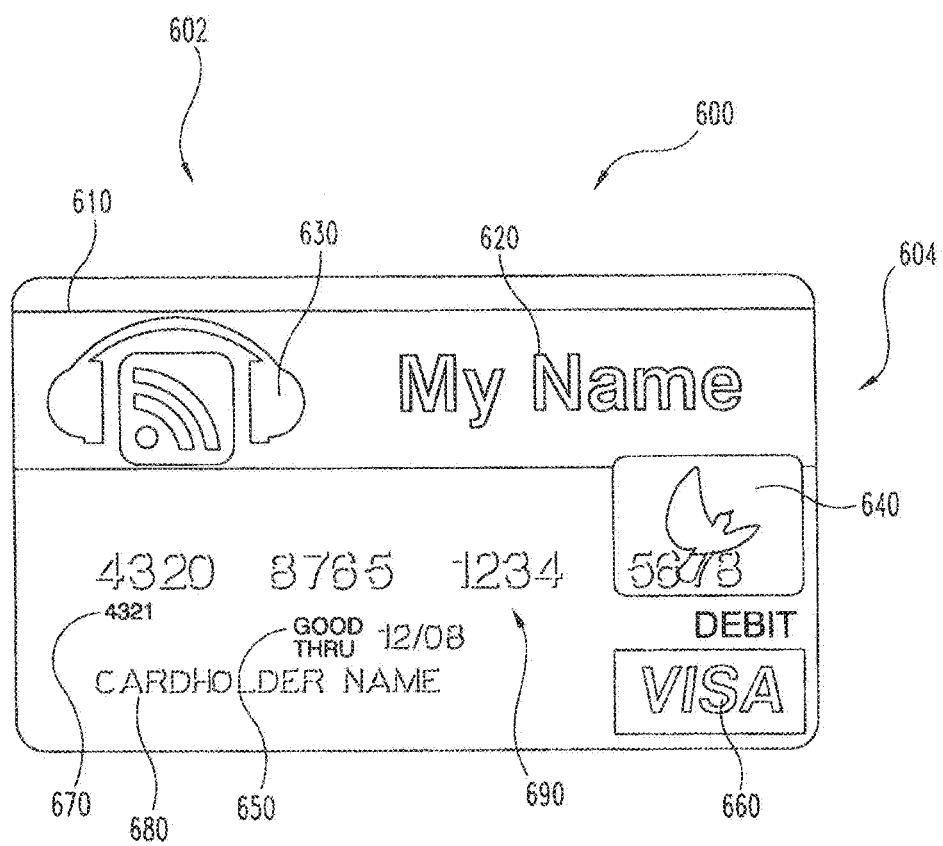
FIG. 9 is an illustrative view of a sample customized bank card.

With reference to FIG. 9, there is illustrated a customized bank card 600 created by the consumer card designer application. Customized bank card 600 includes user provided data 602 and payload provided data 604. In one form of the present application, user provided data 602 includes a card background image 610 and a user textual element 620 both selected and/or provided by the user. Payload provided data 604 includes a graphical logo 630, a brand hologram 640, good thru text 650, and a brand log 660 which are preferably provided from the financial institution's template. Payload provided data 604 further includes a BIN number 670, embossing lines 3 and 4 (cardholder name) 680, and a card number and expiration date 690 which are all preferably provided by the record. Customized bank card 600 is an illustrative embodiment and other forms of the present application recognize the customized bank card could include additional data, less customization, and/or the data could come from other locations then those illustrated above with reference to FIG. 9.

Figure 10:
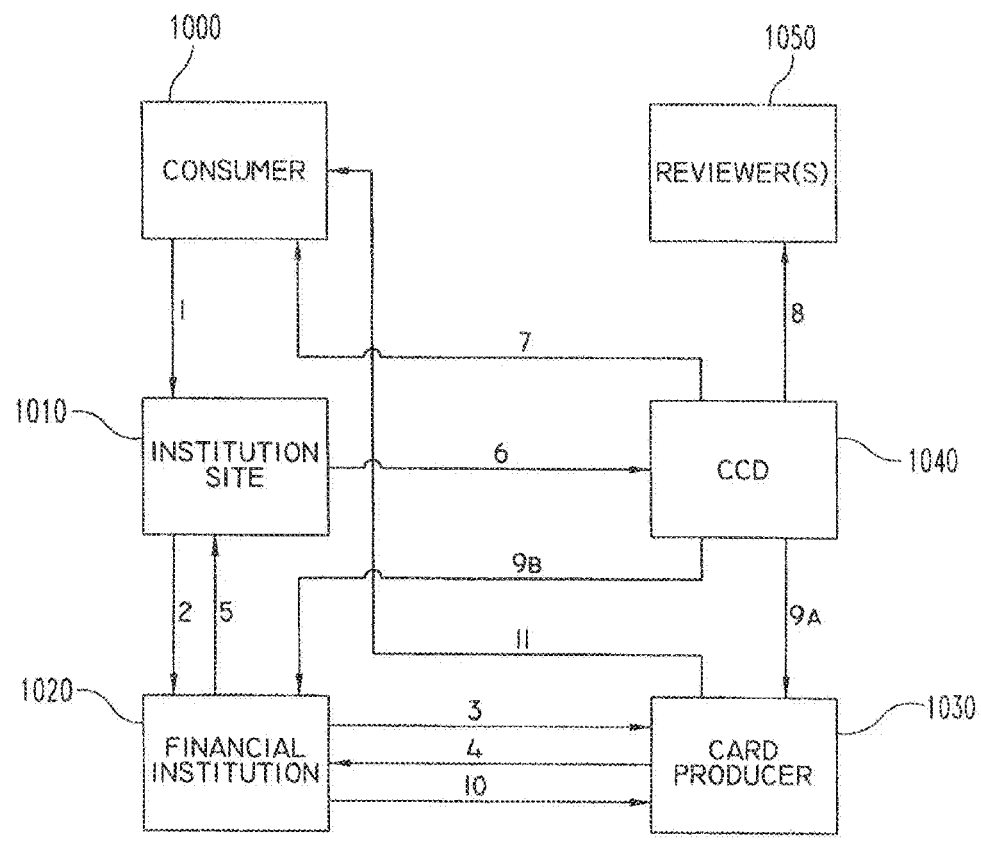
FIG. 10 is an illustrative process flow.

Referring now to FIG. 10, there is illustrated a process flow chart showing an implementation of the system utilizing a group of financial institutions or service providers collectively referred to as "Financial Institution". These groups or service providers typically provide the home banking solution to respective institutions and may also be a payment system aggregator; examples of these groups/providers include a Credit Union Service Organization and the Independent Community Bank Association. As shown in FIG. 10, the following events and data flows take place. This sequence shows only a complete success path and does not describe an aborted session or any failure paths.

1 Consumer/User (1000) visits the Institution's web site (home banking solution) (1010) and elects to begin a card design session associated with a specific card account.

2 Institution web site (1010) connects securely to Financial Institution (1020) and requests a URL or payload information relative to the card account identifier and primary or secondary cardholder.

3 Financial Institution (1020) connects securely to Card Producer (1030) and requests a fulfillment record including the account card brand type (VISA, MASTERCARD, AMERICAN EXPRESS, DISCOVER), Debit indicator, embossing lines 3 and 4 and the BIN number.

4 Card Producer (1030) returns the requested data to Financial Institution (1020).

5 Financial Institution (1020) constructs the URL/payload and returns it to the Institution web site (1010).

6 The user (1000) is redirected to Consumer Card Designer Application (1040) using the constructed URL/payload. The user (1000) interacts with Consumer Card Designer Application (1040) and produces a complete card design.

7 The user (1000) orders the card design and a confirmation e-mail is generated to the user (1000).

8 An alert e-mail is transmitted to the reviewer(s) (1050). The order is reviewed and approved.

9 a. The card design image is transmitted to the Card Producer (1030).

b. A Design Ready Message is sent to the Financial Institution (1020).

10 Financial Institution (1020) sends the embossing request to the Card Producer (1030) who then produces the card.

11 Card Producer (1030) delivers the physical printed card to the consumer.

Figure 11:
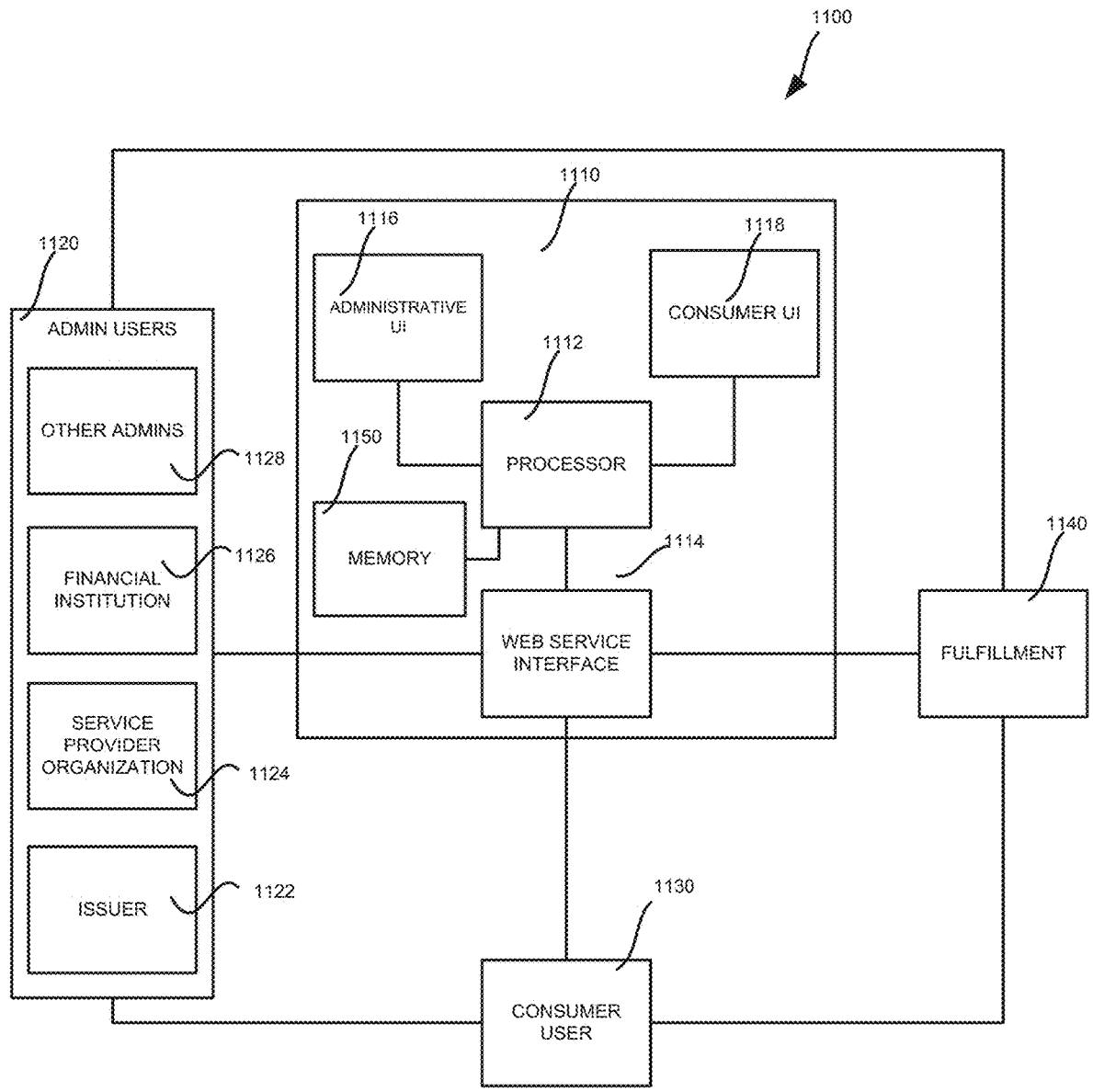
FIG. 11 is a schematic view of an embodiment of a card customization system.

With further reference to FIG. 11, another embodiment of a custom card design system 1100 is shown. The custom card design system may include a custom card design server 1110. The custom card design server 1110 may include a processor 1112 that is operable to control operation of the custom card design server 1110. The custom card design server 1110 may also include a web service interface 1114. The web service interface 1114 may provide system messaging capabilities to users of the customer card design system 1100 as will be described in greater detail below. In short, the web service interface 1114 may provide access to an administration user interface 1116 and/or a consumer user interface 1118. The respective user interfaces 1116 and 1118 may each facilitate different respective functionality of the custom card design server 1110. For example, the administrative user interface 1116 may allow an administrative user 1120 the ability to configure a consumer user interface 1118 accessible by a consumer user 1130, wherein the configuration is by way of customer contexts and/or product contexts defined in the administrative user interface 1116 by the administrative user 1120.

In this regard, the custom card design system 1100 may include one or more types of administrative users 1120 and one or more consumer users 1130. As shown the administrative users 1120 may include card issuers 1122, service provider organizations 1124, financial institutions 1126, or other appropriate administrative users 1128. The administrative user(s) 1120 may access the administrative user interface 1116 of the custom card design server 1110 by way of the web service interface 1114 to facilitate administrative tasks of the custom card design server 1110 as will be described in greater detail below.

For instance, the administrative user interface 1116 may allow administrative users 1120 the option to establish or select customer contexts and product contexts that may drive the appearance and/or functionality of the customer user interface 1118. The consumer user interface 1118 corresponding to the customer contexts and/or product contexts established or selected by the administrative user 1120 may be associated with a contextual parameter that is indicative of the customer context and/or product context. In this regard, consumer users 1130 may be provided a consumer user interface 1118 in a custom card design session based on the contextual parameter, which may be received by the custom card design server 1110 when the consumer user 1130 requests the consumer user interface 1118. In the custom card design session, the consumer user interface 1118 may be generated in part based on the customer and/or product contexts indicated by the contextual parameter received when the consumer user 1130 navigates to the custom card design server 1110. In turn, the consumer user 1130 may be operable to create a customized card design using the customer user interface 1118 that may be provided to a fulfillment processor 1140 for fulfillment of the customized card that may in turn be provided to the consumer user 1130 and/or a third party recipient (not shown in FIG. 11).

Figure 12:
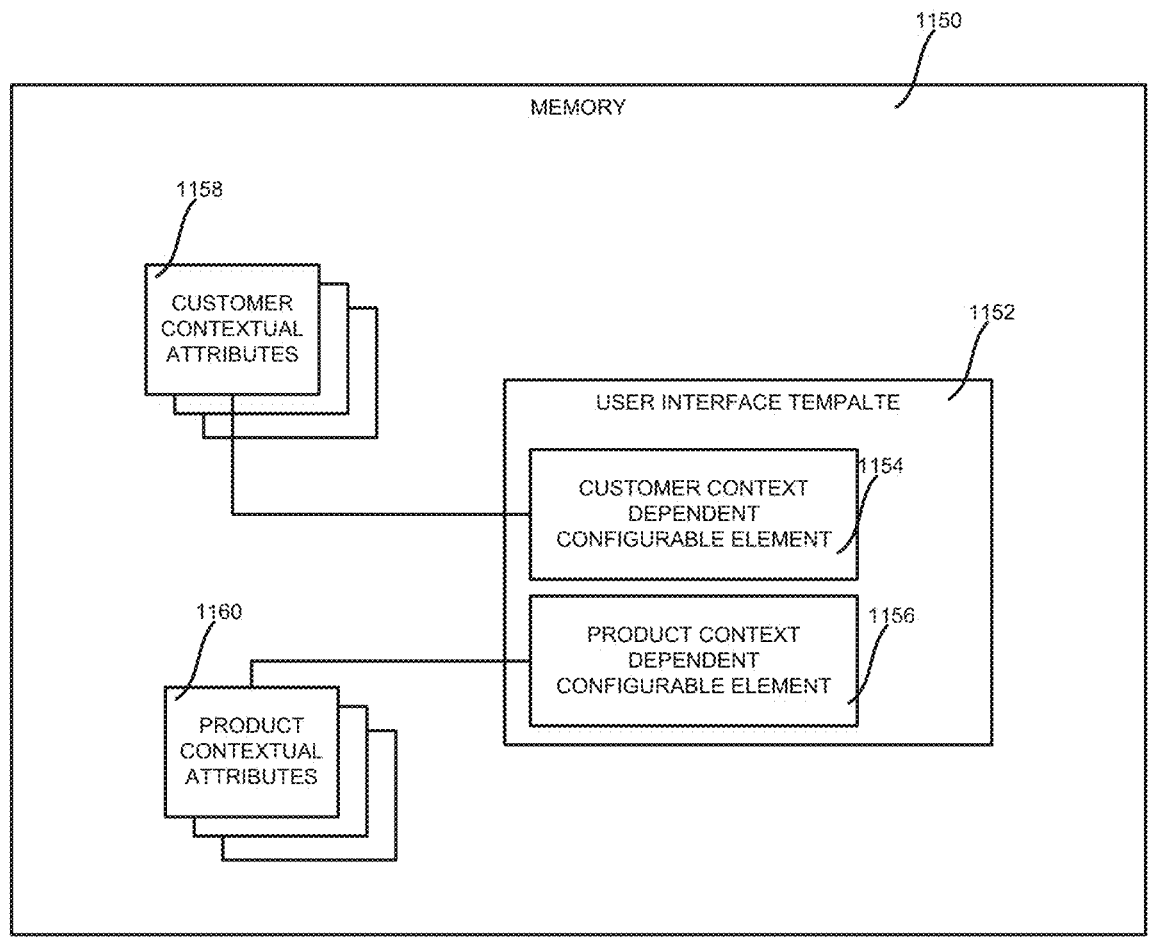
FIG. 12 is a schematic view of an embodiment of a memory of the card customization system of FIG. 11.

The custom card design server 1110 may also include a memory 1150. The memory 1150 may include a non-transitory computer readable medium that stores instructions executable by the processor 1112 to control the operation of the system 1100 as described herein. Additionally and with further reference to FIG. 12, the memory 1150 may store at least one user interface template 1152. The user interface template 1152 may include at least one customer context dependent configurable element 1154 and/or at least one product context dependent configurable element 1156. The memory 1150 may also include customer contextual attributes 1158 that are stored in corresponding relation to the at least one customer context dependent configurable element 1154. As may be appreciated in FIG. 12, each of the configurable elements 1154 and 1156 may have a plurality of contextual attributes 1158 or 1160, respectively, that may be used to configure the configurable element 1154 or 1156. In this regard, each of the customer contextual attributes 1158 may each correspond with a different customer context. The contextual attributes 1158 and 1160 may be generated by an administrative user 1120 and/or may include content (e.g., images, text, etc.) received from an administrative user 1120.

As such, for different respective customer contexts, one of the customer contextual attributes 1158 may be used to configure the customer context dependent configurable element 1154 to product a consumer user interface 1118. Similarly, the memory 1150 may also include product contextual attributes 1160 that are stored in corresponding relation to the at least one product context dependent configurable element 1156. Each of the product contextual attributes 1160 may each correspond with a different product context. As such, for different respective product contexts, one of the product contextual attributes 1160 may be used to configure the product context dependent configurable element 1156 to product a consumer user interface 1118. The configuration of a consumer user interface 1118 by way of configuring at least one customer context dependent configurable element 1154 and/or at least one product context dependent configurable element 1156 to generate a consumer user interface 1118 associated with a correspond customer context and/or product context will be discussed in greater detail below in relation to FIGS. 14-20. An embodiment of an administrative user interface 1116 that allows customer contextual attributes 1158 and/or product contextual attributes 1160 to be selected, established, and/or provided is described below in relation to FIGS. 22-30.

Figure 13:
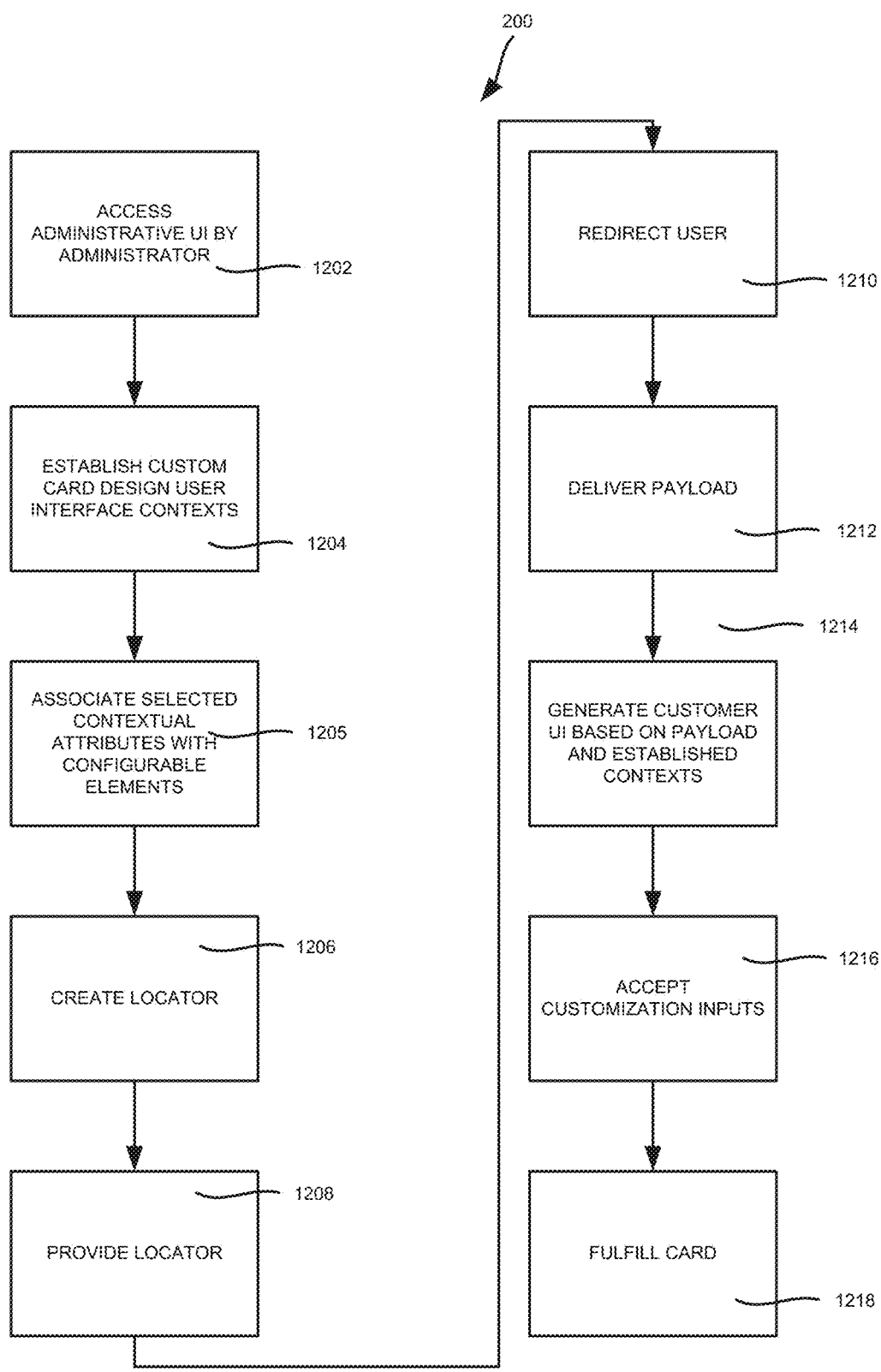
FIG. 13 is a flow chart depicting an embodiment of a method for card customization.

With further reference to FIG. 13, a method 1200 of operation of the custom card design system 1100 is shown. As such, in the description of the method 1200 of FIG. 13, reference will be made to the components of the system 1100 shown in FIGS. 11 and 12. However, it may be appreciated that the method 1200 may also be carried out with respect to systems that vary with respect to the system 1100. Accordingly, references to the system 1100 are for explanatory purposes only.

The method 1200 may include accessing 1202 the administrative user interface 1116 by an administrative user 1120. In this regard, the administrative user 1120 may establish 1204 a consumer user interface 1118 that includes one or more customer contexts and/or one or more product contexts. It may be appreciated that the establishing 1204 may include selection of a customer contextual attribute 1158 and/or a product contextual attribute 1160 from preconfigured contextual attributes and/or the establishing 1204 may include providing an attribute for configuration of a configurable element 1154 or 1156 (e.g., uploading an image such as a logo, background, or the like).

As referenced above, the establishing 1204 of the contexts of the consumer user interface 1118 may drive the appearance and/or functionality of the consumer user interface 1118 that may be presented to a consumer user 1130 of the system 1100. In this regard, an administrative user 1120 may select an associated contextual attribute 1158 and/or 1160 for one or more configurable elements 1154 and/or 1156 of a custom card design user interface template 1152. Accordingly, customer contextual attributes 1158 may include, for example, the selection and/or provision of images, themes, formatting instructions, color combinations, and the like, by the administrative user 1120 for use in determining the look-and-feel, functionality, and/or formatting of a consumer user interface 1118. Specifically, examples of customer contextual attributes 1158 may include but are not limited to selection of contextual attributes related to locale elements, language elements, and currency elements for a resulting consumer user interface 1118 that will be described in greater detail below. Other examples of customer contextual attributes 1158 include different images and/or templates used to affect the visual appearance of the customer user interface 1118. Other customer contextual attributes 1158 may include, for example, other selectable attributes such as the font, font size, font color, time and date conventions, available image libraries, card template designs, card customization options (e.g., zooming, panning, resizing, rotation, etc.), or the like. Further still, product contextual attributes 1160 including, for example, product types, available product fulfillment mechanisms, product packaging options, shopping cart options, order value options, order quantity options, and the like may also be selectable by an administrative user 1120.

In turn, the selections of an administrative user 1120 regarding the product contexts and/or customer contexts may be associated to a contextual parameter. The contextual parameter may be indicative of the customer contextual attributes 1158 and product contextual attributes 1160 established and/or selected by the administrative user 1120. As such, the contextual parameter may be received by the custom card design server 1110 (e.g., as will be described in greater detail below) used to retrieve the appropriate customer contextual attributes 1158 and/or product contextual attributes 1160 to generate a consumer user interface 1118 having the appropriate customer contexts and product contexts as defined by the administrative user 1120.

In any regard, the method 1200 may also include creating 1206 a locator related to the consumer user interface 1118 that was established 1204 by the administrative user 1120. In this regard, the locator may be operable to direct a consumer user 1130 to the custom card design server 1110 and may include the contextual parameter (e.g., as part of a payload that is delivered to the custom card design server 1110 when a user navigates to the server 1110). In any regard, because the contextual parameter may be provided to the server 1110 when a consumer user 1130 uses the locator to navigate to the custom card design server 1110, the consumer user 1130 may be provided with the configured consumer user interface 1118 that was established 1204 by the administrative user 1120 corresponding to the delivered contextual parameter. That is, the contextual parameter included in the locator may be indicative of the customer context(s) and/or product context(s) associated with the consumer user interface 1118 such that the custom card design server 1110 may generate the appropriate consumer user interface 1118 based on the contextual parameter received. In an example, the locator may be uniform resource locator (URL) that facilitates access to the consumer user interface 1118 of the consumer card design server 1110. In a specific embodiment, the locator may be an encrypted URL that prevents decrypting the URL provided to determine attributes of the resulting consumer user interface 1118. That is, the URL may not be used outside of the custom card design server 1110 to determine aspects of the consumer user interface 1118 based on the encryption of the URL that serves as the locator.

As noted above, the locator may be provided 1208 to a customer to facilitate access to a consumer user interface 1118 by the consumer user 1130 at the custom card design server 1110. For instance, the locator may be provided as a hyperlink on a web page (e.g., a web page maintained by an administrative user 1120, a customer of the administrative user 1120, or another entity). As an example, a retailer that wishes to sell customizable transaction cards may provide a hyperlink including a locator on a web page that is accessible by consumer users 1130. Accordingly, upon selection of the hyperlink by the consumer user 1130, the consumer user 1130 may be redirected 1210 from the web page of the retailer to a consumer user interface 1118 at the custom card design server 1110 that is configured in accord with customer contexts and/or product contexts specified by the retailer through the administrative user interface 1116. In connection with the redirection 1210 of the consumer user interface 1130 to the consumer user interface 1118, the method 1200 may also include delivery 1212 of a payload. The payload may be embedded in the locator or otherwise provided to the custom card design server 1110. The payload may include the contextual parameter that may be indicative of the customer context(s) and/or product context(s) for the consumer user interface 1118 to be presented to the consumer user 1130 once redirected 1210 by the locator. As such, upon receipt of the payload at the consumer card design server 1110, the method 1200 may include generation 1214 of the consumer user interface 1118 based on the contexts established 1204 by the administrative user 1120 as indicated by the contextual parameter.

As may be appreciated, different locators may be provided to different customers (e.g., different retailers) that each correspond to unique respective customer and/or product contexts. As such, a first retailer may generate one or more customer user interfaces 1118 based on a first customer context (e.g., including backgrounds, branding elements, and other configurable options in accord with the selections of the first retailer). A second retailer may generate one or more customer user interfaces 1118 based on a second customer context (e.g., including backgrounds, branding elements, and other configurable options in accord with the selections of the first retailer). In turn, each retailer may provide unique locators associated with the respective customer contexts on each retailer's respective web site. As such, when consumers select the locators at each respective retailer's website, the consumers may be directed to the custom card design server 1110. However, the custom card design server 1110 may generate and deliver different customer user interfaces 1118 to consumer users being redirected from each respective retailer's site based on the different customer contexts and/or product contexts as indicated by the locators for each respective retailer.

Furthermore, a single retailer may provide different locators corresponding to different customer contexts and/or product contexts on different websites based on different desired contexts for the users whom use the website. As an example, a large retailer may provide different contexts to users in different locales (e.g., different countries). Accordingly, a user of a retailer site in, for example, Norway, may be provided with a different locator than a user of the same retailer site in, for example, the United Kingdom. Thus, the customer contexts for each of the users in the different locales may differ.

In turn, the method 1200 may include accepting 1216 customization inputs from the consumer user 1130 by way of the consumer user interface 1118 related to customization of a card design. The accepting 1216 may include allowing the user to select the product type, packaging type, customization options (e.g., for the product and/or packaging), input custom text, upload images to be included on a card (e.g., as a logo or a card background), etc. Once the consumer user 1130 has completed the customized card design in the design session using the consumer user interface 1130, the custom card design may be provided to the fulfillment processor 1140 for fulfillment 1218 of the card. As will be described in greater detail below, the fulfillment 1218 of the card may be provided in a plurality of fulfillment mechanisms (e.g., by way of electronic delivery or physical delivery of the card).

Figure 14:
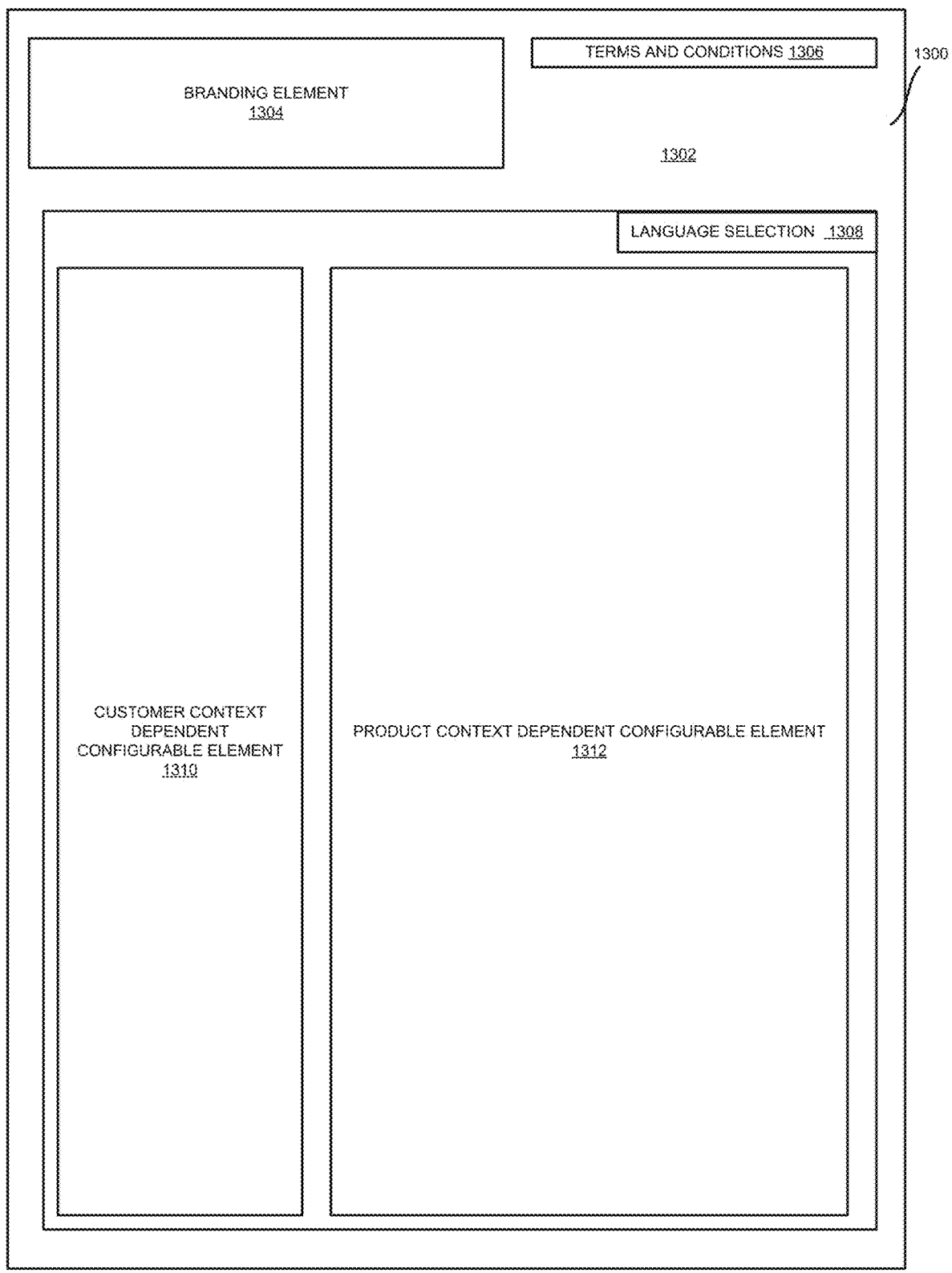
FIG. 14 is a schematic view of an embodiment of a custom card design session interface template having configurable elements that are configurable based on a preconfigured customer or product context.

Turning to FIG. 14, an embodiment of a custom card design session interface template 1300 is shown. The custom card design session interface template 1300 may include one or more configurable elements (e.g., elements 1302-1312).

The configurable elements 1302-1312 may each be configurable based on at least one of a customer context and/or a product context as described above. In this regard, for each configurable element, a plurality of contextual attributes 1158 and/or 1160 may be stored by the custom card design server 1110. The contextual attributes 1158 and/or 1160 may be selectable based on, for example, selection of a locale from a plurality of available locales, selection of a language from a plurality of stored languages, selection of a currency from a plurality of currencies, etc., or may be provided by an administrative user 1120 (e.g., a provided image or the like). Specifically, the template 1300 may include a background element 1302. The template 1300 may also include a branding element 1304. The template 1300 may further include a terms and conditions element 1306. Additionally, the template 1300 may include a language selection element 308. The template 300 may also include a customer dependent configurable element 1310 and a product context dependent configurable element 1312.

Figure 15:
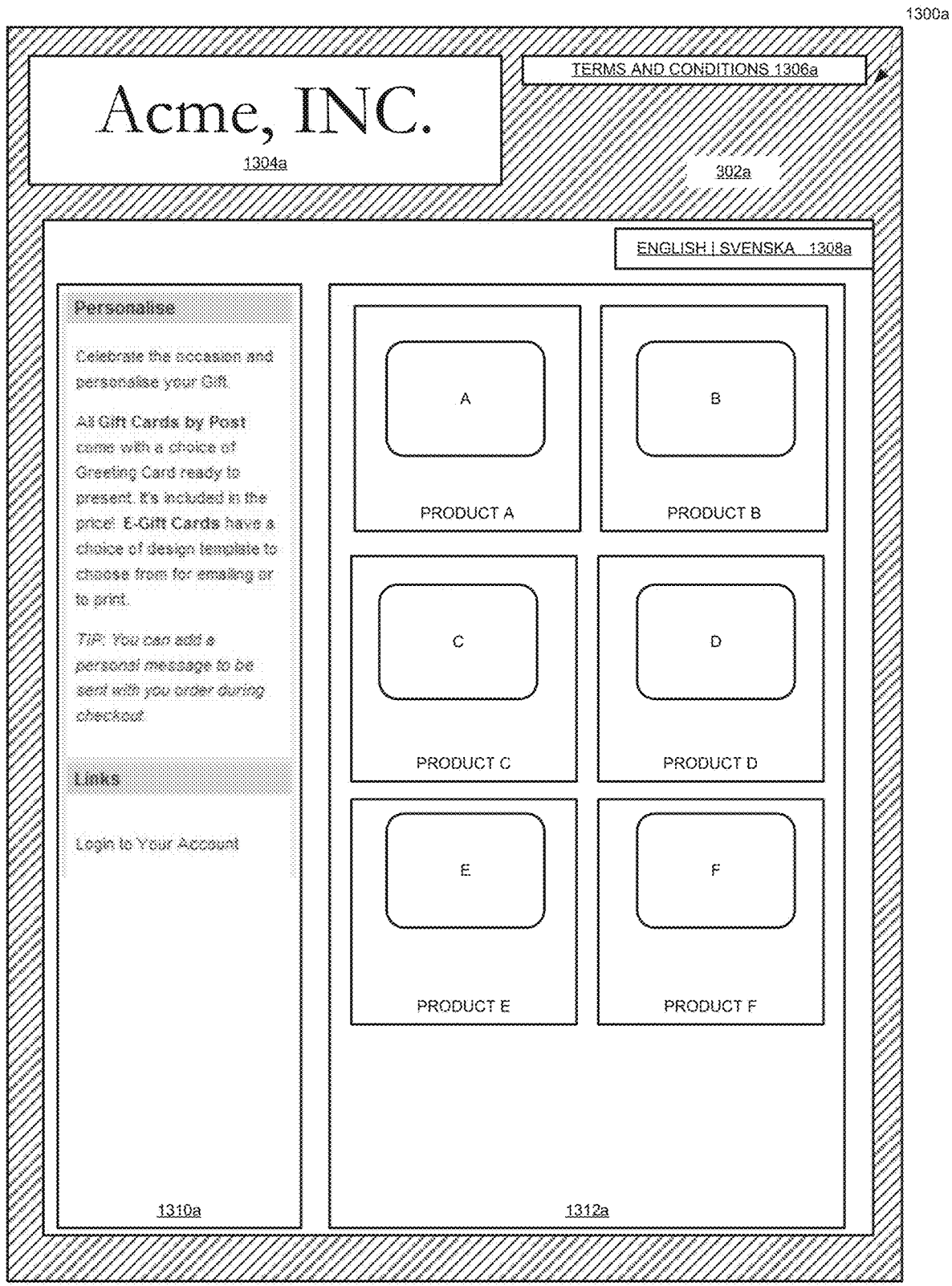
FIGS. 15 and 16 are screen shots of embodiments of a customer user interfaces with different respective configured configurable elements based on at least different respective customer contexts of the custom card design session interface template of FIG. 14.
Figure 16:
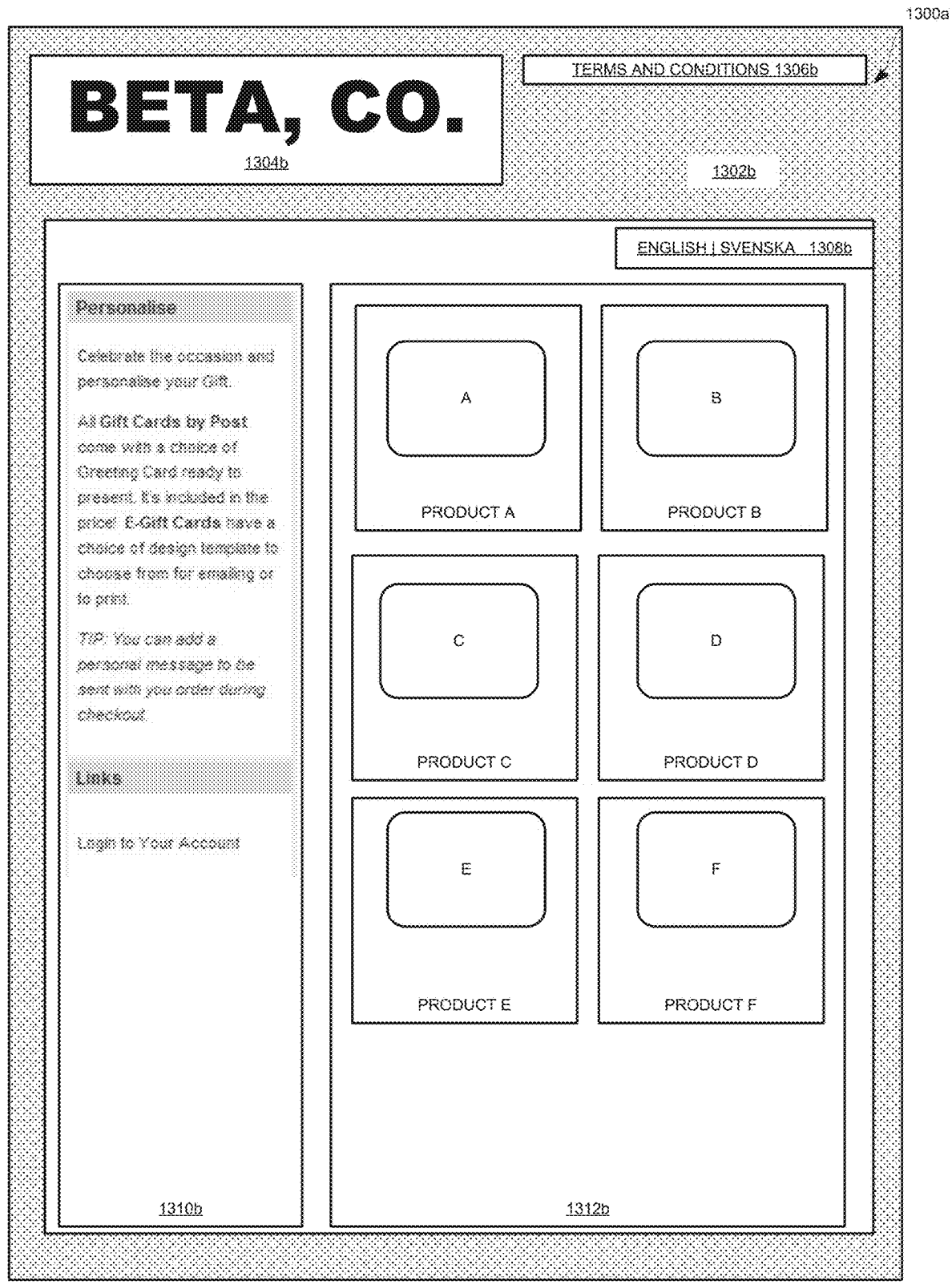

Furthering the example of FIG. 14, FIGS. 15 and 16 each include examples of configured customer user interfaces 1300a and 1300b that each correspond to the custom card design session interface template 1300, albeit with at least different respective customer contexts such that at least some of the configurable elements of the template 1300 are configured in different manners with respect to the interfaces 1300a and 1300b, respectively. For instance, as may be appreciated in FIG. 15, a first customer context associated with the consumer user interface 1300a may dictate the configuration of a background element 1302a as shown based on a customization parameter that indicates the customer context of the interface 1300a (e.g., the customer context may be associated with the background element 1302a provided and stored at the server 1110). With further reference to FIG. 16, a background element 1302b different than background element 1302a may be provided for template 1300b, which has a different customer context. That is, background element 1302b may be associated with the customer context associated with interface 1300b. Accordingly, the differing customer contexts of interfaces 1300a and 1300b result in the background element 1300 being configured differently for interfaces 1300a and 1300b as shown.

In the specific examples shown, the interface 1300a is in the context of an "Acme, Inc." branded site while the interface 1300b is in the context of a "BETA, CO." branded site. As such, for the customer context associated with interface 1300a, the branding element 1304a may be a logo associated with the customer context for the interface 1300a (i.e., an Acme, Inc. logo that was provided by an administrative user 1120 associated with Acme, Inc. through an administrative user interface 1116). Similarly, the branding element 1304b (i.e., a BETA, CO logo that was provided by an administrative user 1120 associated with BETA, CO. through an administrative user interface 1116) may be a different logo associated with the customer context for interface 1300b. That is, the custom card design server 1110 may store both logo 1304a and 1304b that are each associated with different corresponding customer contexts of the configurable branding element 1304 of the template 1300. As such, upon receipt of an indication that a design session is to be generated based on a customer context associated with Acme, Inc. (e.g., upon redirection of a consumer user 1130 from the Acme, Inc. website using a locator that includes an indication of the customer context associated with Acme, Inc.) the logo 1304a may be used to configure the configurable branding element 1304, while logo 1304b may be used to configure the configurable branding element 1304 upon receipt of an indication that a design session is to be generated on a customer context associated with BETA, CO. (e.g., upon redirection of a consumer user 1130 from the BETA, CO. website using a locator that includes an indication of the customer context associated with BETA, CO.). As such, the configurable background element 1302 and the configurable branding element 1304 may be examples of configurable elements that are configurable based on a consumer context of the session. Other examples include a terms and conditions configurable element 1306 and customer context dependent configurable element 1310, which will be described in greater detail below.

Further still, configurable elements that are configurable based on a product context may also be provided. For instance, product context dependent configurable element 1312 may be configurable based on a product context of the session that may be established by an administrative user 1120.

Figure 17:
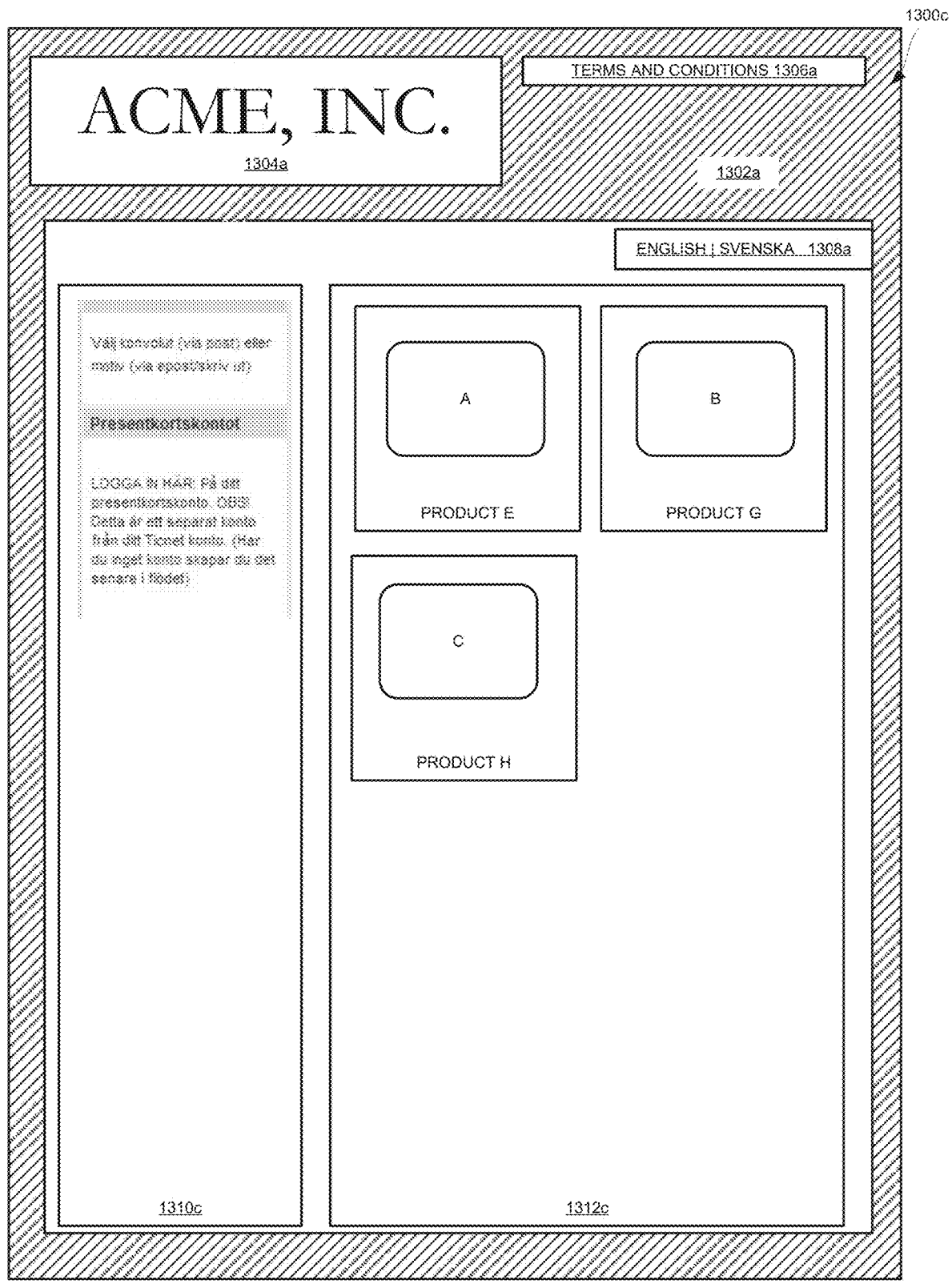
FIG. 17 is a screen shot of an embodiment of a customer user interface template with configured configurable elements based on at least different respective product context of the customer interface template of FIG. 15.

With further reference to FIG. 17 and as may be appreciated upon review of product context dependent configured elements 1312a and 1312c, it may be appreciated that the configured product context dependent configurable elements 1312a and 1312c may differ based on differing product contexts defined for user interface 1300a and 1300c, respectively. Furthermore, it may be appreciate upon review of FIG. 17 in view of FIG. 15 that a different product context may be provided to alter the product context dependent configurable element 1312 based upon differing product contexts while maintaining the customer context for the user interface. That is, user interface 1300c may differ from user interface 1300a in that certain ones of the configurable elements may be changed in view of differing product contexts for the user interface 1300c while maintaining certain customer context dependent attributes the same. Specifically as illustrated, configurable elements 1302a-1308a may remain constant for interface 1300c while configurable element 1312c may be altered based on a different product context for interface 1300c. Specifically, the product context associated with interface 1300a may include Products A-F, whereas the product context for the interface 1300c may include Products E, Product G, and Product H. In this regard, note that some products may be offered in both product contexts, such that differing product contexts do not per se require mutually exclusive product s to be offered to the consumer user 1130. In any regard, the customer context and product context may be provided independently such that upon establishment of a customer context, different product contexts may also be defined to alter a subset of the configurable elements without affecting the customer context dependent elements.

Figure 18:
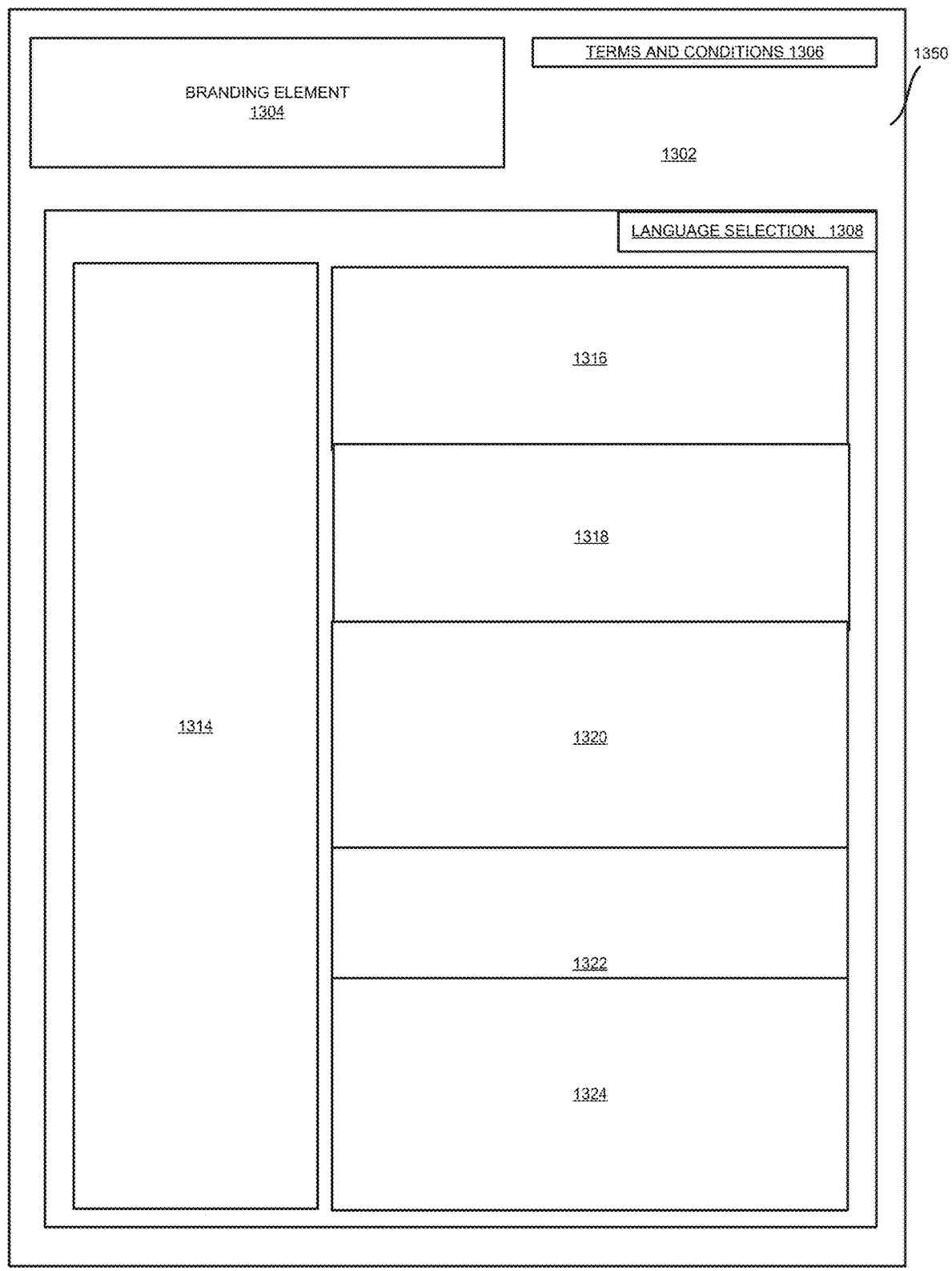
FIG. 18 is a screen shot of an embodiment of another embodiment of a custom card design session interface template with configurable elements.

With further reference to FIG. 18, a second page of a custom card design user interface template 1350 is shown. As may be appreciated, certain configurable elements may carry over from the first page of the custom card design user interface template 1300. For example, the branding element 1304, terms and conditions element 306, background image element 1302, and language selection element 1308, may all carry over to the second page of the template 1350. As such, a consistent user experience may be provided when navigating the custom card design session as at least some of the customer context dependent configurable elements may be the same for the first page of the template 1300 and the second page of the template 1350. The second page of the template 1350 may additionally include configurable elements 1314-1324.

Figure 19:
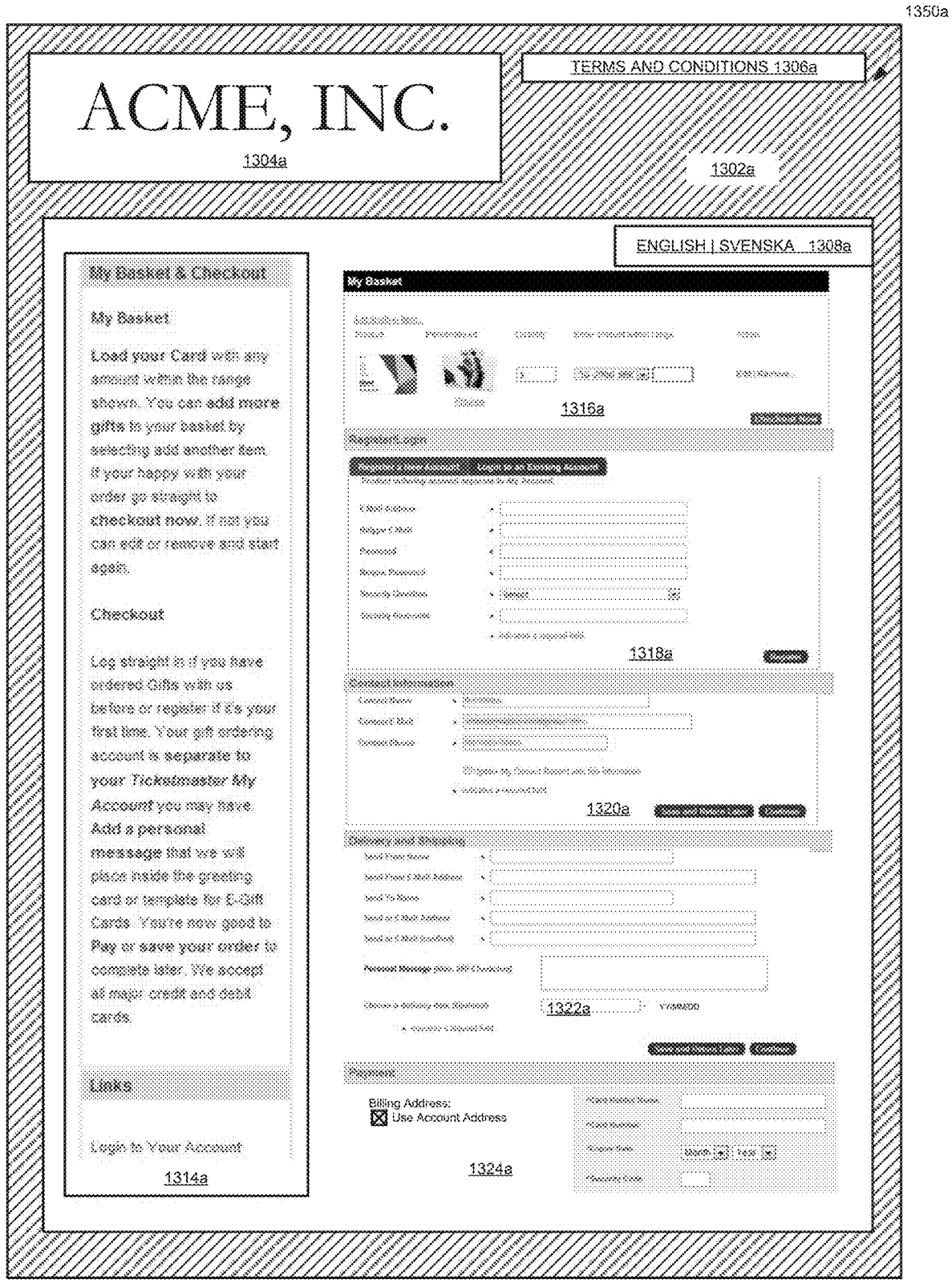
FIGS. 19 and 20 are screen shots of embodiments of a customer user interfaces with different respective configured configurable elements based on at least different respective customer contexts and product contexts of the custom card design session interface template of FIG. 18.
Figure 20:
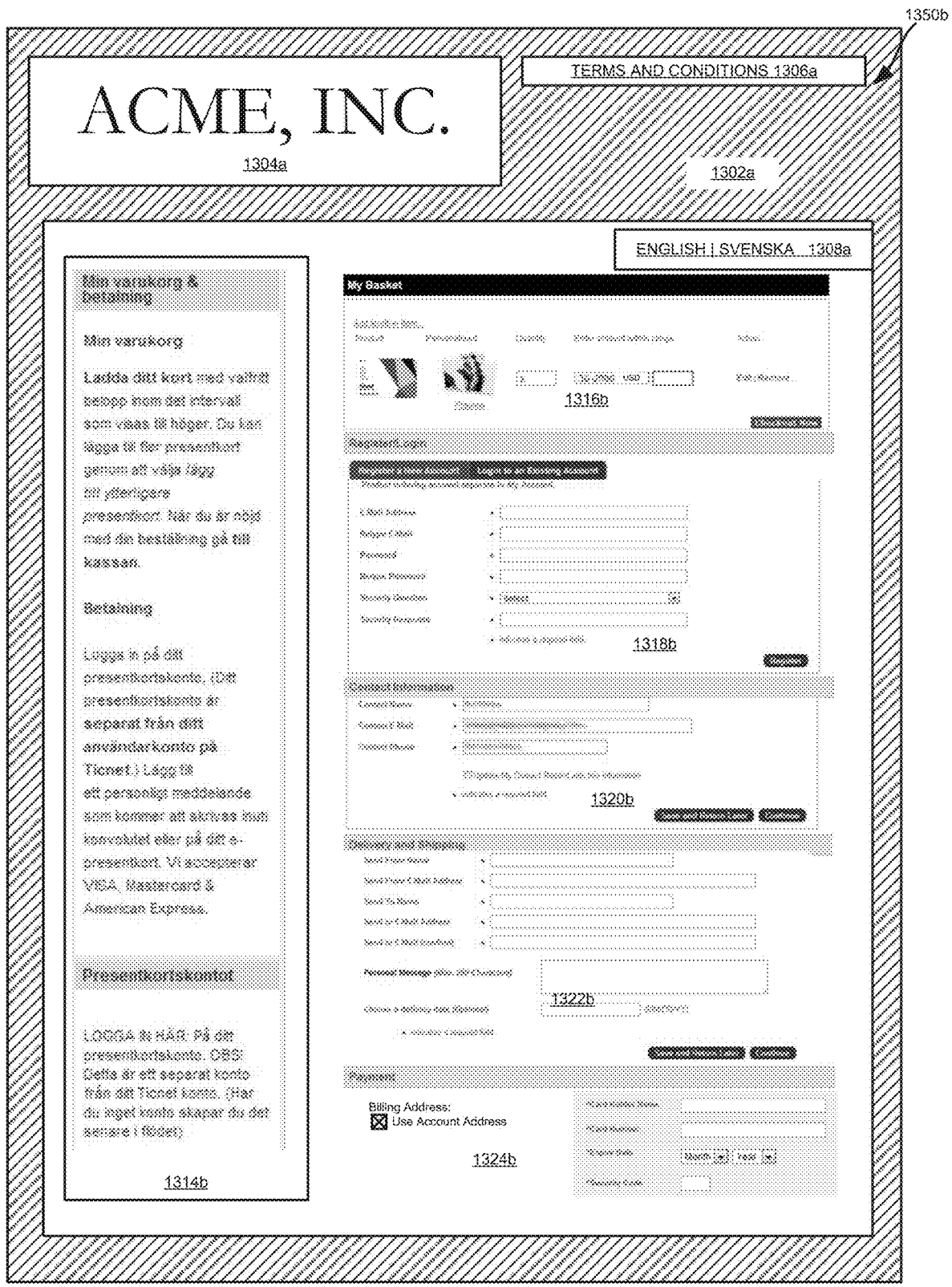

With further reference to FIGS. 19 and 20, which depict customer interfaces 1350a and 1350b both based on the second page of the template 1350, it may be appreciated that configurable elements 1316-1324 may differ with respect to different contexts provided for the interfaces 1350a and 1350b. For instance, elements 1316-1322 may depend upon a product context and/or a customer contest. For example, at least some of the configurable elements (e.g., any of the configurable elements previously described), may be provided with contexts associated with different locales, languages, and/or currencies. By way of specific example, an administrative user 1120 may desire to provide customers in different locations (e.g., different countries) the opportunity to engage with the custom card design server 1110 to generate a custom card design. Traditional approaches may require the administrative user 1120 to build custom card design interfaces tailored to each country that is mindful of differences based on differing locales. For instance, based on different postal systems in different locations, the fields in a billing address and/or shipping address may differ. Furthermore, changes in locales may provide further differences that should be accommodated for such as different number representations (e.g., differing use of punctuations such as comma and period delimiters in numerical values, etc.).

In this regard, by way of use of the custom card design interface template 1300/1350, an administrative user 1120 may simply specify a customer context that indicates a local for the user interface to be generated based on the template. As such, a plurality of different contextual attributes associated with different locales may be provided for use in configuring one or more of the configurable elements in the template 1300/1350. By way of specific example, the element may be based on a first customer context associated with a first locale. For instance, it may be appreciated that element 1322a includes a date format in the form of (YY/MM/DD), which may be the convention in the locale associated with the customer context of interface 1350a. However, the date format in element 1322b includes a date format in the form of (MM/DD/YY) associated with a different customer context than that of interface 1350a. In this regard, the differing customer contexts between interface 1350a and 1350b may result in differences related to locale conventions. The date format is simply an example of potential differences that could include differences in any other format, convention, or the like including, for example, different number format conventions, different time conventions, or the like.

Additional specific configurable elements may be provided. For instance, certain elements may comprise configurable language elements may be provided in the template 1300/1350. For instance, the element 1314 may be a language element. In this regard, rather than maintaining multiple consumer user interfaces, one for each language to be provided, element 1314 may include key words and/or phrases that are mapped to different languages. For instance, in element 1314a, key words may be provided, which in the English language are shown as represented in FIG. 19. Each of these key words may actually be placeholders that are mapped to corresponding phrases in different languages. As such, for the user interface 1350a, the customer context for the user interface 1300a may include a language element corresponding to the English language. The language may be selectable (e.g., by way of language selection element 1308). As may further be appreciated in FIG. 20, element 1314b may include text in the Swedish language. However, rather than having to provide the content of element 1314 in both languages, the administrative user 1120 may simply choose to provide a mapping to the respective Swedish and English language elements. In turn, the selection of the mapping of the language may be indicated by a customer context of the page or may be modified by the language selection element 1308.

Further still, currency options may be provided for different configurable elements. As such, one or more of the configurable elements may be currency elements. For example, based on a selected contextual attribute by the administrative user 1120, a currency element may be configured in accord with different currencies (e.g., US dollars, UK Pounds Sterling, Euros, etc.). As a specific example, element 1316a presents value amounts in terms of Swedish krona. In contrast, element 1316b may present value amounts in terms of US Dollars. Again, rather than having to reconstruct those elements requiring use of currencies, each option for different currencies may be provided as mapped contextual attributes that are simply selected by the administrative user 1120 when constructing the consumer user interface 1118 based on the template 1300/1350.

Further still, product contextual attributes 1160 may be stored that are used to configure product context dependent configurable elements 1156. For instance, with reference to product context dependent configurable element 1312 of the first page of the template 1300, at least one of Products A-F in element 1312a may correspond to a first product contextual attribute associated with an e-gift card (i.e., an electronically delivered representation of a customized card design). In turn, such a product context may be used to configure the product context dependent configuration element 1312a in the consumer user interface 1300a shown in FIG. 15. With further reference to FIG. 17, product configuration element 1312c may be configured based on a second product contextual attribute associated with a physically delivered customized gift card. That is, Products E, G, and H may be associated with physically delivered customized card products. In this specific example, the different product contexts may correspond with different mechanisms for fulfillment (e.g., electronic delivery versus physical delivery). As may be appreciated, the product context of a product selected by a consumer user 1130 may further dictate configurable elements in the consumer user interface. For instance, as shown in FIGS. 19 and 20, the delivery and shipping element 1322a and 1322b requests a name and e-mail address of the recipient. In the case of a physically delivered card, the delivery and shipping element 1322a and 1322b may request information related to a physical delivery address. Thus, the delivery and shipping element 1322 may be at least partially dependent upon the product context. As may be further appreciated, the delivery and shipping element 1322 may also be configured based on a customer context (e.g., recognizing that different locations may have differently formatted postal codes or the like). In this regard, delivery and shipping element 1322 may be dependent upon a product context as well as a customer context.

Also, it may be appreciated that Product E is shown in both interface 1300a and 1300c. As such, Product E may be fulfilled by way of either electronic delivery or physical delivery. It may be appreciated that at least some customization inputs for Product E may be the same regardless of the fulfillment mechanism chosen by the consumer user 1130. For instance, regardless of whether fulfilled by electronic delivery or physical delivery, the customization of the image (e.g., selection of a background, selection of a logo, manipulation of a background or logo, color selections, or other customization parameters) may be identical regardless of the fulfillment mechanism chosen.

It may also be appreciated that other variances in product contexts may be provided including, for example, layout options, card background image library options, approval routing (e.g., by whom the custom card design must be approved), ordering options (e.g., including order form fields, minimum order values, maximum order values, minimum item quantity, maximum item quantity, delivery date selection, etc.), shopping cart options, etc.

In turn, generation of new consumer user interfaces 1118 may be simplified for administrative users 1120 as the need to completely reprogram or recode the consumer user interface 1118 may be eliminated. Rather, the administrative user 1120 may simply originate a new customer user interface 1118 based on the custom card design user interface template 1300/1350 and specify the particular contextual attributes associated with the customer context(s) and/or product context(s) to be used for the specific page. Accordingly, for instance, the administrative user 1120 may efficiently generate new pages based on desired changes, expansion into new foreign markets, or other instances that require new consumer user interfaces 1118.

Figure 21:
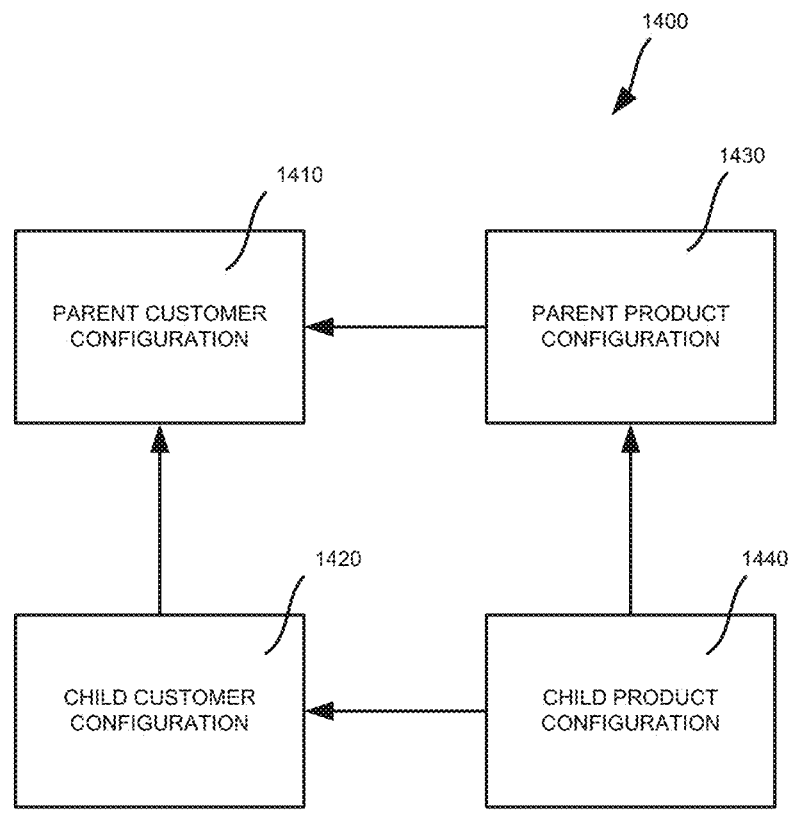
FIG. 21 is a schematic view of an embodiment of a configuration hierarchy for use in generation of customer contexts and product contexts of a custom card design session interface template.

In this regard, it may be that hierarchical relationships between different levels of customer contexts and/or between different levels of product contexts may be established. For instance, with additional reference to FIG. 21, a hierarchical structure 1400 is shown. In this regard, a parent customer configuration 1410 may be provided. A child customer configuration 1420 may inherit one or more customer contexts from the parent customer configuration. Also, a product configuration 1430 is provided. An inherited (i.e., child) product configuration 1440 is also shown that may inherit one or more product contexts from the product configuration 1430. As may be appreciated, the product configuration hierarchy of the parent product configuration 1430 and the inherited product configuration 1440 may be provided independently from the customer configuration hierarchy of the parent customer configuration 1410 and the child customer configuration 1420. That is, inheritance of customer contexts may not affect product contexts and/or inheritance of product contexts may not affect customer contexts. However, it may further be appreciated some elements may be affected by customer and/or product contexts.

Accordingly, when an administrative user 120 establishes a consumer user interface 1118, the administrative user 1120 may select the consumer user interface 1118 to inherit customer configurations and/or product configurations. This may assist in development of consumer user interfaces 1118. For instance, an entity providing custom card design capability in a number of countries may choose to expand the service to a new country of operation. That new country may have differing local specific attributes (e.g., postal addresses, name conventions, etc.) speak a different language, have a different currency, and/or have other differences that require changes to existing contexts of existing customer user interfaces 1118. However, certain attributes 1158 and/or 1160 of previously established consumer user interfaces 1118 may be carried over to the new consumer user interface 1118. In this regard, a new consumer user interface 1118 may be created that inherits attributes from another consumer user interface 1118 that is previously developed (i.e., a parent configuration). The newly established consumer interface 1118 may be in turn changed only with respect to those attributes for which the administrative user 1120 desires a change. For instance, a new language and currency may be employed while other attributes (including the background image 1302, branding element 1304, etc.) for other configurable elements remain unchanged. For instance, a product configuration from a parent configuration may be unchanged. The modification of a parent customer or product configuration may result in a new child configuration.

Figure 22:
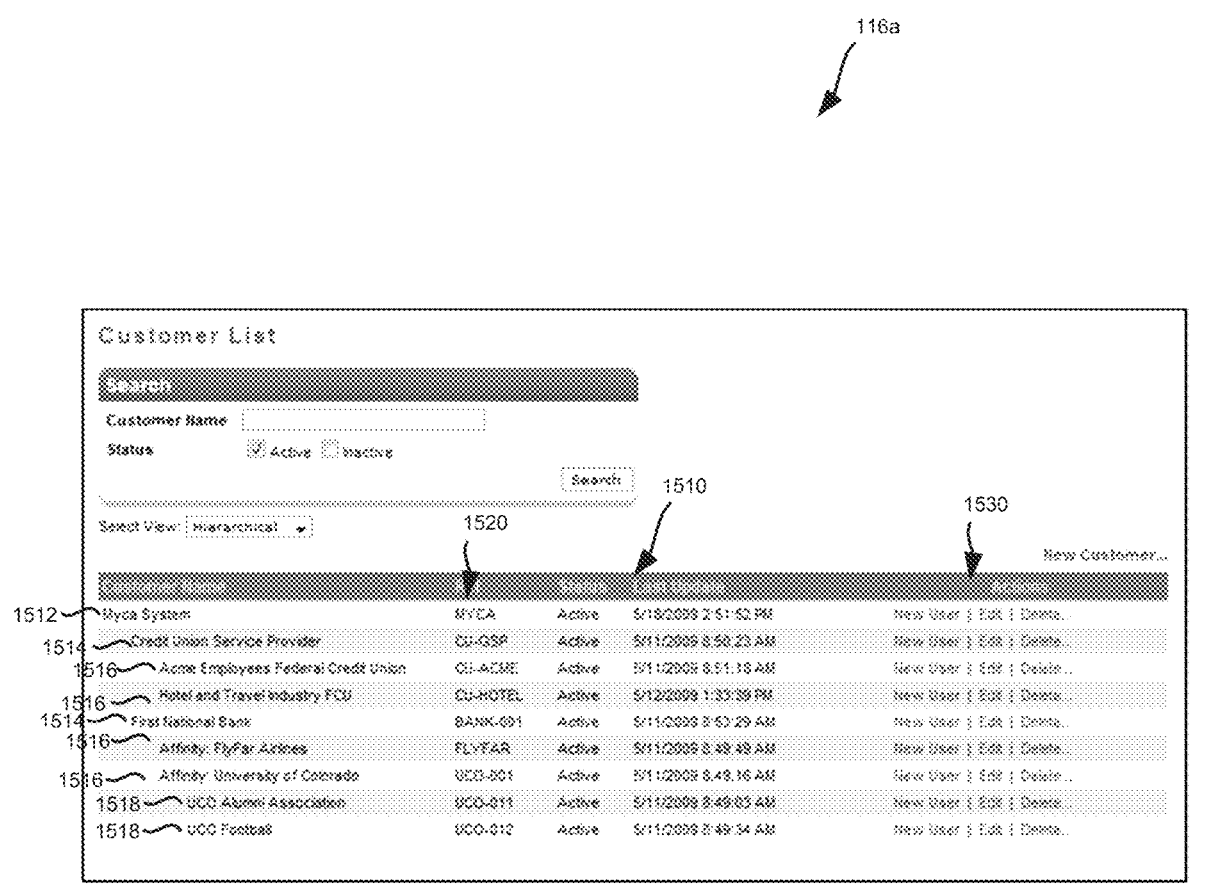
Figure 23:
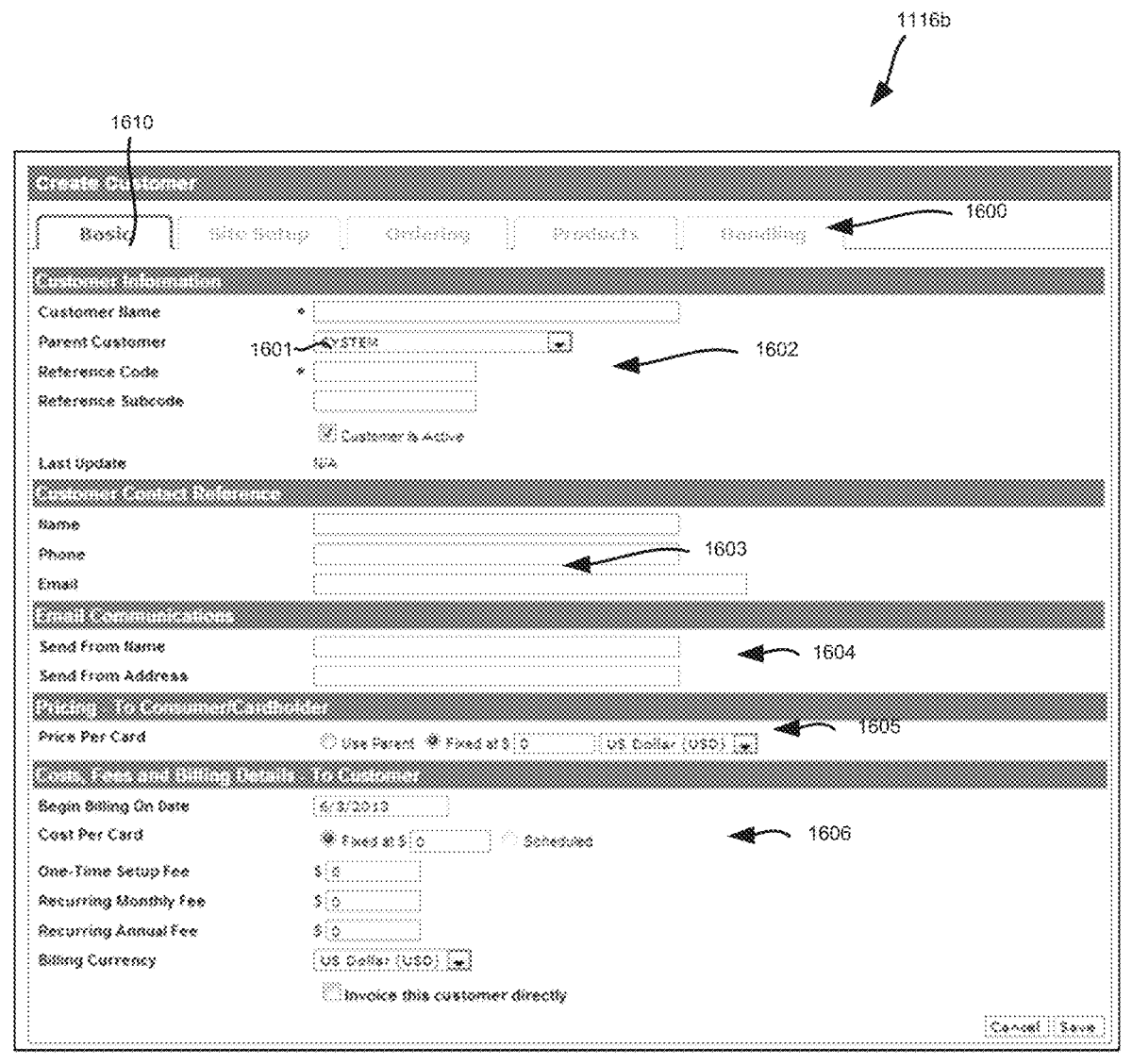

With further reference to FIGS. 22-30, various screen shots of portions an administrative user interface 1116 are depicted that further illustrate the establishment of a consumer user interface 1118. In FIG. 22, a first screen 1116a of the administrative user interface 1116 is shown. The first screen 1116a includes a hierarchical listing 1510 of customer contexts established for an embodiment of a system 1100. As may be appreciated, the hierarchical listing 1510 may have a plurality of levels of customer contexts 1512-1518. For instance, at a first level 1512, there may be a "Myca System" level customer context. This may be the parent customer context for all customer contexts provided in the hierarchical listing 1510. Thus, the contextual attributes associated with the "Myca System" context may be the default attributes for each child customer context provided in the hierarchical listing 1510. In this regard, second level customer contexts 1514 (e.g., for "Credit Union Service Provider" and "First National Bank" in the embodiment depicted) may inherit at least some customer contextual attributes from the parent context 1512 at the first level 1512. Furthermore, each of the second level contexts 1514 may alter at least some contextual attributes. As such, the inheritance and/or modification of contextual attributes in the hierarchical listing 1510 may continue to a third level 1516 and/or fourth level 1518 as shown in FIG. 22. The first screen 1116a may also provide a reference 1520 used to identify the various particular customer contexts contained in the hierarchical listing 1510. The first screen 1530 may also include a plurality of action buttons 1530 that may be used to add users, edit the context, and/or delete the context.

The administrative user interface 1116 shown in FIGS. 22-30 may be used to create and/or edit customer contexts for a consumer user interface 1116. It may be appreciated that for new customer contexts, each field discussed may be blank and/or populated from a default parent value once the parent context for a new customer context is established. Furthermore, when editing the customer context, the previously saved values for each contextual attribute may be shown to allow an administrative user 1120 to edit the contextual attributes.

In any regard, the administrative user interface 1116 may have a navigation bar 1600. The navigation bar 1600 may include tabs related to various aspects of the consumer user interface 1118. For example, in FIG. 23, the "Basic" tab 1610 is selected. In the basic tab 1610, basic customer information including a definition of the parent context 1601 may be provided. The parent context 1601 may be established for the customer context based on any parent and/or grandparent in the hierarchical listing 1510. That is, a customer context need not inherit contextual attributes from a direct parent. The basic tab 1610 may also include basic customer information fields 1602 that may be defined by the administrative user 1120 that may include, for example, a customer name, a reference code, and a selection as to whether the customer context is currently active. The basic tab 1610 may also include a customer contact reference 1603 that may be defined by the administrative user 1120. It may be appreciated the customer contact reference may correspond to the administrative user 1120 and/or be someone different than the administrative user 1120 establishing the customer context. The basic tab 1610 may also include an email communications field 1604 that allow the name and email address from communications originating from the system 1100 to be defined by the administrative user. The basic tab 1610 may also include consumer pricing options 1605 that may include a selection of a card price for a card designed by the consumer user 1130. That is, the price charged in addition to the value to be added to the card for the use of the custom card design system may be established. The card price selection may be definable by the administrative user 1120 and/or may be inherited from the contextual attribute of card pricing from the parent customer context. The basic tab 1610 may also include a customer billing field 1606 that dictates pricing conventions between a customer (e.g., a retailer, card issuer, or the like) and the custom card design system 1100. These values may include, for example, definitions of the price of each card, setup fees, recurring monthly/annual fees, and the desired billing currency to be used to bill the customer or use of the system. As such, it may be appreciated that these options may be defined by an administrative user 1120 associated with the custom card design system 1100 that may have different permissions than an administrative user 1120 of the customer.

Figure 24:
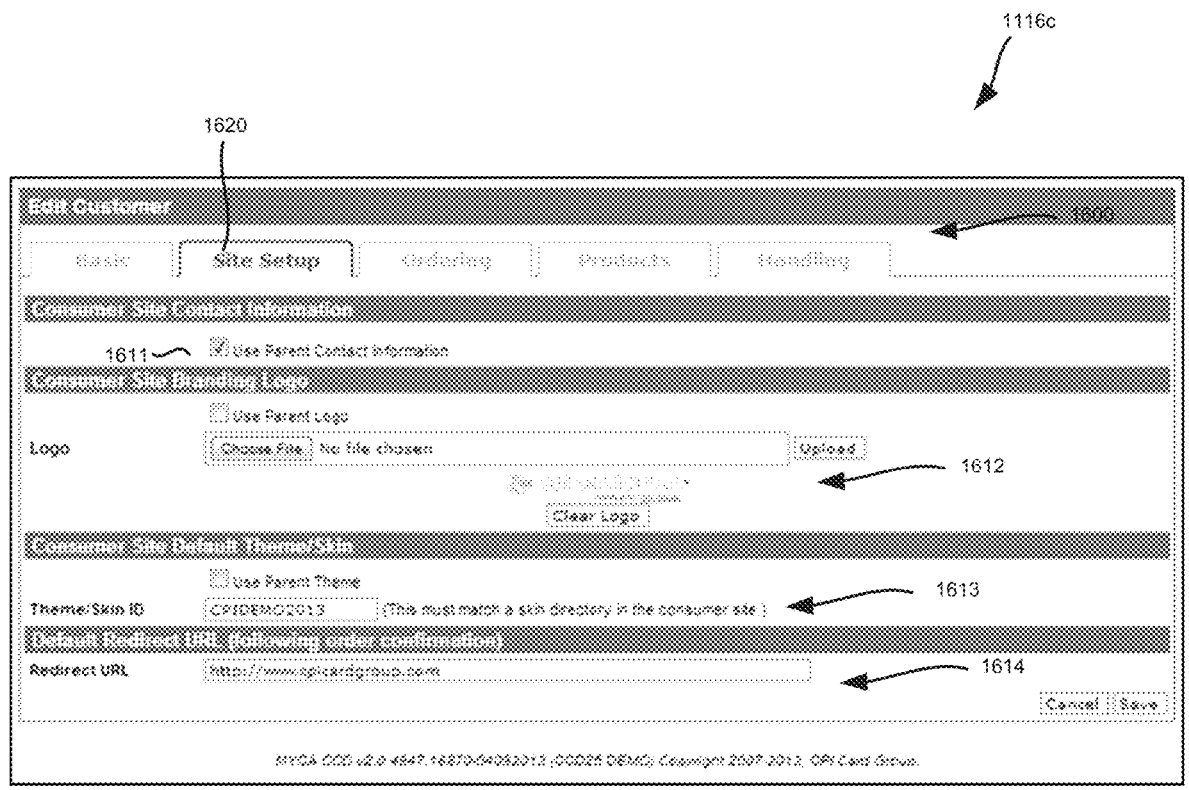

FIG. 24 depicts another screen 1116c of the administrative user interface 1116 corresponding to a "Site Setup" tab 1620. This tab may include a contact information selection field 1611 that allows the contact information provided on the site to be defined. As may be appreciated as shown, the contact information selection field 1611 may allow for inheritance from the parent customer context as shown. If different contact information for a child customer configuration is desired, such fields may be presented upon deselection of the option to use the parent information in the field 1611. The Site Setup tab 1620 may also include the branding element selection field 1612. For example, as shown above in relation to FIGS. 14-20, a branding element 1304 may be definable for presentation on a consumer user interface 1118. The branding element selection field 1612 may allow a customer contextual attribute to be associated with the branding element 1304. As may be appreciated, the parent attribute may be selected, or a different attribute (e.g., logo image or the like) may be uploaded for use.

Furthermore, a theme selection field 1613 may be presented. In this regard, a parent theme may be selected and/or a theme ID may be provided. The theme that is selected may include various different customer contextual attributes that may include, for example, a background element 1302, a specific locale element, language element, and/or currency element selections as described above. In an embodiment, the theme uploaded by the administrative user 1120 may be an hypertext markup language (HTML) style sheet that may define certain site attributes such as colors, fonts, font sizes, frames, or other attributes of the web page comprising the consumer user interface 1118. In this regard, an HTML style sheet in accord with the web site of the customer from which a consumer user 1130 is redirected may be used to maintain a physically uniform appearance of the consumer user interface 1118. As such, the theme that is selected may be generated to include a particular set of selected contextual attributes. The Site Setup tab 1620 may also include a redirect field 1614. The redirect field 1614 may allow an administrative user to define a location a customer is redirected upon completion of the custom card design using the custom card design system 1100. In this regard, the custom card design system 1100 may be integrated into a site of the administrative user 1120 such that the redirection to the custom card design system 1100 and redirection to the site of choosing of the administrative user 1120 is controlled to provide a relatively seamless user experience.

Figure 25:
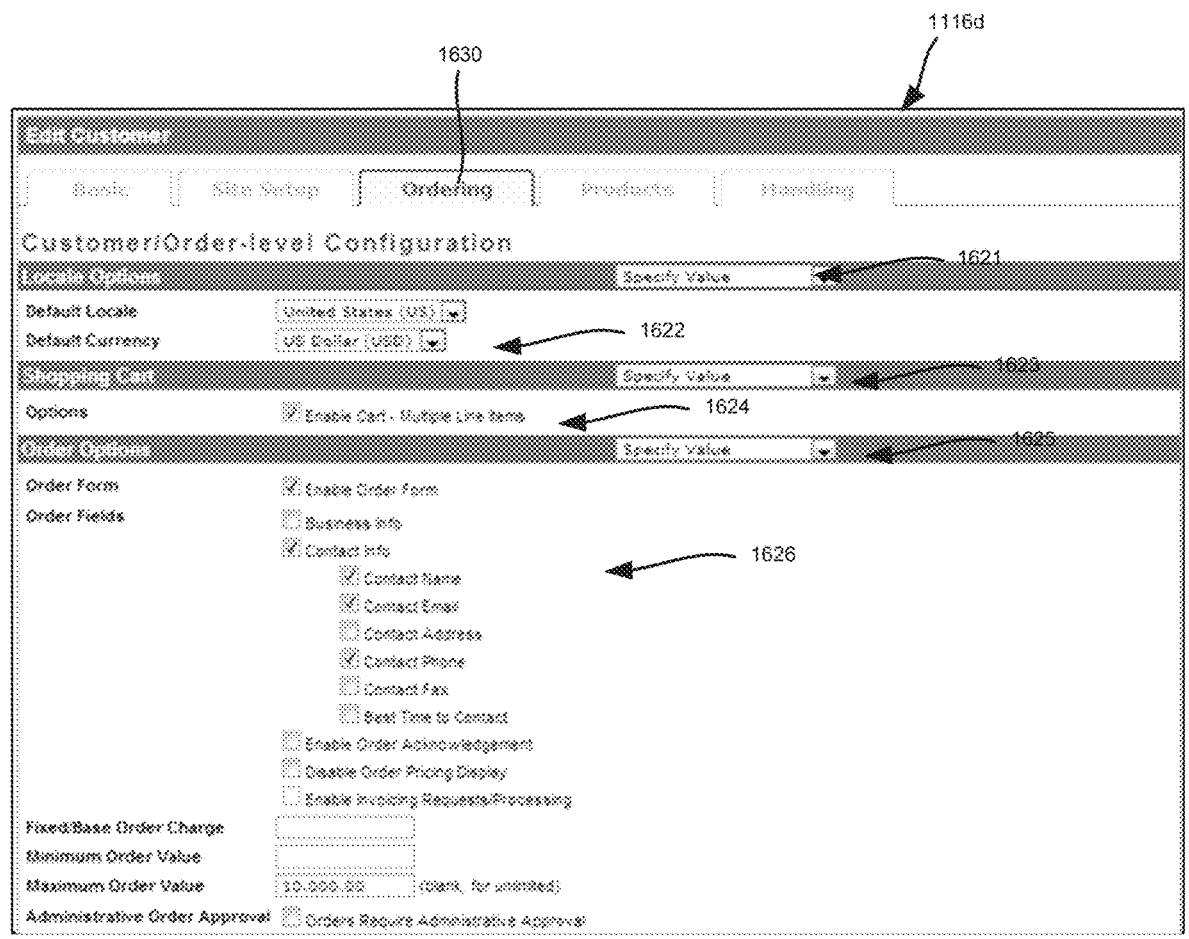
Figures 26A, 26B:
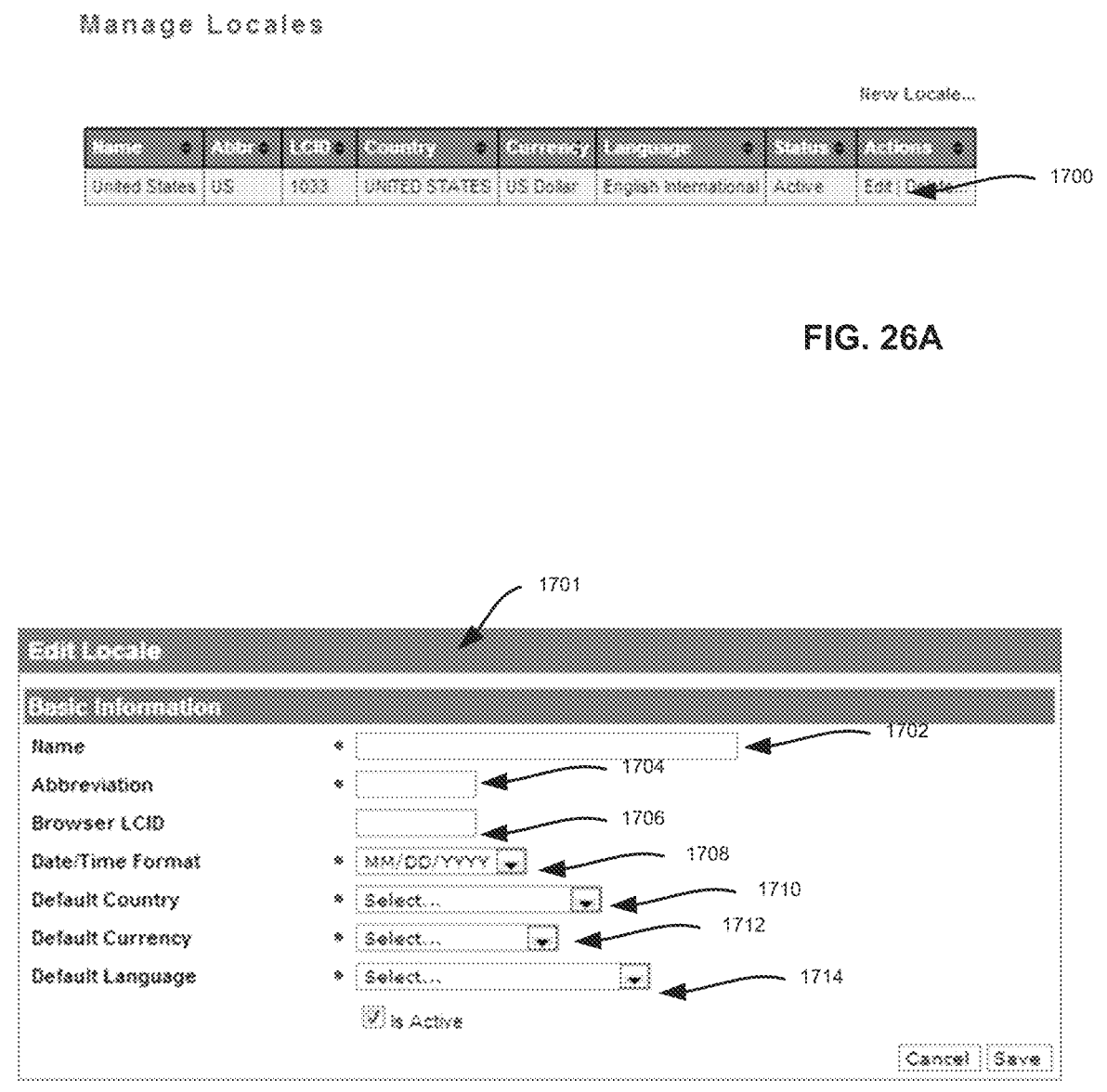

With further reference to FIG. 25, another screen 1116d is depicted shown an "Ordering" tab 1630. The Ordering tab 1630 may include a locale selection field 1621. The locale selection field 1621 may provide an option to select a locale, language, and/or currency defined in a parent customer context and/or provide a unique selection of such values in attribute selection fields 1622. With further reference to FIGS. 26A-27B, various additional administrative user interface screens are shown that may be used to manage and/or edit locale element attributes and/or currency element attributes. For instance, in FIG. 26A, a listing 1700 of selectable locales is shown. Accordingly, an administrative user 1120 may select from the listing 1700 when establishing a new or editing an existing customer user interface 1116. It may be appreciated that different administrative users 1120 may have different permission levels. For instance, while a first administrative user 1120 may have permission to establish a customer user interface 1116 by selecting a locale from the listing 1700, other administrative users 1120 may have permissions to establish and/or edit the locales 1700. In this regard, FIG. 26B depicts a screen 1701 for editing a locale. For instance, the screen 1701 may include the ability to provide a locale name 1702, a locale abbreviation 1704, a date/time format 1708 for use with the locale, a country 1710 associated with the locale, a currency 1712 associated with the locale, and a language associated with the locale 1714. It may be appreciated that locales are not strictly tied to geographic regions. For instance, a first locale for Spanish speaking users in the United States may be established where the language associated with the locale 1714 is Spanish and another locale for English speaking users in the United States may be established with identical characteristics with the exception of the language associated with the locale 1714 being English. The context in which either locale is used may be dictated upon a contextual parameter (e.g., whether the user is directed from a retailer's Spanish language site or English language site). Furthermore, some attributes may be dictated by the consumer user 1130. For example, a language may be selected in a language selection element 1308. However, the available languages to be selectable in the language selection element 1308 may be determined by an administrative user 1120. The screen 1701 may also allow for a browser LCID to be defined. As such, at least a portion of the attributes for the locale may be dictated by the locale parameters associated with the browser.

With further reference to FIGS. 27A and 27B, a listing of available currencies 1800 is shown in FIG. 27A. FIG. 27B shows a screen 1801 for editing a currency. As may be appreciated, parameters associated with the currency may include a name 1802, an abbreviation 1804, a symbol 1806 for use in representing the currency, and a conversion rate 1808 relative to US dollars. A user may be able to select the conversion rate 1808 be automatically updated (e.g., through an external call to an API or the like).

Returning to FIG. 25, the Ordering tab 1630 may also include a shopping cart field 1623 that may allow an administrative user 1120 to specify contextual attributes related to the provision and/or behavior of a shopping cart in the customer user interface 1118. As may be appreciated, the shopping card field 1623 may be populated based on a parent customer context and/or may have specific shopping cart attributes defined in field 1624. The Ordering tab 1630 may also include an order options field 1625. The order options field 1625 may be populated with parent contextual attributes and/or specific values for an attribute, as an example, use of an order form, selection of order fields, selection of ordering charges, establishment of minimum and/or maximum order values, and/or requirement for order approval may be selected.

Figure 28:
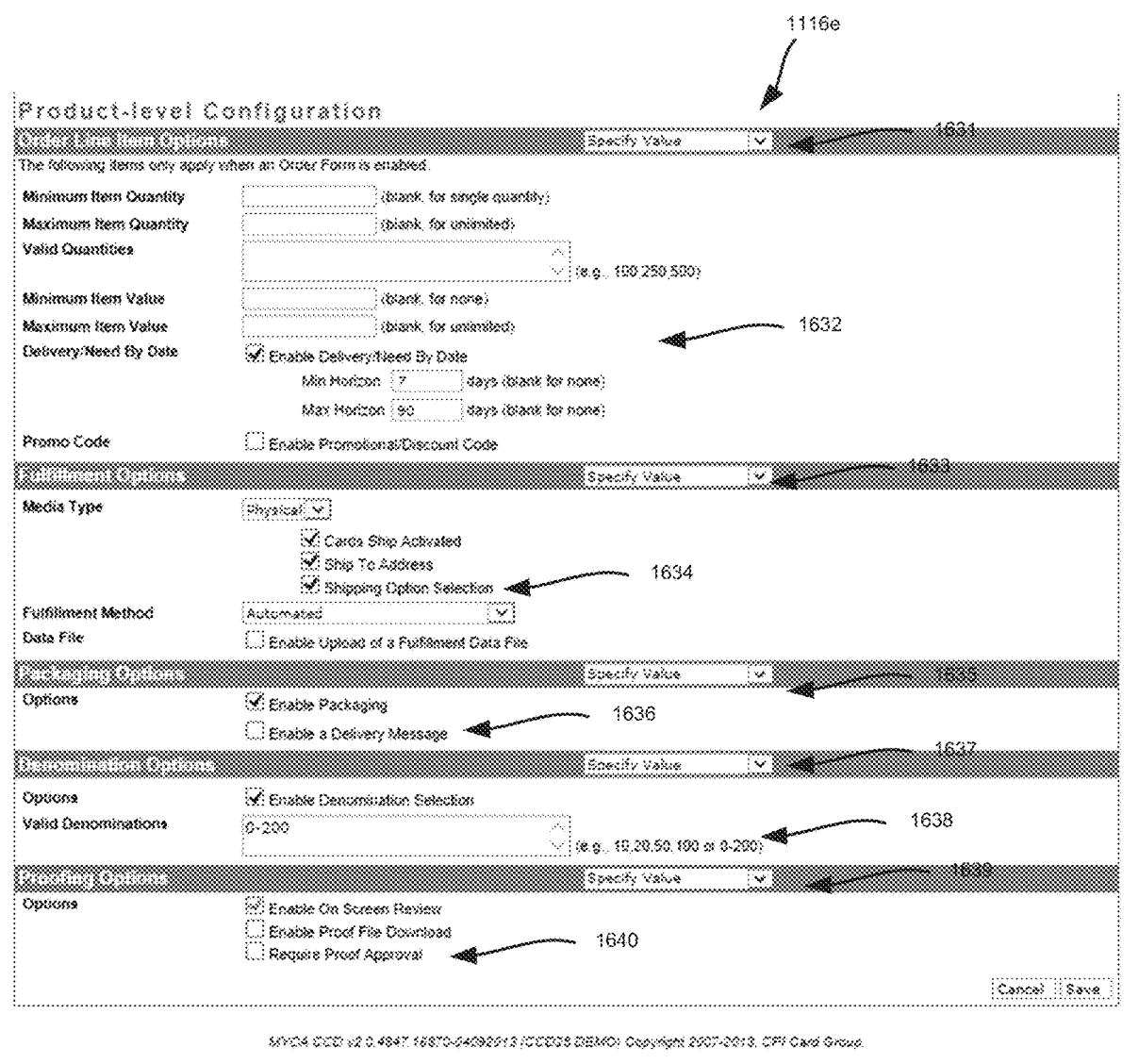
Figure 29:
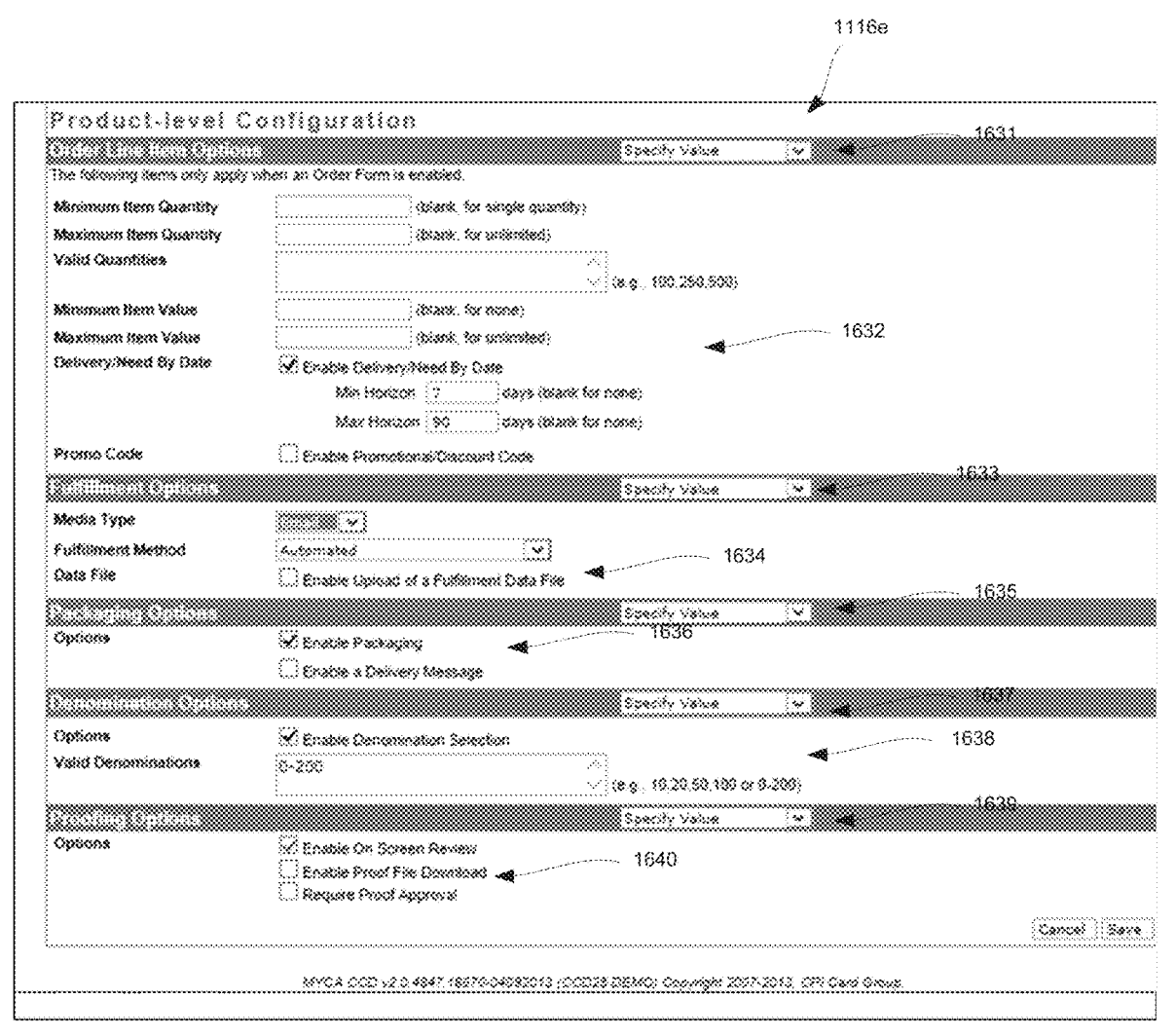

With further reference to FIGS. 28 and 29, an additional screen 1116e is shown with further options that may be present in the Ordering tab 1630. The screen 1116e may include product contextual attribute values for presentation in a customer user interface 1118. For instance, an order line item options field 1631 may be provided. The line item option attributes 1632 may be inherited from a parent customer context or product context or may be specifically defined in the line item options field 1631. Some line item option attributes 1632 that may be selectable by the administrative user 1120 may include, for example, a minimum and/or maximum item quantity values, valid quantity increments, minimum and/or maximum item values, delivery date requirements, and the availability of a promotional code entry field.

The Ordering tab 1630 may also allow an administrative user 1120 to select fulfillment options in the fulfillment options field 1633. The fulfillment attributes 1634 may be defined based on a parent context and/or specified uniquely by an administrative user. As shown in FIG. 28, one fulfillment option in that may be selected in the fulfillment attributes 1634 is the media type associated with the fulfillment mechanism for the card. For example, as shown in FIG. 28, the fulfillment mechanism selected is fulfillment by way of a physical card. As such, further options such as whether cards are to shipped in an activated state, whether a ship-to address may be provided, and whether various shipping options are to be displayed may be selected. Furthermore, selections of a fulfillment method selection and/or whether a fulfillment data file may be uploaded are provided in the fulfillment attributes 1634. With further reference to FIG. 29, another fulfillment mechanism selectable in the fulfillment attributes 1634 is a media type of email for a card fulfillment mechanism. In this regard, upon selection of email fulfillment as the fulfillment mechanism in the fulfillment attributes 1634, an egift card where a representation of the customized card is provided to the recipient in an email. As may be appreciated, other options in the customer and/or product context may be the same regardless of the fulfillment type. For instance, regardless of whether the fulfillment mechanism is by way of a physical card or an email, the customization of the card may be the same. Accordingly, the customization of the card may be identical for either fulfillment mechanism with only the mechanism used for delivery changing based on the selection of the fulfillment mechanism in the fulfillment attributes.

Furthermore, the Ordering tab 1630 may include a packaging options field 1635. The packaging options field 1635 may include packaging attribute selections 1636. The packaging attribute selection may include enabling the customer to select packaging to accompanying the fulfillment of the card and/or enabling the customer to provide a delivery message. The Ordering tab 1630 may further include a denomination field 1637 that may allow selection of valid denominations in demonization attribute fields 1638. Again, the values for the denomination attribute fields 1638 may be inherited from a parent context or specified uniquely for the customer context being created and/or edited. The Options tab 1630 may also include a proofing options field 1639 with proofing attribute selections 1640. The proofing attribute selections 1640 may include selections as to whether on screen review is provided, whether proof file downloading is enabled, and whether proof approval is required. The proofing attribute selections 1640 may be based on a parent context or specifically defined for the customer content being created and/or edited.

The Ordering tab 1630 may also allow an administrative user 1120 to select customization options to be presented to a consumer user 1130 for use in customization of a card. For example, there may also be presented to an administrative user 1120 an option as to whether to enable modifications to an attribute received from a consumer user 1130. For example, transparency modification may be enabled that may convert white background in an image to a transparent background for improved rendering of the image on the customized card. Furthermore, color matching where the color of text of the customized card may be matched to a color in an uploaded image or the like. Alternatively, the administrative user 1120 may have the option of whether to present to the consumer user 1130 a color selection palate (e.g., a color wheel or the like) to allow for color selection of various customizable parameters of the card design.

Figure 30:
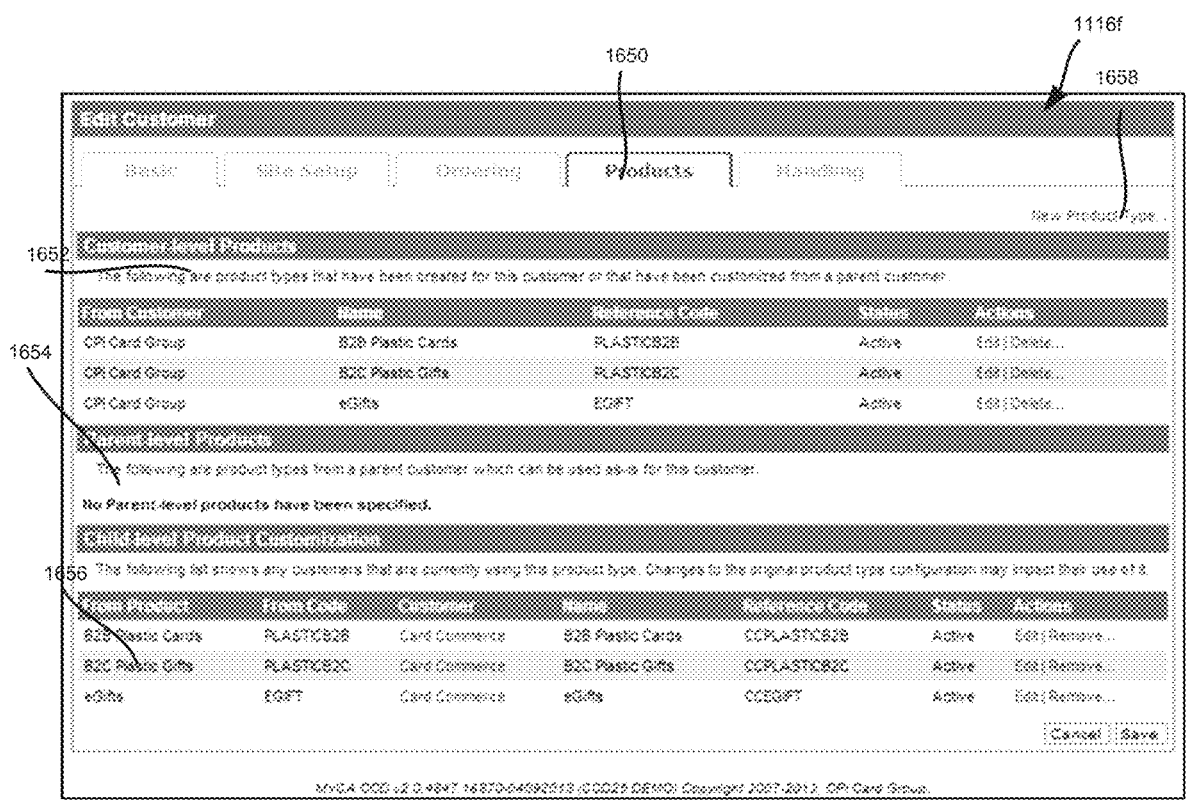

With additional reference to FIG. 30, a Products tab 1650 is shown that displays the product contexts that are associated with a particular customer and/or family member of the customer. The Products tab 1650 may include a listing of customer-level products 1652 that displays the product contexts specific to the customer context being created and/or edited (e.g., product contexts that have been modified from parent customer contexts). The Products tab 1650 also shows a listing of parent-level products 1654 that includes product contexts taken directly from a parent customer context that have not been modified. The Products tab 1650 also includes child-level product customizations 1656 that utilize the product contexts associated with the customer being created and/or edited. In this regard, the child customers utilizing the product contexts of the customer are shown that may be affected upon modification of the product contexts associated with the customer context being created and/or edited. That is, because the child customer contexts may inherit the product contexts of the customer context being edited, upon modification of the product context, the child contexts may be affected. Furthermore, the Products tab 1650 may include a selection to create new product context 1658. As may be appreciated, the new product context may be created based on a preexisting product context, a product context modified for use with a parent customer context, or a product context developed for the customer context.

Accordingly, the administrative user interface 1116 may be utilized to configure consumer user interfaces 1118 by selection of desired contextual attributes by an administrative user 1120. In an embodiment, the administrative user interface 1116 may also include the ability of an administrative user 1120 to automatically generate a consumer user interface 1116. For example, an administrative user 1120 may select the appropriate contexts for a consumer user interface 1116 as described above. The user may then be provided an option to automatically generate a corresponding user interface 1116 (e.g., without following a locator or being redirected to the custom card design server). This option may be an explicit privilege that may or may not be provided to all administrative users 1120. As such, an administrative user 1120 may utilize the automatic generation feature to quickly verify how a consumer user interface 1116 that the administrative user 1120 creates will be generated for presentation to a consumer user 1130. Accordingly, should the administrative user 1120 wish to change the consumer user interface 1116, the administrative user 1120 may do so and again automatically generate the consumer user interface 1116 directly from the administrative user interface 1118.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for generating a custom card design web page user interface for a custom card design session executed by a processor of a custom card design server, comprising:
   maintaining, in a memory of a custom card design server, a custom card design session interface template comprising at least a first configurable element that is configurable by the processor of the custom card design server to produce the custom card design web page user interface, wherein the custom card design session interface template supports functionality for generating a custom card design through a card providing organization by user interaction therewith, wherein the memory of the custom card design server includes a plurality of organization specific configurations for the first configurable element, wherein each of the organization specific configurations define the functionality of the custom card design session for creation of the customized card design through a respective card providing organization;
   correlating, through an administrative user interface accessible by an administrative user of a card providing organization of the different card providing organizations, the first configurable element to a plurality of preconfigured selectable product contextual attributes stored in the memory of the custom card design server that each uniquely configure the first configurable element in relation to at least a product context of a custom card design session and the card providing organization;
   receiving at the processor of the custom card design server a request from a user computer in communication with the custom card design server through the Internet in response to activation of a link at the user computer that includes a contextual parameter that is at least partially determinative of the product context of the custom card design session, wherein the product context at least comprises a card fulfillment mechanism including an electronic delivery of an electronic representation corresponding to the custom card design generated by the user;
   selecting, using the processor of the custom card design server, a selected one of the plurality of preconfigured selectable product contextual attributes corresponding to the electronic delivery of the electronic representation corresponding to the custom card design generated by the user, at least partially based on the contextual parameter included in the link activated at the user computer, in response to the request received at the processor of the custom card design server from the user computer; and
   generating, using the processor of the custom card design server, the custom card design web page user interface upon activation of the link and serving the custom card design web page user interface to the user computer for accepting user inputs relative to the functionality for generating a custom card design in response to the request by configuring the first configurable element of the custom card design session interface template based on the organization specific configuration for the card providing organization by the selected one of the plurality of preconfigured selectable product contextual attributes and serving the custom card design session interface template including the configured first configurable element to the user computer.

2. The method of claim 1, wherein the product context comprises a plurality of card fulfillment mechanisms that are selectable by the user.

3. The method of claim 2, wherein the plurality of card fulfillment mechanisms comprises the electronic delivery of the electronic representation corresponding to the custom card design generated by the user and a physical delivery of a physical card corresponding to the card design generated by the user.

4. The method of claim 3, wherein the custom card design web page user interface allows the user to select at least one of the plurality of card fulfillment mechanisms.

5. The method of claim 4, wherein the custom card design web page user interface allows the user to select the electronic delivery of the electronic representation corresponding to the custom card design generated by the user and the physical delivery of a physical card corresponding to the card design generated by the user.

6. The method of claim 5, further comprising:
   printing a card comprising the custom card design generated by the user;
   generating the electronic representation of the custom card design generated by the user; and
   delivering the card and the electronic representation of the card to the customer.

7. The method of claim 1, wherein the electronic representation of the custom card design is delivered by at least one of delivery via SMS, email, or by way of one or more social networks.

8. The method of claim 1, wherein the custom card design session interface template comprises a second configurable element and the method further comprises:
   correlating the second configurable element to a plurality of selectable customer contextual attributes stored in the memory of the custom card design server that each uniquely configure the second configurable element in relation to a customer context of the custom card design session, wherein the contextual parameter is at least partially determinative of the customer context of the custom card design session;
   selecting, using the processor of the custom card design server, a selected one of the plurality of preconfigured selectable customer contextual attributes corresponding to the customer context based on the contextual parameter in response to the request; and
   generating, using the processor of the custom card design server, the custom card design web page user interface upon activation of the link and serving the custom card design web page user interface to the user computer for accepting user inputs relative to the functionality for generating a custom card design in response to the request by configuring the second configurable element of the custom card design session interface template by the selected one of the plurality of preconfigured selectable customer contextual attributes.

9. The method of claim 8, wherein the second configurable element comprises at least one of a locale element, a language element, or a currency element.

10. The method of claim 9, wherein the product context is independent of the customer context.

11. A custom card design system, comprising:
a custom card design server that maintains in a memory of the custom card design server a custom card design session interface template that supports functionality for generating a custom card design through a card providing organization by user interaction therewith, wherein the custom card design server stores a plurality of preconfigured selectable product contextual attributes and a plurality of organization specific configurations preconfigured through an administrative user interface accessible by an administrative user of the card providing organization, the preconfigured selectable product contextual attributes each uniquely configuring at least a first configurable element of the custom card design session interface template in corresponding relative relation to a product context of a custom card design session and an organization specific configuration, wherein each of the organization specific configurations configure the first configurable element to define functionality of the custom card design session for creation of the customized card design through a respective card providing organization;
a communication module executed by a processor of the custom card design server that is in operative communication with a user computing device through the Internet to receive at the processor of the custom card design server in response to activation of a link at the user computer that includes a contextual parameter that is at least partially determinative of the product context of the custom card design session, and wherein the product context at least comprises a card fulfillment mechanism including an electronic delivery of an electronic representation corresponding to the custom card design generated by the user; and
a custom card design web page user interface configuration module executed by the processor of the custom card design server that is operable to generate a custom card design web page user interface by configuring the first configurable element of the custom card design session interface template based on the organization specific configuration for the card providing organization and by a selected one of the plurality of preconfigured selectable product context attributes that is selected by the custom card design web page user interface configuration module at least partially based on the contextual parameter included in the link, and wherein the custom card design web page user interface configuration module is operable to serve the custom card design web page user interface to the user computing device by serving the custom card design session interface template including the first configurable element to the user computing device.

12. The system of claim 11, wherein the product context comprises a plurality of card fulfillment mechanisms that are selectable by the user.

13. The system of claim 12, wherein the plurality of card fulfillment mechanisms comprises the electronic delivery of the electronic representation corresponding to the custom card design generated by the user and a physical delivery of a physical card corresponding to the card design generated by the user.

14. The system of claim 13, wherein the custom card design web page user interface allows the user to select at least one of the plurality of card fulfillment mechanisms.

15. The system of claim 14, wherein the custom card design web page user interface allows the user to select at least two of the plurality of card fulfillment mechanisms.

16. The system of claim 15, wherein the custom card design web page user interface allows the user to select the electronic delivery of the electronic representation corresponding to the custom card design generated by the user and the physical delivery of a physical card corresponding to the card design generated by the user.

17. The system of claim 16, further comprising:
a card printer operative to print a card comprising the custom card design generated by the user; and
an electronic card generation module operative to generate the electronic representation of the custom card design generated by the user;
wherein the card and the electronic representation of the card are delivered to the customer.

18. The system of claim 11, wherein the electronic representation of the custom card design is delivered by at least one of delivery via SMS, email, or by way of one or more social networks.

19. A method of generating a custom card design session interface for use in a custom card design session comprising:
receiving a request from a user computing device to begin a custom card design session for creation of a customized card through a card providing organization, the request including at least one contextual parameter relating to the custom card design session;
retrieving a custom card design session interface template from a custom card design server, the custom card design session interface template including a first configurable element, wherein the custom card design server includes a plurality of organization specific configurations for the first configurable element, wherein each of the organization specific configurations define functionality of the custom card design session for creation of the customized card through a respective card providing organization;
configuring the first configurable element of the custom card design session interface template based on the organization specific configuration for the card providing organization and the at least one contextual parameter received as part of the request, wherein,
a configuration of the first configurable element is determined by a plurality of contextual attributes for the first configurable element chosen through an administrative user interface accessible by an administrative user of the card providing organization,
each of the plurality of contextual attributes is associated with a respective contextual parameter, and
the first configurable element is configured by retrieving a contextual attribute associated with the contextual parameter received as part of the user request; and
serving the custom card design web page user interface to the user computing device by serving the custom card design session interface template including the configured first configurable element to the user computing device.

20. The method of claim 19, wherein each of the organization specific configurations for the first configurable element define how the custom card may be customized by the user for the respective card providing organization associated with the organization specific configuration.

21. The method of claim 19, wherein the configured first configurable element collects user provided data included on the customized card.

22. The method of claim 19, further comprising:
configuring a second configurable element of the custom card design session interface template based on a second organization specific configuration for the second configurable element, wherein the configured second configurable element displays organization specific data included on the customized card.

* * * * *